(12) United States Patent
Bequet et al.

(10) Patent No.: US 9,760,376 B1
(45) Date of Patent: Sep. 12, 2017

(54) COMPILATION FOR NODE DEVICE GPU-BASED PARALLEL PROCESSING

(71) Applicant: SAS Institute Inc., Cary, NC (US)

(72) Inventors: Henry Gabriel Victor Bequet, Cary, NC (US); Huina Chen, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/422,285

(22) Filed: Feb. 1, 2017

Related U.S. Application Data

(63) Continuation of application No. 15/422,154, filed on Feb. 1, 2017.

(60) Provisional application No. 62/289,484, filed on Feb. 1, 2016, provisional application No. 62/379,512, filed on Aug. 25, 2016, provisional application No. 62/394,411, filed on Sep. 14, 2016.

(51) Int. Cl.

| | |
|---|---|
| *G06F 15/16* | (2006.01) |
| *G06F 9/30* | (2006.01) |
| *G06F 9/38* | (2006.01) |
| *G06F 9/50* | (2006.01) |
| *G06F 9/48* | (2006.01) |

(52) U.S. Cl.
CPC ...... *G06F 9/30145* (2013.01); *G06F 9/30043* (2013.01); *G06F 9/30181* (2013.01); *G06F 9/3885* (2013.01); *G06F 9/4806* (2013.01); *G06F 9/5027* (2013.01)

(58) Field of Classification Search
CPC ............ G06F 9/30145; G06F 9/30043; G06F 9/30181; G06F 9/3885; G06F 9/4806; G06F 9/5027

USPC .......................................................... 709/205
See application file for complete search history.

(56) References Cited

U.S. PATENT DOCUMENTS

| | | | |
|---|---|---|---|
| 8,310,492 B2 * | 11/2012 | McCrary | G06F 9/3851 345/506 |
| 8,914,515 B2 | 12/2014 | Alapati et al. | |
| 8,938,723 B1 * | 1/2015 | Tormasov | G06F 8/52 717/136 |
| 9,542,231 B2 * | 1/2017 | Khan | G06F 8/451 |
| 9,558,225 B2 * | 1/2017 | Skrzypczak | G06F 17/30339 |

(Continued)

OTHER PUBLICATIONS

Xhafa et al., "Computational models and heuristic methods for Grid scheduling problems", Future Generation computer Systems 26 (2010) 14 pages.

(Continued)

*Primary Examiner* — Melvin H Pollack

(57) ABSTRACT

An apparatus may include a processor and storage to store instructions that cause the processor to perform operations including: in response to a determination that a GPU of a node device is available, determine whether a task routine can be compiled to generate a GPU task routine for execution by the GPU to cause performance of multiple instances of a task of the task routine at least partially in parallel without dependencies thereamong; and in response to a determination that the task routine is able to be compiled to generate the GPU task routine: employ a conversion rule to convert the task routine into the GPU task routine; compile the GPU task routine for execution by the GPU; and assign performance of the task with a data set partition to the node device to enable performance of the multiple instances with the data set partition by the GPU.

30 Claims, 32 Drawing Sheets

(56) References Cited

U.S. PATENT DOCUMENTS

| | | | |
|---|---|---|---|
| 9,569,869 B2* | 2/2017 | Hesse | G06T 11/206 |
| 9,632,569 B2* | 4/2017 | Suarez Gracia | G06F 1/3296 |
| 9,652,026 B2* | 5/2017 | Park | G06F 1/324 |
| 9,665,970 B2* | 5/2017 | Redgrave | G06T 15/005 |
| 9,691,118 B2* | 6/2017 | Harper | G06T 1/20 |
| 9,694,281 B2* | 7/2017 | Garden | G06F 9/5061 |
| 9,697,579 B2* | 7/2017 | Taggart | G06T 1/20 |
| 2005/0231514 A1* | 10/2005 | Harper | G06T 1/20 345/501 |
| 2007/0180451 A1 | 8/2007 | Ryan et al. | |
| 2009/0199193 A1 | 8/2009 | Jackson | |
| 2009/0241117 A1 | 9/2009 | Dasgupta et al. | |
| 2011/0057937 A1 | 3/2011 | Wu et al. | |
| 2013/0073724 A1 | 3/2013 | Parashar et al. | |
| 2013/0238785 A1 | 9/2013 | Hawk et al. | |
| 2015/0375112 A1* | 12/2015 | Garden | A63F 13/355 463/31 |
| 2016/0323374 A1* | 11/2016 | Russinovich | H04L 67/1025 |
| 2016/0357532 A1* | 12/2016 | Gasselin de Richebourg | G06F 8/51 |
| 2017/0111336 A1* | 4/2017 | Davis | H04L 63/08 |
| 2017/0126504 A1* | 5/2017 | Fang | H04L 41/12 |
| 2017/0178039 A1* | 6/2017 | Pinkerton | G06Q 10/0635 |
| 2017/0193360 A1* | 7/2017 | Gao | G06N 3/08 |

OTHER PUBLICATIONS

Sotomayor et al., "An Open Source Solution for Virtual Infrastructure Management in Private and Hybrid Clouds", IEEE Internet Computing, Special Issue on Cloud Computing, Jul. 7, 2009, 11 pages.

Auerbach et al., "A Compiler and Runtime for Heterogeneous Computing", DAC 2012, Jun. 3-7, 2012, 6 pages.

Wang et al., "Automatic and Portable Mapping of Data Parallel Programs to OpenCL for GPU-based Heterogeneous Systems", International Symposium on Code Generation and Optimization (CGO), 2013, 25 pages.

"AMD Radeon 400 series", Wikipedia, <https://en.wikipedia.org/wiki/AMD_Radeon_400_series>, retrieved Jun. 15, 2017, 6 pages (author unknown).

"Automatic parallelization tool", Wikipedia, <https://en.wikipedia.org/wikiAutomatic_parallelization_tool#Parallelization_Tools>, retrieved Aug. 11, 2016, 7 pages, (author unknown).

"CUDA", Wikipedia, <https://en.wikipedia.org/wiki/CUDA>, retrieved Jun. 15, 2017, 16 pages, (author unknown).

"Difference Between CPU and GPU", <http://www.differencebetween.net/technology/differencebetweencpuandgpu/>, retrieved Jun. 15, 2017, 2 pages, (author unknown).

"How to force your laptop to 'Run with Graphics Processor' vs. The default 'Integrated Graphics' for InfraWorks", Autodesk Support, Autodesk Knowledge Networks, May 25, 2016, 7 pages (author unknown).

Giles, M, "Lecture 0: CPUs and GPUs", Oxford University Mathematical Institute, 2012, 36 pages.

"List of Intel graphics processing units", Wikipedia, <https://en.wikipedia.org/wiki/ List_of_Intel_graphics_processing_units>, retrieved Jun. 15, 2017, 24 pages, (author unknown).

"LLVM", Wikipedia, <https://en.wikipedia.org/wiki/LLVM>, retrieved Jun. 15, 2017, 9 pages, (author unknown).

Luehr, N., "NCCL: Accelerated Collective Communications for GPUS", GPU Technology Conference, NVIDIA, Apr. 5, 2016, 31 pages.

"OpenACC: More Science Less Programming", NVIDIA, <https://developer.nvidia.com/openacc>, retrieved Aug. 11, 2016, pages, (author unknown).

"Pascal (microarchitecture)", Wikipedia, <https://en.wikipedia.org/wiki/Pascal_(microarchitecture)>, retrieved May 15, 2017, 6 pages, (author unknown).

"Volta (microarchitecture)", Wikipedia, <https://en.wikipedia.org/wik/Volta_(microarchitecture)>, retrieved Jun. 15, 2017, 3 pages, (author unknown).

Fair et al.., "What's the difference between a CPU and a GPU?", <https://www.quora.com/WhatsthedifferencebetweenaCPUandaGPU>, retrieved Jun. 15, 2017, 11 pages.

"Extract, transform, load", Wikipedia, <https://en.wikipedia.org/wiki/Extract,_transform,_load>, retrieved Jun. 22, 2017, 8 pages (author unknown).

"Scalar (mathematics)", Wikipedia, <https://en.wikipedia.org/wiki/Scalar_(mathematics)>, retrieved Jun. 22, 2017, 3 pages, (author unknown).

"Many-task computing", Wikipedia, <https://en.wikipedia.org/wiki/Many-task_computing>, retrieved Jun. 22, 2017, 2 pages, (author unknown).

"Embarrassingly parallel", Wikipedia, <https://en.wikipedia.org/wiki/Embarrassingly_parallel>, retrieved Jun. 22, 2017, 3 pages, (author unknown).

Raicu et al., "Many-Task Computing for Grids and Supercomputers", MTAGS 2008, 11 pages.

"Graphics processing unit", Wikipedia, <https://en.wikipedia.org/wiki/Graphics_processing_unit>, retrieved Jun. 22, 2017, 13 pages, (author unknown).

Krieder et al., "Design and Evaluation of the GeMTC Framework for GPU-enabled Many-Task Computing", HPDC'14, Jun. 23-27, 2014, 12 pages.

* cited by examiner

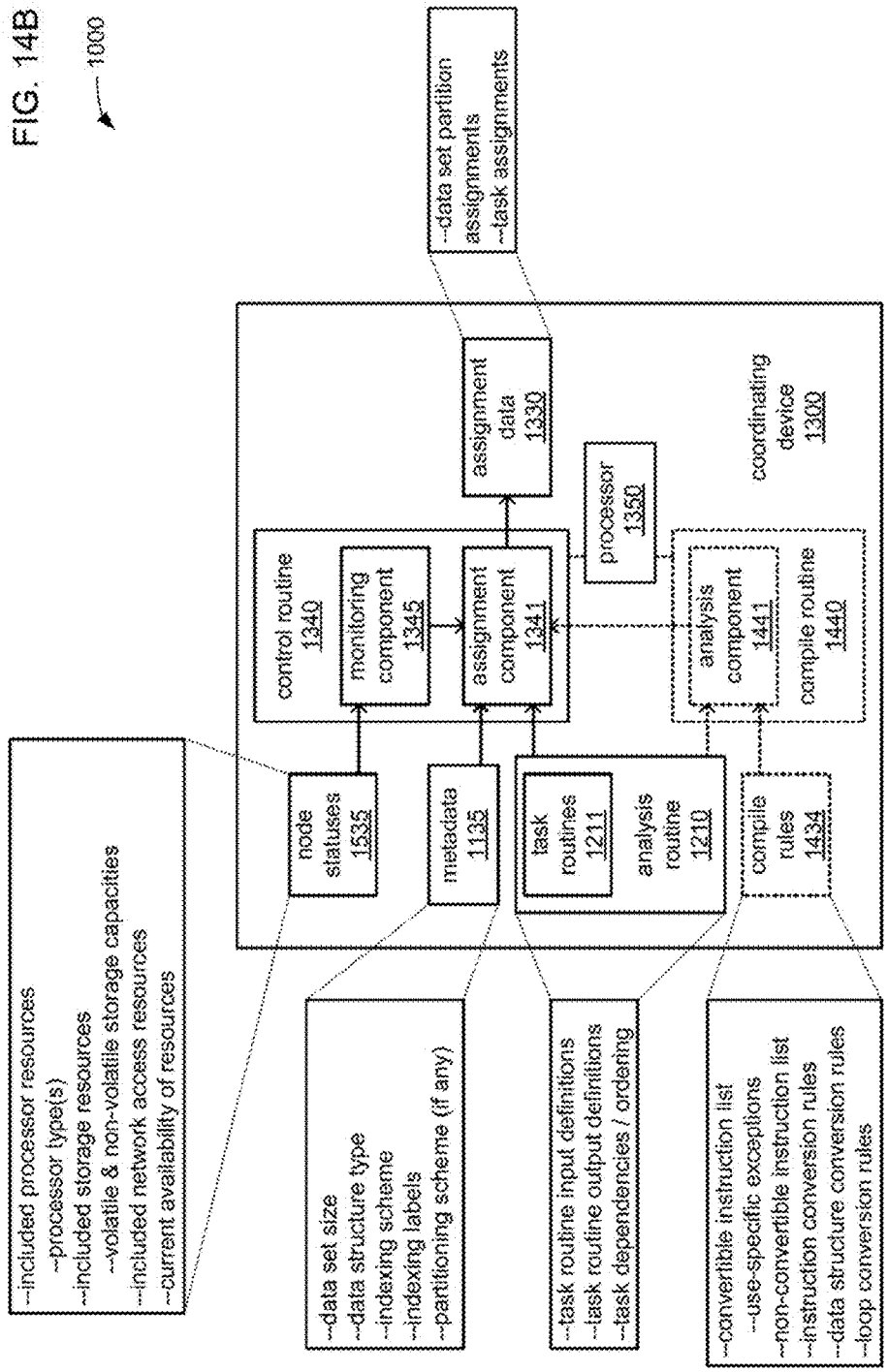

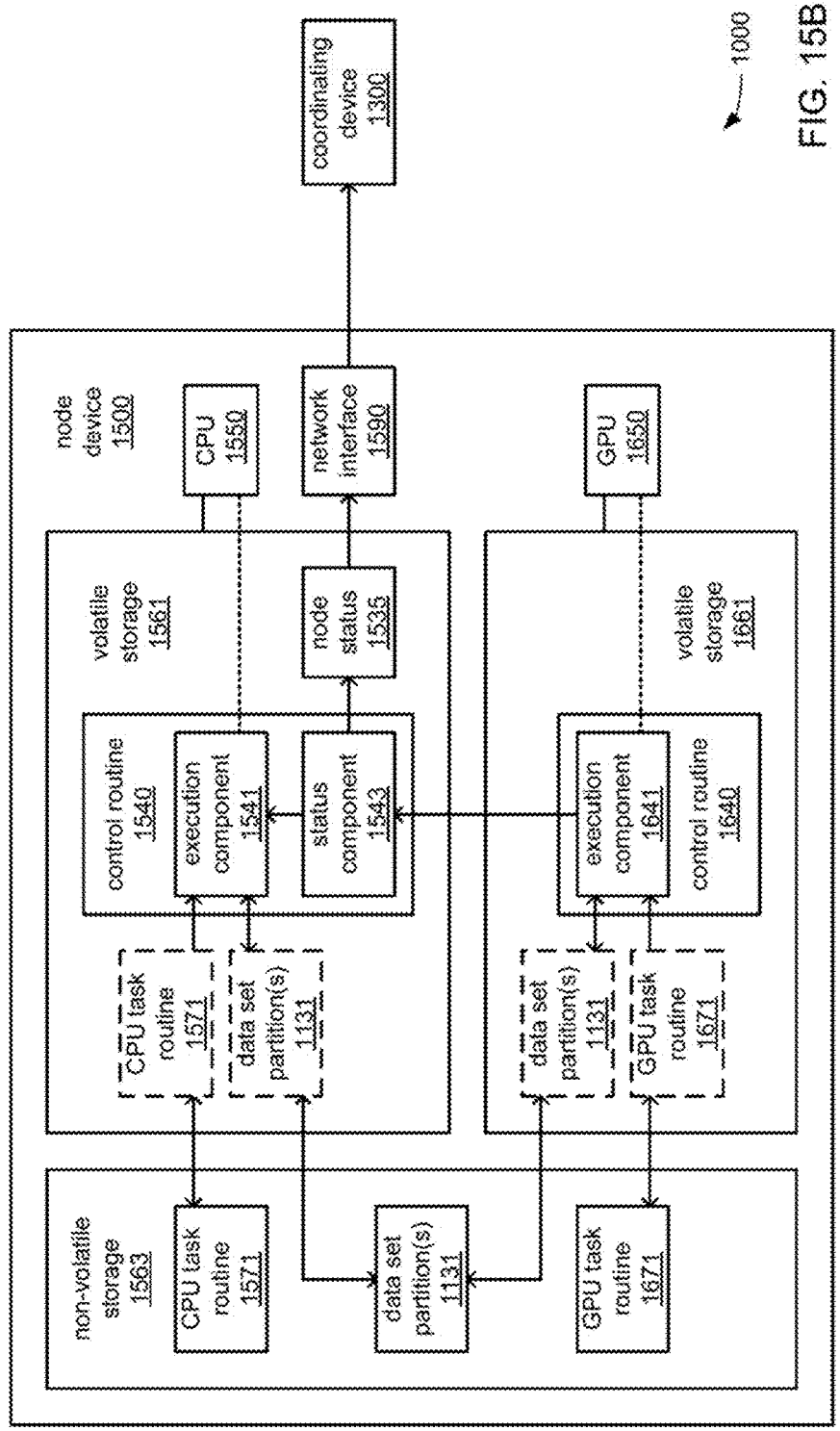

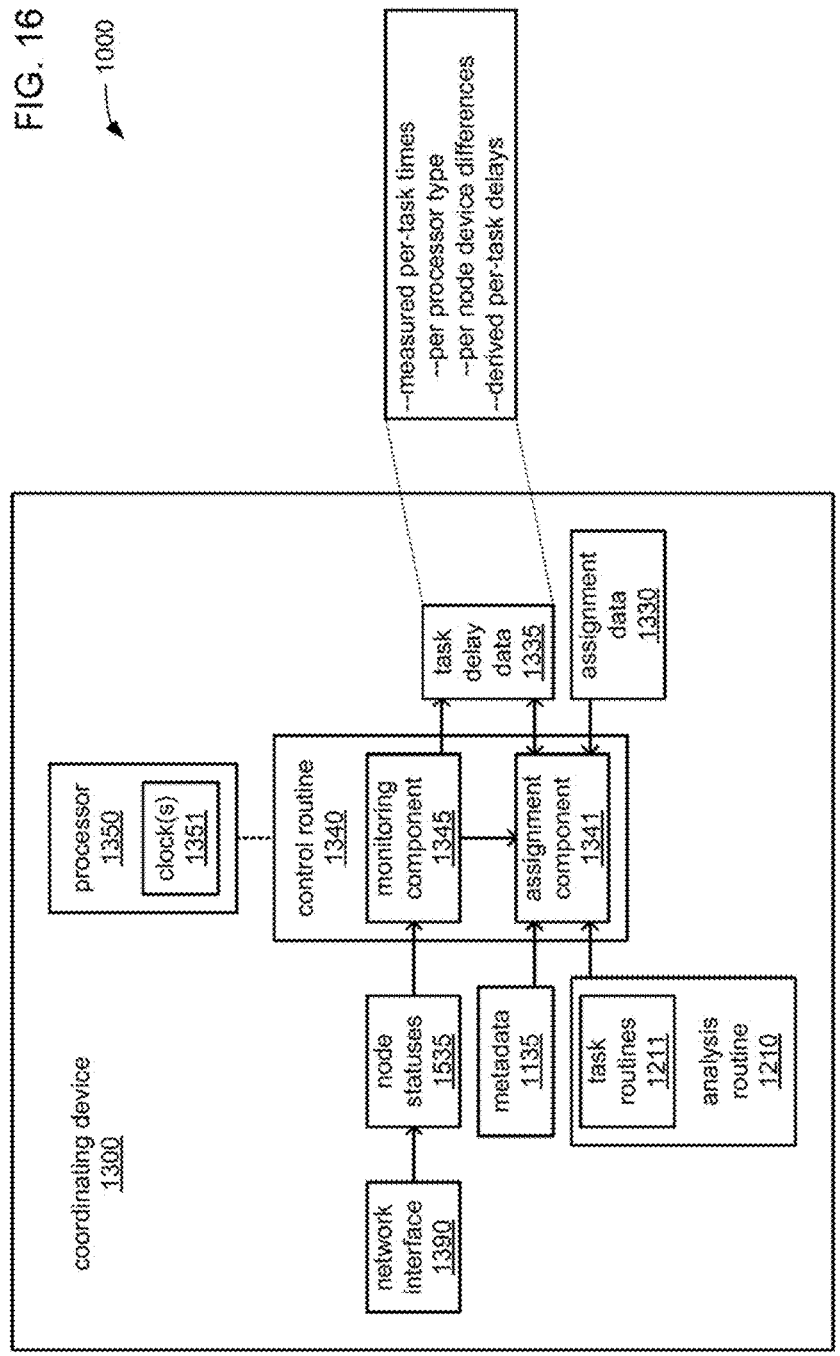

COMPILATION FOR NODE DEVICE GPU-BASED PARALLEL PROCESSING

CROSS-REFERENCE TO RELATED APPLICATIONS

This application claims the benefit of priority under 35 U.S.C. §119(e) to U.S. Provisional Application Ser. No. 62/289,484 filed Feb. 1, 2016, U.S. Provisional Application Ser. No. 62/379,512 filed Aug. 25, 2016, and U.S. Provisional Application Ser. No. 62/394,411 filed Sep. 14, 2016, the entirety of each of which is incorporated herein by reference. This application is a continuation of, and claims the benefit of priority under 35 U.S.C. §120 to, U.S. patent application Ser. No. 15/422,154 filed concurrently herewith on Feb. 1, 2017, the entirety of which is incorporated herein by reference.

BACKGROUND

It has become increasingly commonplace to use grids of numerous node devices to perform analyses of large data sets (e.g., what is commonly referred to as "big data") in a distributed manner in which tasks of analysis routines are performed at least partially in parallel across multiple selected ones of the node devices. In operating such grids, there are often competing goals in assigning the tasks of analysis routines to the node devices, including the goal of making as full and uninterrupted use of the processing resources of each node device as possible, and the goal of making more effective use of the processing and storage resources of each node device, as well as of the network bandwidth resources of the grid. Adding to the complexity of addressing such competing goals is the common practice of sharing grid resources by causing the tasks of multiple analysis routines to be performed by the node devices of the grid at the same time. A classic approach to assigning tasks is to simply assign the next task to be performed to whichever node device is the next one to have available processing resources. Unfortunately, this classic approach represents a decision to allow considerable inefficiencies in the use of storage and network bandwidth resources.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to, for each node device of a plurality of node devices, derive an assignment of performance of a first task with a first data set, wherein: the first data set is divisible into a plurality of partitions; a first node device of the plurality of node devices is assigned to perform the first task with a first partition of the plurality of partitions of the first data set; and a second node device of the plurality of node devices is assigned to perform the first task with a second partition of the plurality of partitions of the first data set. The processor may be caused to transmit an indication of the assignment of performance of the first task with the first partition to the first node device to cause performance of the first task with the first partition by the first node device and to cause storage of at least some of the first partition within volatile storage of the first node device; transmit an indication of the assignment of performance of the first task with the second partition to the second node device to cause performance of the first task with the second partition by the second node device and to cause storage of at least some of the second partition within volatile storage of the second node device; receive an indication from the first node device of completion of performance of the first task with the first partition by the first node device such that the first node device is available to assign to perform another task; delay assignment of performance of a second task on the second partition to the first node device after receipt of the indication of completion of the performance of the first task with the first partition by the first node device for up to a predetermined period of time, in spite of readiness of the second task to be performed on the second partition, and in spite of availability of the first node as a result of the completion of the performance of first task with the first partition; and determine whether an indication of completion of performance of the first task with the second partition by the second node device such that the second node device is available to assign to perform another task is received from the second node device within the predetermined period of time. In response to receipt of the indication of completion of the first task with the second partition by the second node device within the predetermined period of time, the processor may be caused to assign performance of the second task on the second partition to the second node device to enable accesses to at least some of the second partition within the volatile storage of the second node device; and transmit an indication of the assignment of performance of the second task on the second partition to the second node device to avoid retrieval of the second partition by the first node device. In response to a lack of receipt of the indication of completion of the first task with the second partition by the second node device within the predetermined period of time, the processor may be caused to assign performance of the second task on the second partition to the first node device; and transmit an indication of the assignment of performance of the second task on the second partition to the first node device to cause retrieval of the second partition by the first node device.

The processor may be caused to perform operations including derive the predetermined period of time from at least one measurement of an amount of time between transmission of an assignment to perform the first task to a node device of the plurality of nodes devices and receipt of an indication of completion of performance of the first task from the node device.

The processor may be caused to perform operations including: determine a quantity of node devices of the plurality of node devices that are available to perform the first task; and derive a division of the first data set into the plurality of partitions of the first data set based on the quantity of node devices and a metadata descriptive of a manner in which the first data set is organized. The first data set may be stored within one or more storage devices; the processor may be caused to perform operations including retrieve the metadata from the one or more storage devices; the transmission of the indication of the assignment of performance of the first task with the first partition to the first node device may cause the first node device to retrieve the first partition from the one or more storage devices; and the transmission of the indication of the assignment of performance of the first task with the second partition to the second node device may cause the second node device to retrieve the second partition from the one or more storage devices.

The apparatus may include at least one volatile storage component coupled to the processor, and the processor may be caused to perform operations including assign the processor performance of the first task with a third partition of the plurality of partitions of the first data set; store at least some of the third partition within the at least one volatile storage component; and perform the first task with the third partition.

The processor may be caused to perform operations including, for each node device of a subset of the plurality of node devices, derive an assignment to retrieve and store one of the plurality of partitions of the first data set from one or more storage devices to enable use of each node device of the subset as a backup node device to respond to a failure of one of the node devices of the plurality of node devices, wherein: a third node device of the plurality of node devices is assigned to perform the first task with a third partition of the plurality of partitions of the first data set; and the third node is assigned to retrieve and store the second partition from the one or more storage devices to enable use of the third node device as a backup node device to respond to a failure of the second node device. The processor may caused to receive an indication, during the predetermined period of time, from the third node device of completion of performance of the first task with the third partition by the third node device such that the third node device is available to assign to perform another task. In response to receipt of the indication of completion of the first task with the third partition by the third node device during the predetermined period of time, and in response to a lack of receipt of the indication of completion of the first task with the second partition by the second node device within the predetermined period of time, the processor may be caused to assign performance of the second task on the second partition to the third node device; and transmit an indication of the assignment of performance of the second task on the second partition to the third node device.

The performances of the first task with the first and second partitions may include use of the first and second partitions as inputs to performances of the first task to generate corresponding partitions of a second data set; and the performance of the second task on the second partition may include use of the second partition as an input to a performance of the second task to generate a corresponding partition of a third data set. The transmission of the indication of the assignment of the performance of the first task with the first partition to the first node device may cause the first node device to: retrieve the first partition from one or more storage devices; use at least some of the first partition stored within the volatile storage of the first node device as an input to the performance of the first task by the first node device; and transmit the indication of completion of the performance of the first task with the first partition while at least some of the first partition remains stored within the volatile storage of the first node device. The transmission of the indication of the assignment of the performance of the first task with the second partition to the second node device may cause the second node device to: retrieve the second partition from the one or more storage devices; use at least some of the second partition stored within the volatile storage of the second node device as an input to the performance of the first task by the second node device; and transmit the indication of completion of the performance of the first task with the second partition while at least some of the second partition remains stored within the volatile storage of the second node device. The transmission of the indication of the assignment of the performance of the second task on the second partition to the second node device may cause the second node device to use at least some of the second partition still stored within the volatile storage of the second node device as an input to the performance of the second task by the second node device to minimize accesses to the second partition stored within non-volatile storage of the second node device.

The performances of the first task with the first and second partitions may include performances of the first task to generate the first and second partitions as outputs of the first task using corresponding partitions of a second data set as inputs; and the performance of the second task on the second partition may include use of the second partition as an input to a performance of the second task to generate a corresponding partition of a third data set. The transmission of the indication of the assignment of the performance of the first task with the first partition to the first node device may cause the first node device to: generate the first partition as an output of the performance of the first task by the first node device; and transmit the indication of completion of the performance of the first task with the first partition while at least some of the first partition remains stored within the volatile storage of the first node device. The transmission of the indication of the assignment of the performance of the first task with the second partition to the second node device may cause the second node device to: generate the second partition as an output of the performance of the first task by the second node device; and transmit the indication of completion of the performance of the first task with the second partition while at least some of the second partition remains stored within the volatile storage of the second node device. The transmission of the indication of the assignment of the performance of the second task on the second partition to the second node device may cause the second node device to use at least some of the second partition still stored within the volatile storage of the second node device as an input to the performance of the second task by the second node device to minimize accesses to the second partition stored within non-volatile storage of the second node device.

A computer-program product tangibly embodied in a non-transitory machine-readable storage medium, the computer-program product including instructions operable to cause a processor to perform operations including for each node device of a plurality of node devices, derive an assignment of performance of a first task with a first data set, wherein: the first data set is divisible into a plurality of partitions; a first node device of the plurality of node devices is assigned to perform the first task with a first partition of the plurality of partitions of the first data set; and a second node device of the plurality of node devices is assigned to perform the first task with a second partition of the plurality of partitions of the first data set. The processor may be caused to perform operations including: transmit an indication of the assignment of performance of the first task with the first partition to the first node device to cause performance of the first task with the first partition by the first node device and to cause storage of at least some of the first partition within volatile storage of the first node device; transmit an indication of the assignment of performance of the first task with the second partition to the second node device to cause performance of the first task with the second partition by the second node device and to cause storage of at least some of the second partition within volatile storage of the second node device; receive an indication from the first node device of completion of performance of the first task with the first partition by the first node device such that the first node device is available to assign to perform another task; delay assignment of performance of a second task on the second partition to the first node device after receipt of the indication of completion of the performance of the first task with the first partition by the first node device for up to a predetermined period of time, in spite of readiness of the second task to be performed on the second partition, and in spite of availability of the first node as a result of the completion of the performance of first task with the first partition; and determine whether an indication of completion of performance of the first task with the second partition by the second node device such that the second node device is available to assign to perform another task is received from the second node device within the predetermined period of time. In response to receipt of the indication of completion of the first task with the second partition by the second node device within the predetermined period of time, the processor may be caused to assign performance of the second task on the second partition to the second node device to enable accesses to at least some of the second partition within the volatile storage of the second node device; and transmit an indication of the assignment of performance of the second task on the second partition to the second node device to avoid retrieval of the second partition by the first node device. In response to a lack of receipt of the indication of completion of the first task with the second partition by the second node device within the predetermined period of time, the processor may be caused to assign performance of the second task on the second partition to the first node device; and transmit an indication of the assignment of performance of the second task on the second partition to the first node device to cause retrieval of the second partition by the first node device.

The processor may be caused to perform operations including derive the predetermined period of time from at least one measurement of an amount of time between transmission of an assignment to perform the first task to a node device of the plurality of nodes devices and receipt of an indication of completion of performance of the first task from the node device.

The processor is caused to perform operations including: determine a quantity of node devices of the plurality of node devices that are available to perform the first task; and derive a division of the first data set into the plurality of partitions of the first data set based on the quantity of node devices and a metadata descriptive of a manner in which the first data set is organized. The first data set may be stored within one or more storage devices; the processor may be caused to perform operations comprising retrieve the metadata from the one or more storage devices; the transmission of the indication of the assignment of performance of the first task with the first partition to the first node device may cause the first node device to retrieve the first partition from the one or more storage devices; and the transmission of the indication of the assignment of performance of the first task with the second partition to the second node device may cause the second node device to retrieve the second partition from the one or more storage devices.

The processor is caused to perform operations including assign the processor performance of the first task with a third partition of the plurality of partitions of the first data set; store at least some of the third partition within at least one volatile storage component coupled to the processor; and perform the first task with the third partition.

The processor may be caused to perform operations including, for each node device of a subset of the plurality of node devices, derive an assignment to retrieve and store one of the plurality of partitions of the first data set from one or more storage devices to enable use of each node device of the subset as a backup node device to respond to a failure of one of the node devices of the plurality of node devices, wherein: a third node device of the plurality of node devices is assigned to perform the first task with a third partition of the plurality of partitions of the first data set; and the third node is assigned to retrieve and store the second partition from the one or more storage devices to enable use of the third node device as a backup node device to respond to a failure of the second node device. The processor may be caused to receive an indication, during the predetermined period of time, from the third node device of completion of performance of the first task with the third partition by the third node device such that the third node device is available to assign to perform another task. The processor may be caused to, in response to receipt of the indication of completion of the first task with the third partition by the third node device during the predetermined period of time, and in response to a lack of receipt of the indication of completion of the first task with the second partition by the second node device within the predetermined period of time: assign performance of the second task on the second partition to the third node device; and transmit an indication of the assignment of performance of the second task on the second partition to the third node device.

The performances of the first task with the first and second partitions may include use of the first and second partitions as inputs to performances of the first task to generate corresponding partitions of a second data set; and the performance of the second task on the second partition may include use of the second partition as an input to a performance of the second task to generate a corresponding partition of a third data set. The transmission of the indication of the assignment of the performance of the first task with the first partition to the first node device may cause the first node device to: retrieve the first partition from one or more storage devices; use at least some of the first partition stored within the volatile storage of the first node device as an input to the performance of the first task by the first node device; and transmit the indication of completion of the performance of the first task with the first partition while at least some of the first partition remains stored within the volatile storage of the first node device. The transmission of the indication of the assignment of the performance of the first task with the second partition to the second node device may cause the second node device to: retrieve the second partition from the one or more storage devices; use at least some of the second partition stored within the volatile storage of the second node device as an input to the performance of the first task by the second node device; and transmit the indication of completion of the performance of the first task with the second partition while at least some of the second partition remains stored within the volatile storage of the second node device. The transmission of the indication of the assignment of the performance of the second task on the second partition to the second node device may cause the second node device to use at least some of the second partition still stored within the volatile storage of the second node device as an input to the performance of the second task by the second node device to minimize accesses to the second partition stored within non-volatile storage of the second node device.

The performances of the first task with the first and second partitions may include performances of the first task to generate the first and second partitions as outputs of the first task using corresponding partitions of a second data set as inputs; and the performance of the second task on the second partition may include use of the second partition as an input to a performance of the second task to generate a corresponding partition of a third data set. The transmission of the indication of the assignment of the performance of the first task with the first partition to the first node device may cause the first node device to: generate the first partition as an output of the performance of the first task by the first node device; and transmit the indication of completion of the performance of the first task with the first partition while at least some of the first partition remains stored within the volatile storage of the first node device. The transmission of the indication of the assignment of the performance of the first task with the second partition to the second node device may cause the second node device to: generate the second partition as an output of the performance of the first task by the second node device; and transmit the indication of completion of the performance of the first task with the second partition while at least some of the second partition remains stored within the volatile storage of the second node device. The transmission of the indication of the assignment of the performance of the second task on the second partition to the second node device may cause the second node device to use at least some of the second partition still stored within the volatile storage of the second node device as an input to the performance of the second task by the second node device to minimize accesses to the second partition stored within non-volatile storage of the second node device.

A computer-implemented method may include, for each node device of a plurality of node devices, deriving at a coordinating device an assignment of performance of a first task with a first data set, wherein the first data set is divisible into a plurality of partitions, and the deriving may include: deriving a first assignment of a first node device of the plurality of node devices to perform the first task with a first partition of the plurality of partitions of the first data set; and deriving a second assignment of a second node device of the plurality of node devices is assigned to perform the first task with a second partition of the plurality of partitions of the first data set. The method may include transmitting an indication of the assignment of performance of the first task with the first partition to the first node device to cause performance of the first task with the first partition by the first node device and to cause storage of at least some of the first partition within volatile storage of the first node device; transmitting an indication of the assignment of performance of the first task with the second partition to the second node device to cause performance of the first task with the second partition by the second node device and to cause storage of at least some of the second partition within volatile storage of the second node device; receiving, at the coordinating device, an indication from the first node device of completion of performance of the first task with the first partition by the first node device such that the first node device is available to assign to perform another task; delaying assignment of performance of a second task on the second partition to the first node device after receipt of the indication of completion of the performance of the first task with the first partition by the first node device for up to a predetermined period of time, in spite of readiness of the second task to be performed on the second partition, and in spite of availability of the first node as a result of the completion of the performance of the first task with the first partition; and determining, at the coordinating device, whether an indication of completion of performance of the first task with the second partition by the second node device such that the second node device is available to assign to perform another task is received from the second node device within the predetermined period of time. The method may include, in response to receipt of the indication of completion of the first task with the second partition by the second node device within the predetermined period of time: assigning performance of the second task on the second partition to the second node device to enable accesses to at least some of the second partition within the volatile storage of the second node device; and transmitting an indication of the assignment of performance of the second task on the second partition to the second node device to avoid retrieval of the second partition by the first node device.

The method may include deriving, at the coordinating device, the predetermined period of time from at least one measurement of an amount of time between transmission of an assignment to perform the first task to a node device of the plurality of nodes devices and receipt of an indication of completion of performance of the first task from the node device.

The method may include determining, at the coordinating device, a quantity of node devices of the plurality of node devices that are available to perform the first task; and deriving, at the coordinating device, a division of the first data set into the plurality of partitions of the first data set based on the quantity of node devices and a metadata descriptive of a manner in which the first data set is organized. The first data set is stored within one or more storage devices; the method may include retrieving, by the coordinating device, the metadata from the one or more storage devices; the transmission of the indication of the assignment of performance of the first task with the first partition to the first node device may cause the first node device to retrieve the first partition from the one or more storage devices; and the transmission of the indication of the assignment of performance of the first task with the second partition to the second node device may cause the second node device to retrieve the second partition from the one or more storage devices.

The method may include assigning, to the coordinating device, performance of the first task with a third partition of the plurality of partitions of the first data set; storing at least some of the third partition within at least one volatile storage component of the coordinating device; and performing, at the coordinating device, the first task with the third partition. The method may include, in response to a lack of receipt of the indication of completion of the first task with the second partition by the second node device within the predetermined period of time: assign performance of the second task on the second partition to the first node device; and transmit an indication of the assignment of performance of the second task on the second partition to the first node device to cause retrieval of the second partition by the first node device.

The performances of the first task with the first and second partitions may include use of the first and second partitions as inputs to performances of the first task to generate corresponding partitions of a second data set; and the performance of the second task on the second partition may include use of the second partition as an input to a performance of the second task to generate a corresponding partition of a third data set. The transmission of the indication of the assignment of the performance of the first task with the first partition to the first node device may cause the first node device to: retrieve the first partition from one or more storage devices; use at least some of the first partition stored within the volatile storage of the first node device as an input to the performance of the first task by the first node device; and transmit the indication of completion of the performance of the first task with the first partition while at least some of the first partition remains stored within the volatile storage of the first node device. The transmission of the indication of the assignment of the performance of the first task with the second partition to the second node device may cause the second node device to: retrieve the second partition from the one or more storage devices; use at least some of the second partition stored within the volatile storage of the second node device as an input to the performance of the first task by the second node device; and transmit the indication of completion of the performance of the first task with the second partition while at least some of the second partition remains stored within the volatile storage of the second node device. The transmission of the indication of the assignment of the performance of the second task on the second partition to the second node device may cause the second node device to use at least some of the second partition still stored within the volatile storage of the second node device as an input to the performance of the second task by the second node device to minimize accesses to the second partition stored within non-volatile storage of the second node device.

The performances of the first task with the first and second partitions may include performances of the first task to generate the first and second partitions as outputs of the first task using corresponding partitions of a second data set as inputs; and the performance of the second task on the second partition comprises use of the second partition as an input to a performance of the second task to generate a corresponding partition of a third data set. The transmission of the indication of the assignment of the performance of the first task with the first partition to the first node device may cause the first node device to: generate the first partition as an output of the performance of the first task by the first node device; and transmit the indication of completion of the performance of the first task with the first partition while at least some of the first partition remains stored within the volatile storage of the first node device. The transmission of the indication of the assignment of the performance of the first task with the second partition to the second node device may cause the second node device to: generate the second partition as an output of the performance of the first task by the second node device; and transmit the indication of completion of the performance of the first task with the second partition while at least some of the second partition remains stored within the volatile storage of the second node device. The transmission of the indication of the assignment of the performance of the second task on the second partition to the second node device may cause the second node device to use at least some of the second partition still stored within the volatile storage of the second node device as an input to the performance of the second task by the second node device to minimize accesses to the second partition stored within non-volatile storage of the second node device.

An apparatus may include a processor and a storage to store instructions that, when executed by the processor, cause the processor to perform operations including: analyze a current status of resources of at least one node device of a plurality of node devices to determine an availability of at least one graphics processing unit (GPU) of the at least one node device to be assigned to perform a first task of an analysis routine, wherein: operation of the plurality of node devices is coordinated to perform tasks of analysis routines at least partially in parallel; the analysis routine is generated for execution by at least one central processing unit (CPU) of the at least one node; and the resources of the at least one node device are selected from a group consisting of the at least one CPU, the at least one GPU, and storage space within at least one storage of the at least one node device. In response to a determination that the at least one GPU is available to be assigned to perform the first task of the analysis routine, the processor may perform operations including: analyze a first task routine of the analysis routine to determine whether the first task routine is able to be compiled to generate a GPU task routine for execution by the at least one GPU to cause the at least one GPU to perform multiple instances of the first task of the analysis routine at least partially in parallel without a dependency among inputs and outputs of the multiple instances of the first task, wherein: the first task routine is generated for execution by the at least one CPU to perform the first task of the analysis routine; and the determination of whether the first task routine is able to be compiled to generate the GPU task routine comprises a determination of whether the first task routine includes an instruction that prevents the compilation to generate the GPU task routine and a determination of whether inputs and outputs of the first task routine are defined to not require the dependency. In response to a determination that the first task routine is able to be compiled to generate the GPU task routine, the processor may perform operations including: assign a data set partition of a plurality of data set partitions of a data set to the at least one node device to enable access to the data set partition by the at least one GPU; employ a conversion rule to convert at least one instruction of the first task routine into at least one corresponding instruction of the GPU task routine; compile the at least one corresponding instruction of the GPU task routine for execution by the at least one GPU; and assign a performance of the first task of the analysis routine with the data set partition to the at least one node device to enable performance of the multiple instances of the first task with the data set partition by the at least one GPU.

To determine whether the first task routine includes an instruction that prevents the compilation to generate the GPU task routine, the processor may be caused to: determine whether the instruction of the first task routine is included in a set of instructions that cannot be converted into at least one instruction able to be executed by the at least one GPU; and in response to a determination that the instruction of the first task routine is not included in the set of instructions, determine whether the instruction of the first task routine is used in the first task routine in a manner that prevents conversion into at least one instruction able to be executed by the at least one GPU. To convert the at least one instruction of the first task routine into the at least one corresponding instruction of the GPU task routine, the processor may be caused to convert the at least one instruction of the first task routine from a first programming language into the at least one corresponding instruction in a second programming language in accordance with the conversion rule. The at least one storage of the at least one node device may include a first volatile storage communicatively coupled to the at least one CPU, and a second volatile storage communicatively coupled to the at least one GPU; assigning the data set partition to the at least one node device to enable access by to the data set partition by the at least one GPU may include causing the data set partition to be stored within the second volatile storage; and in response to a determination that the at least one GPU is not available to be assigned to perform the first task of the analysis routine, the processor is may be caused to perform operations including: refrain from analyzing the first task routine to determine whether the first task routine is able to be compiled to generate the GPU task routine; assign the data set partition to the at least one node device to cause storage of the data set partition within the first volatile storage to enable access to the data set partition by the at least one CPU; compile the first task routine for execution by the at least one CPU; and assign the performance of the first task of the analysis routine with the data set partition to the at least one node device to enable performance of the first task with the data set partition by the at least one CPU.

The apparatus may include a coordinating device that coordinates the operation of the plurality of node devices; the processor may be caused to recurringly receive updates to the current status from each node device of the plurality of node devices; and to analyze the current status to determine availability of the at least one GPU of the at least one node device, the processor may be caused to identify a node device of the plurality of node devices that incorporates a GPU indicated by the current status as available. To assign the data set partition of the data set to the at least one node device, the processor may be caused to perform operations including: analyze a metadata indicative of structural features of the data set to identify a restriction in a manner in which the data set is able to be divided into the plurality of data set partitions, wherein the restriction is selected from a group consisting of an indication of a smallest atomic unit of data within the data set, and a specification of a partitioning scheme; and derive a division the data set into the plurality of data set partitions based at least partially on the restriction. The processor may be caused to perform operations including: retrieve the metadata from at least one storage device at which the data set is stored; and transmit an indication of the assignment of the data set partition to the at least one node device or the at least one storage device to cause a transmission of the data set partition from the at least one storage device to the at least one node device.

The apparatus may include a node device of the at least one node device; the node device may include a GPU of the at least one GPU; the processor may include a CPU of the at least one CPU; and to analyze the current status to determine availability of the at least one GPU of the at least one node device, the CPU may be caused to determine whether the GPU of the node device is indicated by the current status as available. The processor is caused to perform operations including analyze a second task routine of the analysis routine to determine whether the second task routine is able to be compiled to generate another GPU task routine for execution by the at least one GPU to cause the at least one GPU to perform multiple instances of the second task of the analysis routine at least partially in parallel without a dependency among inputs and outputs of the multiple instances of the second task, wherein the second task routine is generated for execution by the at least one CPU to perform a second task of the analysis routine. In response to a determination that the second task routine is not able to be compiled to generate the other GPU task routine, the processor may perform operations including: compile the second task routine for execution by the at least one CPU; and assign a performance of the second task of the analysis routine with the data set partition to the at least one node device to enable performance of the second task with the data set partition by the at least one CPU.

The conversion rule may be selected from a group consisting of: a specification of a set of instructions that each prevent compilation of the first task routine to generate the GPU task routine if present within the first task routine; a specification of a set of instructions that each would not prevent compilation of the first task routine to generate the GPU task routine if present within the first task routine; a specification of a manner of use of an instruction that prevents compilation of the first task routine to generate the GPU task routine if the manner of use of the instruction occurs within the first task routine, wherein presence of the instruction within the first task routine otherwise does not prevent compilation of the first task routine to generate the GPU task routine; a specification of a procedure to convert instructions in the first task routine that are to be executed in a loop by the at least one CPU into corresponding instructions of the GPU task routine that are to be executed in parallel by the at least one GPU in a corresponding loop of fewer iterations than the loop; a specification of a procedure to convert instructions in the first task routine that are to be executed in a loop by the at least one CPU into corresponding instructions of the GPU task routine that are to be executed in parallel by the at least one GPU and not in a loop; and a specification of a procedure to convert instructions in the first task routine that define a data structure comprising entries to be accessed sequentially during execution of the first task routine by the at least one CPU into corresponding instructions of the GPU task routine that define a corresponding data structure comprising entries to be accessed in parallel during execution of the GPU task routine by the at least one GPU.

A computer-program product tangibly embodied in a non-transitory machine-readable storage medium, the computer-program product including instructions operable to cause a processor to perform operations including: analyze a current status of resources of at least one node device of a plurality of node devices to determine an availability of at least one graphics processing unit (GPU) of the at least one node device to be assigned to perform a first task of an analysis routine, wherein: operation of the plurality of node devices is coordinated to perform tasks of the analysis routine at least partially in parallel; the analysis routine is generated for execution by at least one central processing unit (CPU) of the at least one node; and the resources of the at least one node device are selected from a group consisting of the at least one CPU, the at least one GPU, and storage space within at least one storage of the at least one node device. In response to a determination that the at least one GPU is available to be assigned to perform the first task of the analysis routine, the processor may be caused to perform operations including: analyze a first task routine of the analysis routine to determine whether the first task routine is able to be compiled to generate a GPU task routine for execution by the at least one GPU to cause the at least one GPU to perform multiple instances of the first task of the analysis routine at least partially in parallel without a dependency among inputs and outputs of the multiple instances of the first task, wherein: the first task routine is generated for execution by the at least one CPU to perform the first task of the analysis routine; and the determination of whether the first task routine is able to be compiled to generate the GPU task routine comprises a determination of whether the first task routine includes an instruction that prevents the compilation to generate the GPU task routine and a determination of whether inputs and outputs of the first task routine are defined to not require the dependency. In response to a determination that the first task routine is able to be compiled to generate the GPU task routine, the processor may be caused to perform operations including: assign a data set partition of a plurality of data set partitions of a data set to the at least one node device to enable access to the data set partition by the at least one GPU; employ a conversion rule to convert at least one instruction of the first task routine into at least one corresponding instruction of the GPU task routine; compile the at least one corresponding instruction of the GPU task routine for execution by the at least one GPU; and assign a performance of the first task of the analysis routine with the data set partition to the at least one node device to enable performance of the multiple instances of the first task with the data set partition by the at least one GPU.

To determine whether the first task routine includes an instruction that prevents the compilation to generate the GPU task routine, the processor may be caused to: determine whether the instruction of the first task routine is included in a set of instructions that cannot be converted into at least one instruction able to be executed by the at least one GPU; and in response to a determination that the instruction of the first task routine is not included in the set of instructions, determine whether the instruction of the first task routine is used in the first task routine in a manner that prevents conversion into at least one instruction able to be executed by the at least one GPU. To convert the at least one instruction of the first task routine into the at least one corresponding instruction of the GPU task routine, the processor may be caused to convert the at least one instruction of the first task routine from a first programming language into the at least one corresponding instruction in a second programming language in accordance with the conversion rule. The at least one storage of the at least one node device comprises a first volatile storage communicatively coupled to the at least one CPU, and a second volatile storage communicatively coupled to the at least one GPU; assigning the data set partition to the at least one node device to enable access by to the data set partition by the at least one GPU may include causing the data set partition to be stored within the second volatile storage; and in response to a determination that the at least one GPU is not available to be assigned to perform the first task of the analysis routine, the processor is caused to perform operations including: refrain from analyzing the first task routine to determine whether the first task routine is able to be compiled to generate the GPU task routine; assign the data set partition to the at least one node device to cause storage of the data set partition within the first volatile storage to enable access to the data set partition by the at least one CPU; compile the first task routine for execution by the at least one CPU; and assign the performance of the first task of the analysis routine with the data set partition to the at least one node device to enable performance of the first task with the data set partition by the at least one CPU.

The processor may be a component of a coordinating device that coordinates the operation of the plurality of node devices; the processor may be caused to recurringly receive updates to the current status from each node device of the plurality of node devices; and to analyze the current status to determine availability of the at least one GPU of the at least one node device, the processor may be caused to identify a node device of the plurality of node devices that incorporates a GPU indicated in the current status as available. To assign the data set partition of the data set to the at least one node device, the processor is caused to perform operations including: analyze a metadata indicative of structural features of the data set to identify a restriction in a manner in which the data set is able to be divided into the plurality of data set partitions, wherein the restriction is selected from a group consisting of an indication of a smallest atomic unit of data within the data set, and a specification of a partitioning scheme; and derive a division of the data set into the plurality of data set partitions based at least partially on the restriction. The processor may be caused to perform operations including: retrieve the metadata from at least one storage device at which the data set is stored; and transmit an indication of the assignment of the data set partition to the at least one node device or the at least one storage device to cause a transmission of the data set partition from the at least one storage device to the at least one node device.

The processor may include a CPU of the at least one CPU; the CPU may be a component of a node device of the at least one node device; the node device may include a GPU of the at least one GPU; and to analyze the current status to determine availability of the at least one GPU of the at least one node device, the CPU may be caused to determine whether the GPU of the node device is indicated by the current status as available. The processor may be caused to perform operations including: analyze a second task routine of the analysis routine to determine whether the second task routine is able to be compiled to generate another GPU task routine for execution by the at least one GPU to cause the at least one GPU to perform multiple instances of the second task of the analysis routine at least partially in parallel without a dependency among inputs and outputs of the multiple instances of the second task, wherein the second task routine is generated for execution by the at least one CPU to perform a second task of the analysis routine. In response to a determination that the second task routine is not able to be compiled to generate the other GPU task routine, the processor may be caused to: compile the second task routine for execution by the at least one CPU; and assign a performance of the second task of the analysis routine with the data set partition to the at least one node device to enable performance of the second task with the data set partition by the at least one CPU. The at least one GPU may support execution of the at least one corresponding instruction of the GPU task routine in parallel across at least one thousand threads of execution.

A computer-implemented method may include: analyzing a current status of resources of at least one node device of a plurality of node devices to determine an availability of at least one graphics processing unit (GPU) of the at least one node device to be assigned to perform a first task of an analysis routine, wherein: operation of the plurality of node devices is coordinated to perform tasks of analysis routines at least partially in parallel; the analysis routine is generated for execution by at least one central processing unit (CPU) of the at least one node; and the resources of the at least one node device are selected from a group consisting of the at least one CPU, the at least one GPU, and storage space within at least one storage of the at least one node device. The method may include, in response to a determination that the at least one GPU is available to be assigned to perform the first task of the analysis routine: analyzing a first task routine of the analysis routine to determine whether the first task routine is able to be compiled to generate a GPU task routine for execution by the at least one GPU to cause the at least one GPU to perform multiple instances of the first task of the analysis routine at least partially in parallel without a dependency among inputs and outputs of the multiple instances of the first task, wherein: the first task routine is generated for execution by the at least one CPU to perform the first task of the analysis routine; and the determination of whether the first task routine is able to be compiled to generate the GPU task routine comprises a determination of whether the first task routine includes an instruction that prevents the compilation to generate the GPU task routine and a determination of whether inputs and outputs of the first task routine are defined to not require the dependency. The method may include, in response to a determination that the first task routine is able to be compiled to generate the GPU task routine: assigning a data set partition of a plurality of data set partitions of a data set to the at least one node device to enable access to the data set partition by the at least one GPU; employing a conversion rule to convert at least one instruction of the first task routine into at least one corresponding instruction of the GPU task routine; compiling the at least one corresponding instruction of the GPU task routine for execution by the at least one GPU; and assigning a performance of the first task of the analysis routine with the data set partition to the at least one node device to enable performance of the multiple instances of the first task with the data set partition by the at least one GPU.

Determining whether the first task routine includes an instruction that prevents the compilation to generate the GPU task routine may include: determining whether the instruction of the first task routine is included in a set of instructions that cannot be converted into at least one instruction able to be executed by the at least one GPU; and in response to a determination that the instruction of the first task routine is not included in the set of instructions, determining whether the instruction of the first task routine is used in the first task routine in a manner that prevents conversion into at least one instruction able to be executed by the at least one GPU. Converting the at least one instruction of the first task routine into the at least one corresponding instruction of the GPU task routine may include converting the at least one instruction of the first task routine from a first programming language into the at least one corresponding instruction in a second programming language in accordance with the conversion rule.

The at least one storage of the at least one node device may include a first volatile storage communicatively coupled to the at least one CPU, and a second volatile storage communicatively coupled to the at least one GPU; assigning the data set partition to the at least one node device to enable access by to the data set partition by the at least one GPU may include causing the data set partition to be stored within the second volatile storage; and in response to a determination that the at least one GPU is not available to be assigned to perform the first task of the analysis routine, the method may include: refraining from analyzing the first task routine to determine whether the first task routine is able to be compiled to generate the GPU task routine; assigning the data set partition to the at least one node device to cause storage of the data set partition within the first volatile storage to enable access to the data set partition by the at least one CPU; compiling the first task routine for execution by the at least one CPU; and assigning the performance of the first task of the analysis routine with the data set partition to the at least one node device to enable performance of the first task with the data set partition by the at least one CPU.

A coordinating device may coordinate the operation of the plurality of node devices; the coordinating device may recurringly receive updates to the current status from each node device of the plurality of node devices; and analyzing the current status to determine availability of the at least one GPU of the at least one node device may include identifying, at the coordinating device, a node device of the plurality of node devices that incorporates a GPU indicated in the current status as available. Assigning the data set partition of the data set to the at least one node device may include: analyzing, at the coordinating device, a metadata indicative of structural features of the data set to identify a restriction in a manner in which the data set is able to be divided into the plurality of data set partitions, wherein the restriction is selected from a group consisting of an indication of a smallest atomic unit of data within the data set, and a specification of a partitioning scheme; and deriving a division the data set into the plurality of data set partitions based at least partially on the restriction. The method may include: retrieving the metadata from at least one storage device at which the data set is stored; and transmitting an indication of the assignment of the data set partition to the at least one node device or the at least one storage device to cause a transmission of the data set partition from the at least one storage device to the at least one node device.

Analyzing the current status to determine availability of the at least one GPU of the least one node device may include analyzing, by a CPU of a node device, a current status of the node device to whether a GPU of the node device is currently available, wherein: the at least one CPU may include the CPU; the at least one node device may include the node device; and the at least one GPU may include the GPU.

The method of claim 21, may include: analyzing a second task routine of the analysis routine to determine whether the second task routine is able to be compiled to generate another GPU task routine for execution by the at least one GPU to cause the at least one GPU to perform multiple instances of the second task of the analysis routine at least partially in parallel without a dependency among inputs and outputs of the multiple instances of the second task, wherein the second task routine is generated for execution by the at least one CPU to perform a second task of the analysis routine. The method may include, in response to a determination that the second task routine is not able to be compiled to generate the other GPU task routine: compiling the second task routine for execution by the at least one CPU; and assigning a performance of the second task of the analysis routine with the data set partition to the at least one node device to enable performance of the second task with the data set partitions by the at least one CPU. The method may include analyzing the analysis routine to determine an order of tasks of the analysis routine, wherein the order of tasks comprises a relative order of the first and second tasks.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 14A, 14B and 14C, together, illustrate an example embodiment of assignment of data set partitions and tasks.

FIGS. 15A and 15B, together, illustrate an example of performance of an assigned task by an example embodiment of a node device.

FIG. 16 illustrates another example embodiment of assignment of data set partitions and tasks.

DETAILED DESCRIPTION

Figure 1:
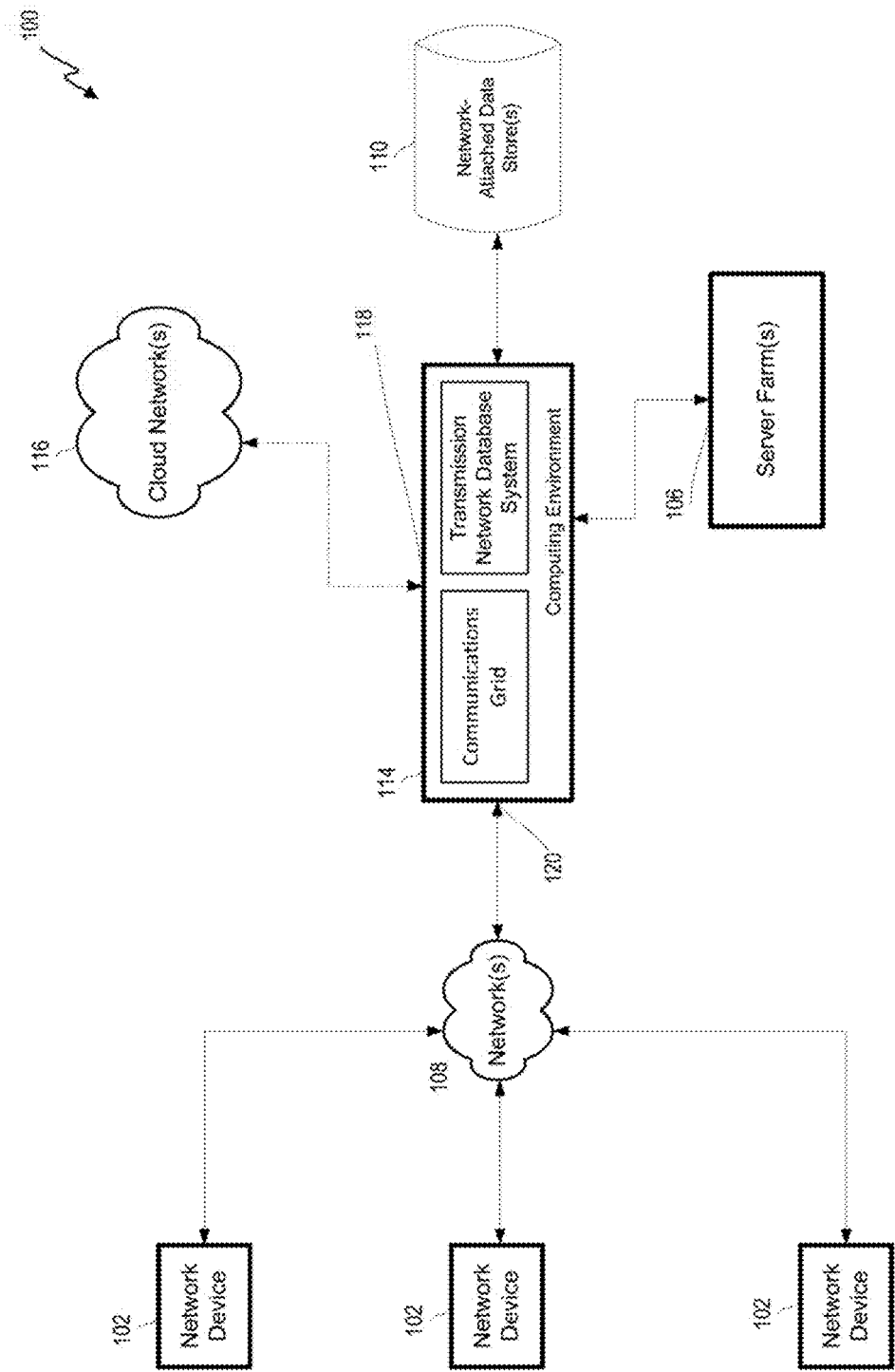
FIG. 1 illustrates a block diagram that provides an illustration of the hardware components of a computing system, according to some embodiments of the present technology.

Various embodiments described herein are generally directed to techniques for improving the effective use of processing, storage and network bandwidth resources within a grid of node devices to enable individual analysis routines to be completed in less time. Various embodiments are also generally directed to techniques for improving the ease of utilization of multi-threading support provided by at least some processors of a grid. Each node device of a grid of node devices may include both volatile storage providing faster access to data and routines, and non-volatile storage providing higher storage capacity, though with slower access than the volatile storage. Also, each node of the grid may include one or more central processing units (CPUs), or may include a combination of one or more CPUs and one or more graphics processing units (GPUs), each of which may be better suited to performing different types of tasks of an analysis routine. Initial assignments of data set partitions and task(s) of an analysis routine to node devices may be based on the availability of resources within the node devices and/or on an automated analysis of the tasks routines within the analysis routine to identify task routines that are able to be converted and compiled for execution by GPUs instead of by CPUs. Such an analysis may be performed either in conjunction with deriving the initial assignments, or as part of compiling each of the task routines for execution by CPUs and/or by GPUs. Subsequently, during execution of task routines of the analysis routine, as one node device becomes available such that it could be assigned a next task to perform with a particular data set partition, such an assignment to the one node device may be delayed by a predetermined period of time to allow another node device still performing a preceding task with that particular data set partition an opportunity to become available and be assigned to perform that next task with that particular data set partition. Such a delay in assignment may enable advantage to be taken of time-limited storage of the particular data set partition within volatile storage of the other node device to thereby enable the next task to be performed with the particular data set partition more quickly. Such a delay in assignment may also avoid the incurring of a potentially greater delay associated with transmitting the particular data set partition to the one node device.

A coordinating device of a grid of node devices may recurringly receive node data from each of the nodes of the node device grid providing recurringly updated indications of the extent of availability of various processing, storage and/or network access resources within each. The coordinating device may also receive an analysis routine that includes executable instructions for multiple task routines for multiple tasks to be performed with at least one data set, and specifies an order in which the tasks are to be performed. The coordinating device may further receive metadata indicative of various structural features of at least the one data set. From the node data, the metadata and/or the analysis routine, the coordinating device may derive initial assignments of data set partitions of the at least the one data set to selected ones of the node devices and initial assignments of task(s) to be performed by the selected node devices. The coordinating device may then transmit indications of the initial assignments to the selected node devices. As part of such initial assignments, multiple data set partitions of at least the one data set may be distributed among the selected node devices to enable the selected node devices to perform the same tasks at least partially in parallel with their corresponding data set partitions. The coordinating device may additionally transmit, to either a single storage device or a grid of storage devices that stores the data set, indications of the distribution of data set partitions to be made to the selected node devices as part of the initial assignments to enable performances of the initial task(s) to begin. In some embodiments, each of the selected node devices may retrieve one or more of the data set partitions from the one or more of the storage devices. In other embodiments, one or more of the data set partitions may be transmitted to each of the selected node devices by the one or more of the storage devices.

Regarding the processing resources about which the coordinating device may recurringly receive node data, each of the node devices may incorporate one or more GPUs in addition to or in lieu of incorporating one or more CPUs. The one or more CPUs may employ an internal processing architecture deemed to be well suited to the serial processing of task routines that include various input/output operations and/or branching operations that condition the execution of different sets of instructions on the outcomes of various determinations. The one or more CPUs may each include one or more processing cores that may each support a relatively limited degree of parallel execution of instructions on a relatively limited quantity of threads of execution. In contrast, the one or more GPUs may employ an internal processing architecture deemed to be well suited to the parallel processing of task routines that include a relatively limited variety of calculations and/or bitwise operations. In some embodiments, the one or more GPUs may be capable of supporting parallel processing of a relatively large quantity of instances of a task across a relatively large quantity of threads of execution where there are no dependencies among the instances of the task (sometimes referred to as "embarrassingly parallel"). Indeed, for a relatively limited variety of tasks, a single GPU within a single node device may be capable of doing the same work as the CPUs of numerous separate node devices, but faster and more cheaply. Thus, it may be advantageous for there to be at least a subset of the node devices that incorporate one or more GPUs that are able to perform such a limited variety of tasks with such an increase in speed, and it may advantageous to be able to automatically identify tasks in analysis routines that are of such a limited variety.

In embodiments of a node device grid in which some, but not all, of the node devices incorporate such GPUs, whether an analysis routine includes task routines for one or more tasks that are amenable to being executed more speedily by GPUs as embarrassingly parallel tasks than by CPUs may cause the coordinating device to determine whether to give priority to assigning node devices incorporating GPUs or node devices not incorporating GPUs to perform the tasks of the analysis routine. The coordinating device may analyze the task routines of an analysis routine to identify tasks that are implemented with instructions and that work with data in a manner avoiding dependencies that causes those tasks to be amenable to being compiled for execution as embarrassingly parallel tasks across a great many threads by one or more GPUs. If no such task routine is found by such an analysis, then the entirety of the analysis routine may be compiled for execution solely by CPUs. Also, priority may be given to assigning the tasks of the analysis routine to be performed by node devices that do not incorporate GPUs and/or that incorporate one or more CPUs, as well as one or more GPUs. Such prioritizing may be effected to leave as many of the nodes that incorporate one or more GPUs as available as possible to be assigned tasks of another analysis routine in which the instructions and/or interaction with data in one or more task routines are amenable to being compiled for execution as embarrassingly parallel tasks by GPUs.

However, it should be noted that, while the results of analyzing the task routines of an analysis routine may exert some influence over what node devices are selected for assignment of tasks, in some embodiments, indications of what processing resources are available among the node devices that are available may exert some influence over whether the task routines are analyzed and/or compiled for execution by GPUs. More specifically, in embodiments in which none of the node devices that incorporate GPUs are currently available to be assigned any task (e.g., all of the node devices that incorporate GPUs are assigned to performing tasks of another and entirely unrelated analysis routine), the coordinating device may refrain from performing any analysis of the task routines to determine whether any of the task routines are amenable to being compiled for execution by a GPU, since there are no GPUs currently available to do so.

Where an analysis of the instructions within task routines is performed, such an analysis may entail comparisons of instructions for each task routine to a list of instructions that are each known to at least not prevent their corresponding tasks from being performed as embarrassingly parallel tasks by a GPU, and/or to a list of instructions that are each known to render a task incapable of being performed as an embarrassingly parallel task by a GPU. Additionally, where a task routine is found to include no instructions that render its corresponding task incapable of being performed as an embarrassingly parallel task by a GPU, the manner in which the instructions within that task routine are used may be analyzed to determine whether the manner in which any instructions are used renders the task corresponding incapable of being performed as an embarrassingly parallel task by a GPU. By way of example, if such instructions are used to perform operations on data in a manner that would create dependencies among instances of a task routine such that those instances could not truly be performed in parallel, then the task of the task routine may not be amenable to being performed as an embarrassingly parallel task. If the instructions of a task routine and the manner in which those instructions are used is determined to not prevent the corresponding task from being performed as an embarrassingly parallel task by a GPU, then compiling the instructions of the task routine for such execution by one or more GPUs may be the default course of action. Where the node device grid includes node devices that incorporate different GPUs that do not share an instruction set, the compilation of the task routine for such execution by one or more GPUs may entail multiple compilations of the task routine to support each of the different GPUs.

In some embodiments, the compiling of a task routine for performing a task determined to be amenable to being performed as an embarrassingly parallel task by a GPU may entail a conversion of instructions of the task routine that were not generated to cause such an embarrassingly parallel performance of the task by a GPU into instructions that are generated to cause such a performance of the task. A compiler to perform such a conversion may employ a set of compilation rules that are each associated with one or more particular instructions that may be present among the instructions of the task routine, and that cause the one or more particular instructions to be converted into one or more other instructions that effect embarrassingly parallel execution by a GPU. Among such compilation rules may be rules that each cause the conversion of a particular type of loop of instructions into another type of loop more amenable to embarrassingly parallel execution by a GPU (e.g., a loop with a reduced quantity of iterations), and/or that cause the replacement of a particular type of loop of instructions with one or more other instructions for execution by a GPU in an embarrassingly parallel manner that does not entail the use of a loop. There may also be a set of compilation rules that are each associated with a particular type of data structure that may be instantiated or otherwise employed by the instructions of the task routine, and that cause the data structure to be converted into another data structure that is more amenable for use in embarrassingly parallel execution by a GPU.

Through the use of such conversions of instructions of one or more task routines, personnel who write the instructions of the task routines of an analysis routine may be provided with the opportunity to take advantage of the embarrassingly parallel processing capabilities of the one or more GPUs incorporated into at least some of the node devices without the need to write the instructions of the task routines specifically for embarrassingly parallel execution by GPUs. Stated differently, such personnel are able to be spared the need to acquire the skills to architect and write the instructions that implement the tasks of an analysis routine in a manner that is designed for embarrassingly parallel execution by GPUs. Additionally, where the node device grid includes node devices that incorporate different GPUs that do not share an instruction set, such personnel are further spared the need to architect and write different versions of the instructions of the task routines to address the differing idiosyncrasies of embarrassingly parallel execution by each of the different GPUs.

Regarding the storage resources about which the coordinating device may recurringly receive node data, each of the node devices may incorporate storage capabilities implemented as a combination of volatile and non-volatile storage. The volatile storage may be implemented with one or more storage components that employ a storage technology that enables relatively speedy access to data and/or routines, but which is unable to retain data and/or routines stored therein without a continuous supply of electrical power. Such technologies include, and are not limited to, any of a variety of types of random access memory (RAM). The non-volatile storage may be implemented with one or more storage components that employ a storage technology that is able to retain data and/or routines stored therein regardless of whether electric power continues to be provided, but which is unable to provide access that is as speedy as that provided by various volatile storage technologies on which the volatile storage may be based. Such technologies for non-volatile storage include, and are not limited to, the use of any of a variety of ferromagnetic and/or optical storage media.

Due to the speedier access provided by the volatile storage in comparison to the non-volatile storage, instructions in the process of being executed by the one or more CPUs and/or the one or more GPUs incorporated into each node device may be stored within volatile storage where they are able to be more speedily read, written and/or modified. However, due to what are often lower costs and/or higher storage densities of the non-volatile storage components in comparison to the volatile storage components, the non-volatile storage may be implemented to have a higher storage capacity than the volatile storage within each of the node devices. Although there may be data sets that are sufficiently small in size and/or that are distributed among a sufficiently large quantity of node devices as to cause each data set partition of the data set that is distributed to a node device to be sufficiently small as to be storable entirely within volatile storage, it is envisioned that the data set partitions of the majority of data sets are more likely to each be too large to do so.

As a result, within each node device, pages of routines being executed and/or of data being accessed by the one or more CPUs and/or the one or more GPUs may be swapped into volatile storage from non-volatile storage. As may be familiar to those skilled in the art, any of a variety of algorithms may be employed to select pages of routines and/or of data to be swapped into volatile storage, and/or to select pages to be retained within volatile storage while others are swapped back to non-volatile storage, including and not limited to, any of a variety of demand-based and/or predictive algorithms. In one or more embodiments, one or more of the node devices may execute an operating system (OS) that includes a paging component that performs such swapping of uniformly sized pages of routines and/or data. Depending on various factors, such as the types of operations performed, the frequency of accesses made to various pages of routines and/or of data, and/or the number of routines being executed in parallel, a page of a routine and/or of data may be retained within volatile storage for a longer or shorter period of time before it is swapped back to non-volatile storage to free up space within volatile storage for a different page of a routine and/or data. Thus, the storage of pages of routines and/or of data within volatile storage within each of the node devices may be time limited.

In node devices incorporating both one or more CPUs and one or more GPUs, there may be one volatile storage for the one or more CPUs and another volatile storage for the one or more GPUs. However, there may be a single non-volatile storage, and pages of routines and/or of data may be swapped between the single non-volatile storage and each of the two volatile storages. In some embodiments, operation of the one or more GPUs may be at least partially controlled by the one or more CPUs such that the one or more GPUs may not be operable entirely autonomously from the one or more CPUs. In such embodiments, the volatile storage associated with the one or more GPUs may also be accessible to the one or more CPUs, and a storage page management routine executed by the one or more CPUs to perform swapping of pages of routines and/or data for the one or more CPUs may also perform such swapping of pages of routines and/or of data for the one or more GPUs. As may be familiar to those skilled in the art, such swapping by the one or more CPUs on behalf of the one or more GPUs may arise due to a need for one or more driver routines to be executed by the one or more CPUs to enable access to the non-volatile storage and/or to make use of a file system employed in storing data and/or routines as files with the non-volatile storage. Thus, regardless of the exact manner in which each of the selected node devices is provided with a data set partition, such a received data set partition may be initially stored entirely within the non-volatile storage within each node device. Following such receipt and storage, pages of the received data set partition may then be swapped into the volatile storage of the one or more CPUs and/or the one or more GPUs as needed to support the performance of one or more tasks of an analysis routine with the data set partition.

Regarding the network access resources about which the coordinating device may recurringly receive node data, each of the node devices may incorporate a network interface to a network employed by the node device grid to communicatively couple the node devices to each other, to the coordinating device and/or to one or more storage devices (e.g., a storage device grid). The task routines executed by the CPU(s) and/or the GPU(s) to perform tasks of analysis routines may be distributed by the coordinating device to node devices via the network. Also, the data set partitions with which the tasks are performed may be transmitted from the one or more storage devices to node devices via the network, and data set partitions derived within node may be transmitted back to the one or more storage devices. As may be familiar to those skilled in the art, in some embodiments, the one or more GPUs of a node device may not be able to directly operate the network interface of the node device to effect exchanges of routines and/or data that are associated with a performance of a task by the one or more GPUs. Instead, in a manner similar to the swapping of pages associated with the one or more GPUs between volatile and non-volatile storage, the one or more CPUs of the node device may so operate the network interface on behalf of the one or more GPUs. Again, such action on behalf of the one or more GPUs by the one or more CPUs may be necessitated by a need for one or more driver routines to be executed by the one or more CPUs to enable access to the network interface.

Just as gaining access to routines and/or data stored within non-volatile storage of a node device may be considerably slower than gaining access to routines and/or data stored within volatile storage, gaining access to routines and/or data stored within another device through a network may be considerably slower still. Additionally, in some embodiments, gaining access to routines and/or data stored within either the non-volatile storage or within another device through the network may be even slower for the one or more GPUs due to their reliance on the one or more CPUs of the node device to take action to enable such access on behalf of the one or more GPUs. Thus, it may be deemed desirable, whenever possible, to maximize accesses made to routines and/or data while still stored within volatile storage associated with the CPU(s) and/or GPU(s) that make those accesses, and to minimize accesses made to routines and/or data while stored within non-volatile storage and/or within other devices such that access must be via the network. This may entail allowing some node devices of the node device grid to become idle for various periods of time to await the availability of particular node devices for use in performing particular tasks with particular data set partitions, rather than immediately assigning tasks to each node that becomes available for use in performing a task without regard to which node devices already have particular data set partitions within their storages. Stated differently, the assigning of a next task may be delayed for a period of time to allow a particular node device in which a particular data set partition is stored to become available again for being assigned a next task that involves the use of the particular data set partition, rather than immediately assigning the next task to another node device to which the particular data set partition would have to be transmitted. Additionally, where there are multiple tasks to be performed with a particular partition that are able to be performed using a GPU, delaying assignment of the next one of those multiple tasks to allow an opportunity to assign that next one of those tasks to a node device that incorporates a GPU and which already stores the particular data set partition may avoid a situation where immediately assigning the next task to the next available node device may result in assignment to a node device that does not incorporate a GPU, thereby resulting in slower performance of the next one of those tasks.

Thus, for example, as a first node device that was engaged in performing a first task of an analysis with a first data set partition of a data set completes its performance of the first task with the first data set partition, and thereby becomes available such that it could be assigned to perform a second task of the analysis with a second data set partition of the data set, the coordinating device may refrain from assigning the first node device to so perform the second task with the second data set partition for a predetermined period of time. The predetermined period of time may be selected to provide an opportunity for a second node device, that is still engaged in performing the first task with the second data set partition, to complete its performance of the first task with the second data set partition so that the second node device becomes able to be assigned to perform the second task with the second data set partition. However, if the second node device does not become available to be assigned to perform the second task with the second data set partition, then another node device in which the second data set partition is not already stored may be assigned that performance (e.g., the first node device). Alternatively, in other embodiments, if there is still another node device in which the second data set partition was also stored in preparation for using that other node device as a backup in response to a failure by a node device performing a task with the second data set portion, and if the second node device does not become available to be assigned to perform the second task with the second data set partition, and if such another node device is currently available to be so assigned, then such another node device may be so assigned.

In this way, advantage may be taken of the fact that the second data set partition is already stored within the volatile and/or non-volatile storages of the second node device such that the second data set partition need not be exchanged between devices to enable the performance of the second task with the second data set partition by another node device. Stated differently, had the performance of the second task with the second data set partition been assigned to the first node device, then the second data set partition would have needed to be transmitted to the first node device either from the second node device or from the one or more storage devices. In addition to the consumption of available bandwidth of the network and of the network interface of at least the first node device, performance by the first node device of the second task with the second data set partition would necessarily be delayed until at least enough of the second data set partition would be received by the first node device to enable that performance to begin.

By way of another example, each of a first node device that was engaged in performing a first task of an analysis routine to generate a first data set partition of a data set, and a second node device that was engaged in performing the first task to generate a second data set partition of the data set may both complete their performances of the first task. However, while the first node device may be available to be assigned another task, the second node device (as a result of sharing of node devices among multiple unrelated analyses) may be engaged in performing a task of an unrelated analysis routine such that the second node device may not yet be available to be assigned to perform a second task of the analysis routine with the second data set partition that the second node device, itself, generated. Again, the coordinating device may refrain from assigning the first node device to perform the second task with the second data set partition for a predetermined period of time. The predetermined period of time may be selected to provide an opportunity for the second node device to complete its performance of the task of the unrelated analysis routine so that the second node device becomes available to be assigned to perform the second task with the second data set partition. Again, in this way, advantage may be taken of the fact that the second data set partition is already stored within the volatile and/or non-volatile storages of the second node device such that the second data set partition need not be exchanged between devices to enable the performance of the second task with the second data set partition by another node device.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
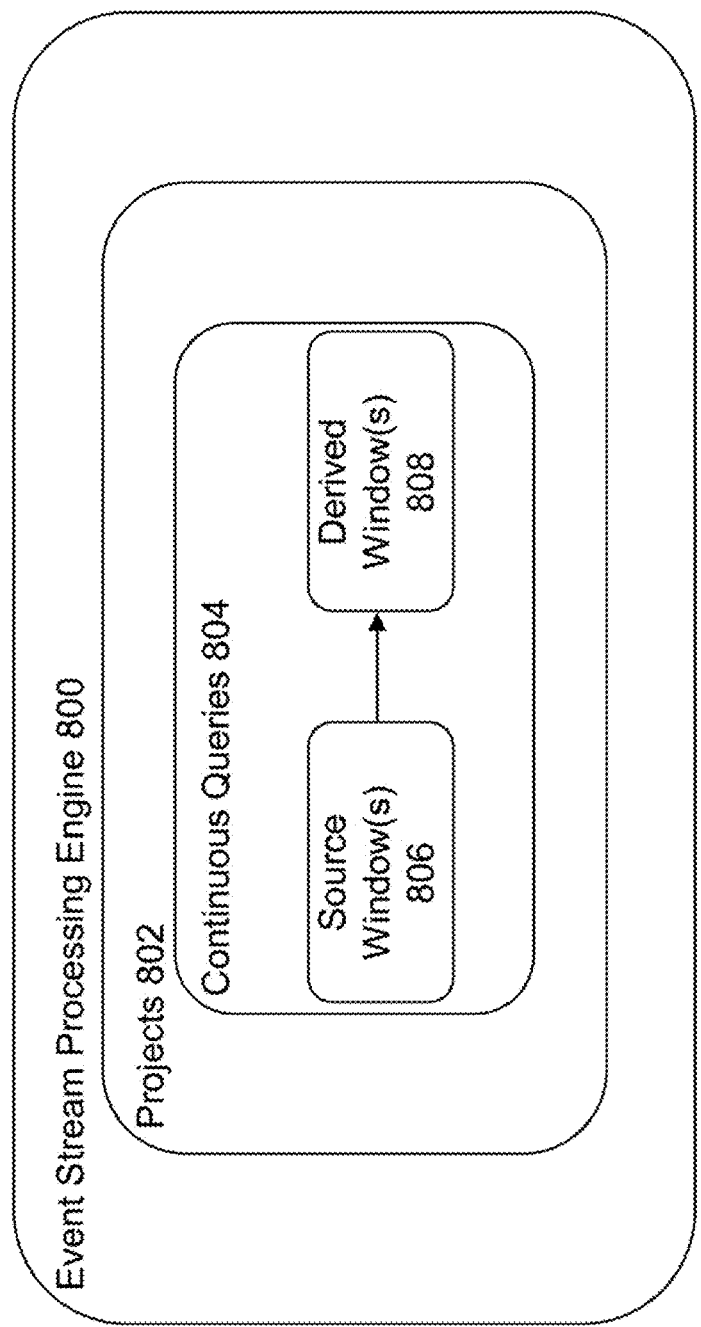
FIG. 8 illustrates a block diagram including components of an Event Stream Processing Engine (ESPE), according to embodiments of the present technology.
Figure 9:
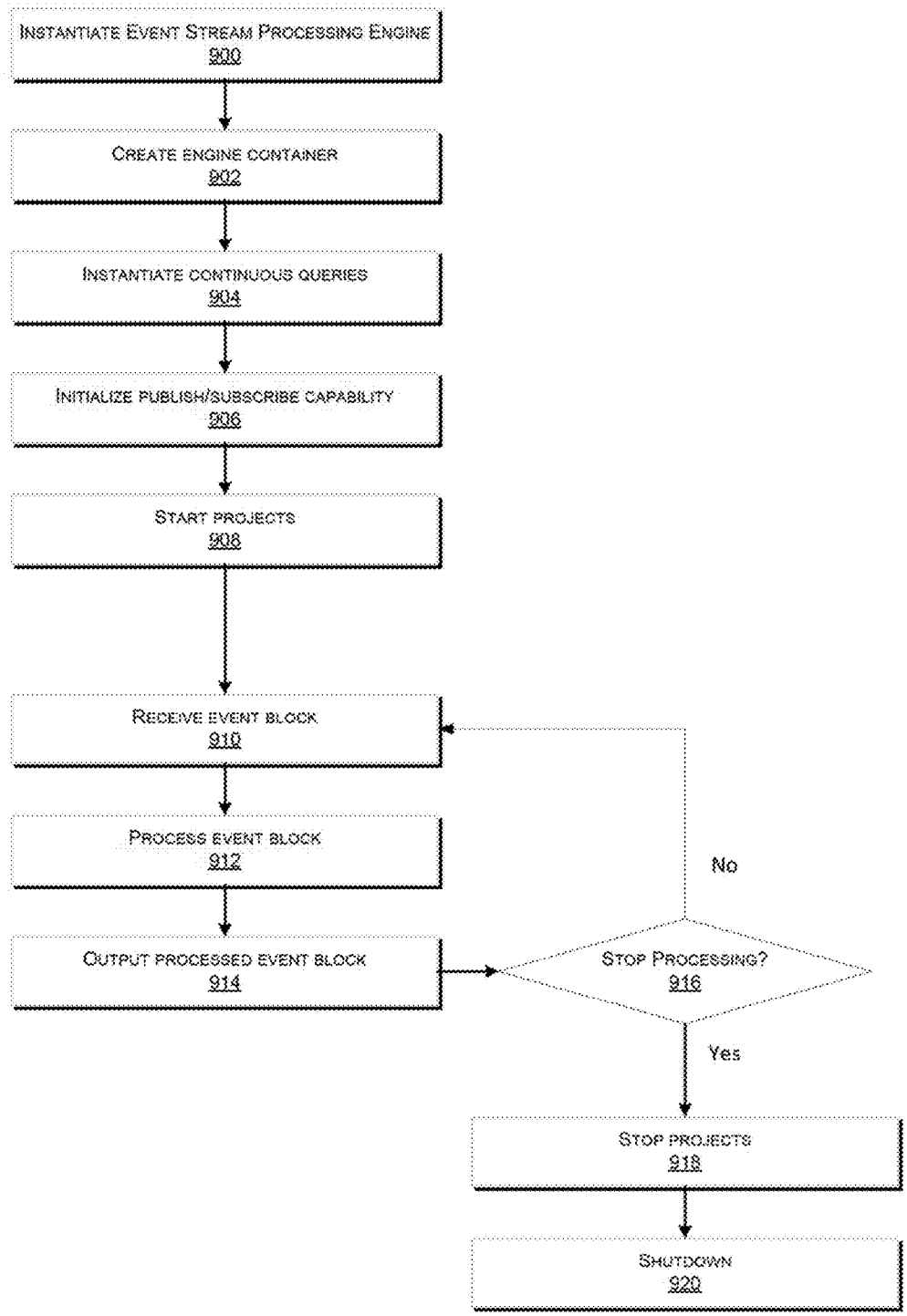
FIG. 9 illustrates a flow chart showing an example process including operations performed by an event stream processing engine, according to some embodiments of the present technology.
Figure 10:
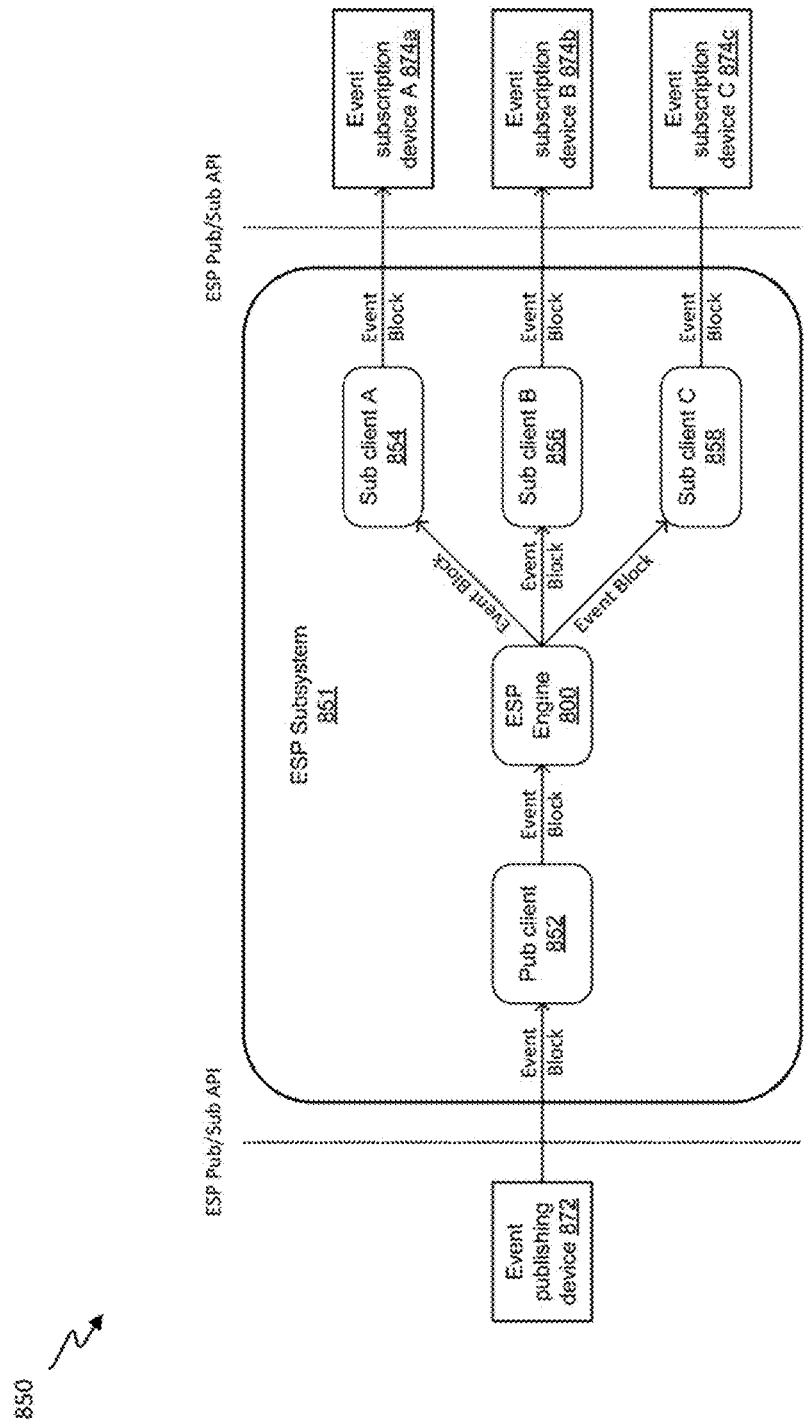
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
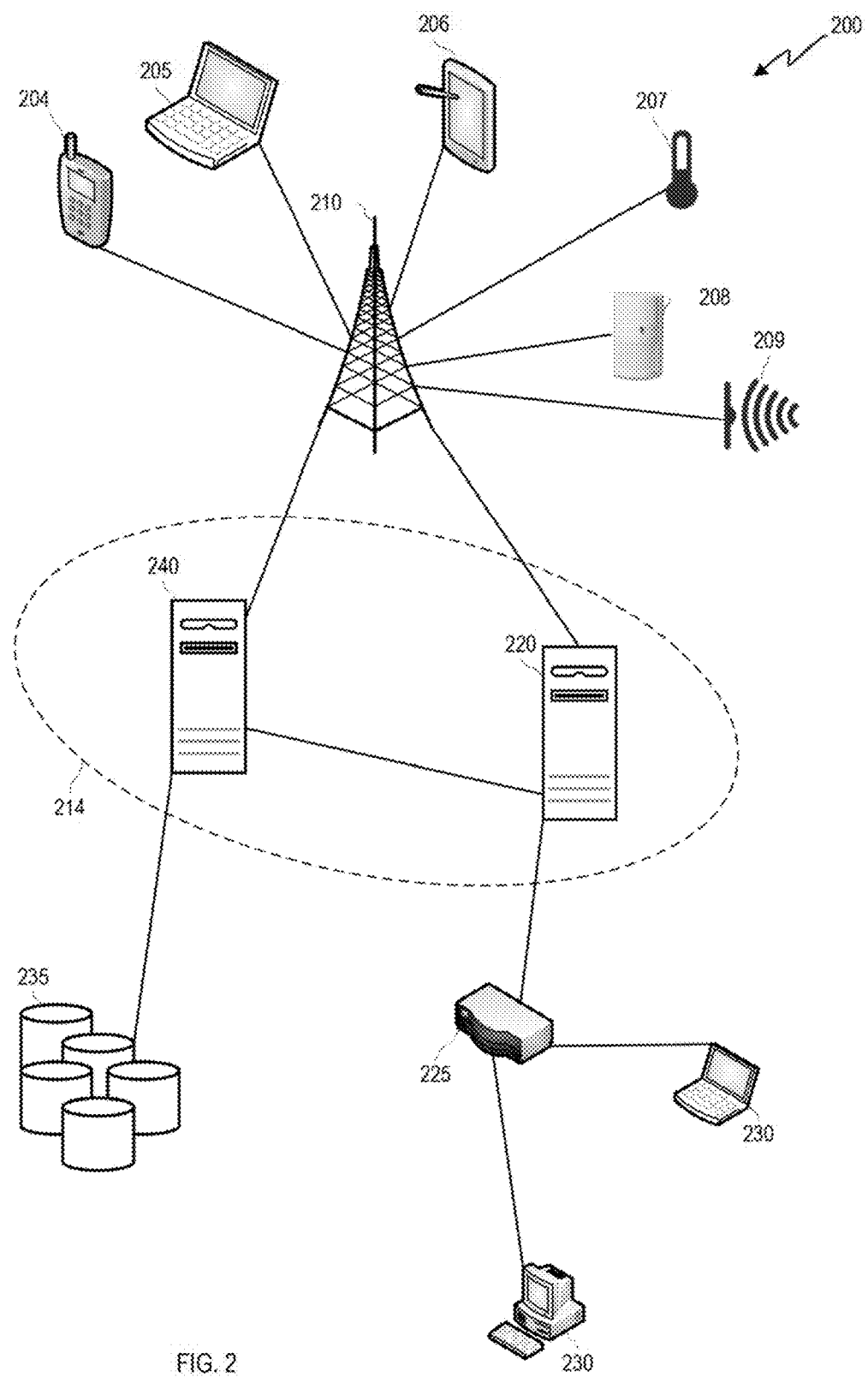
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
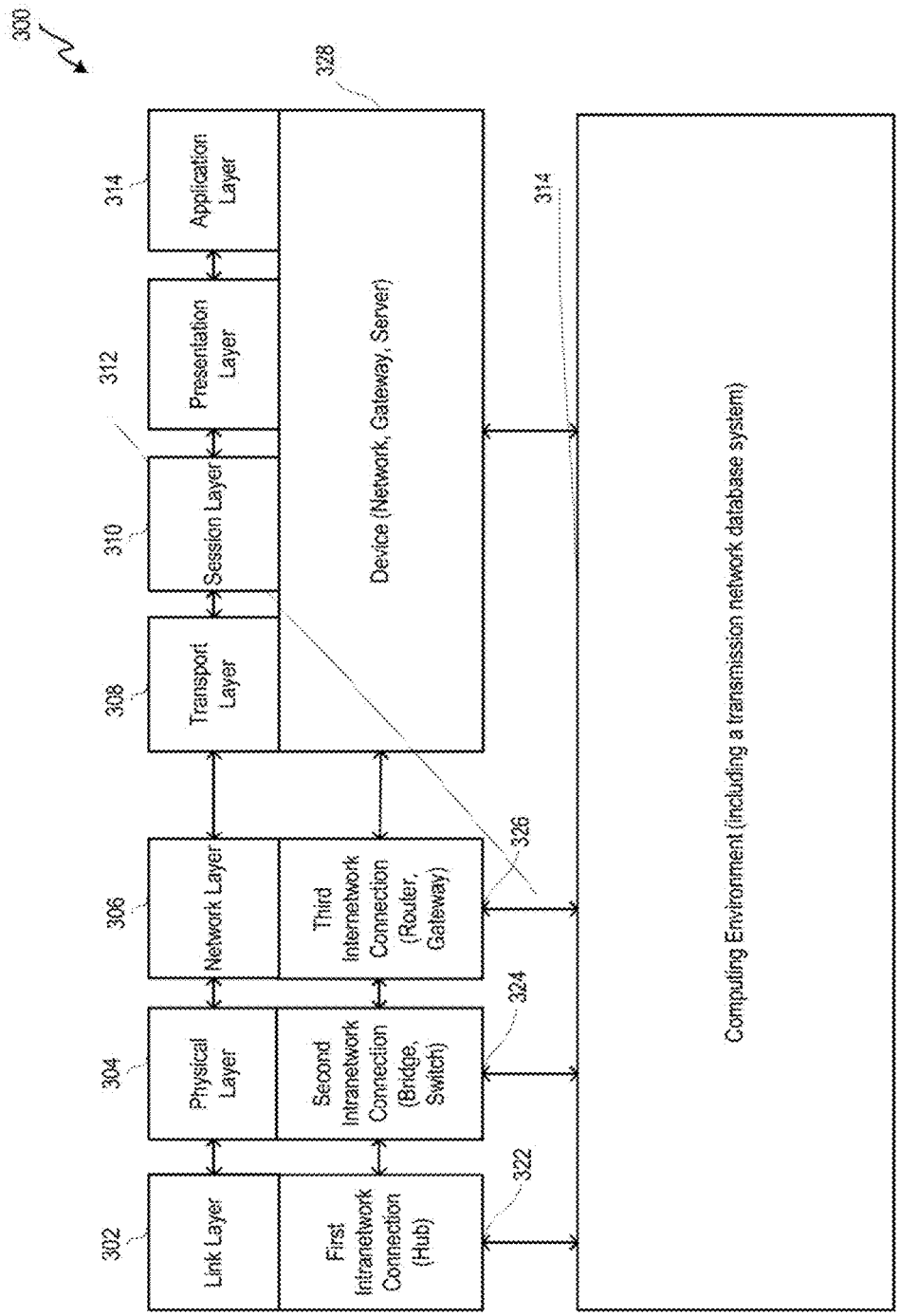
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
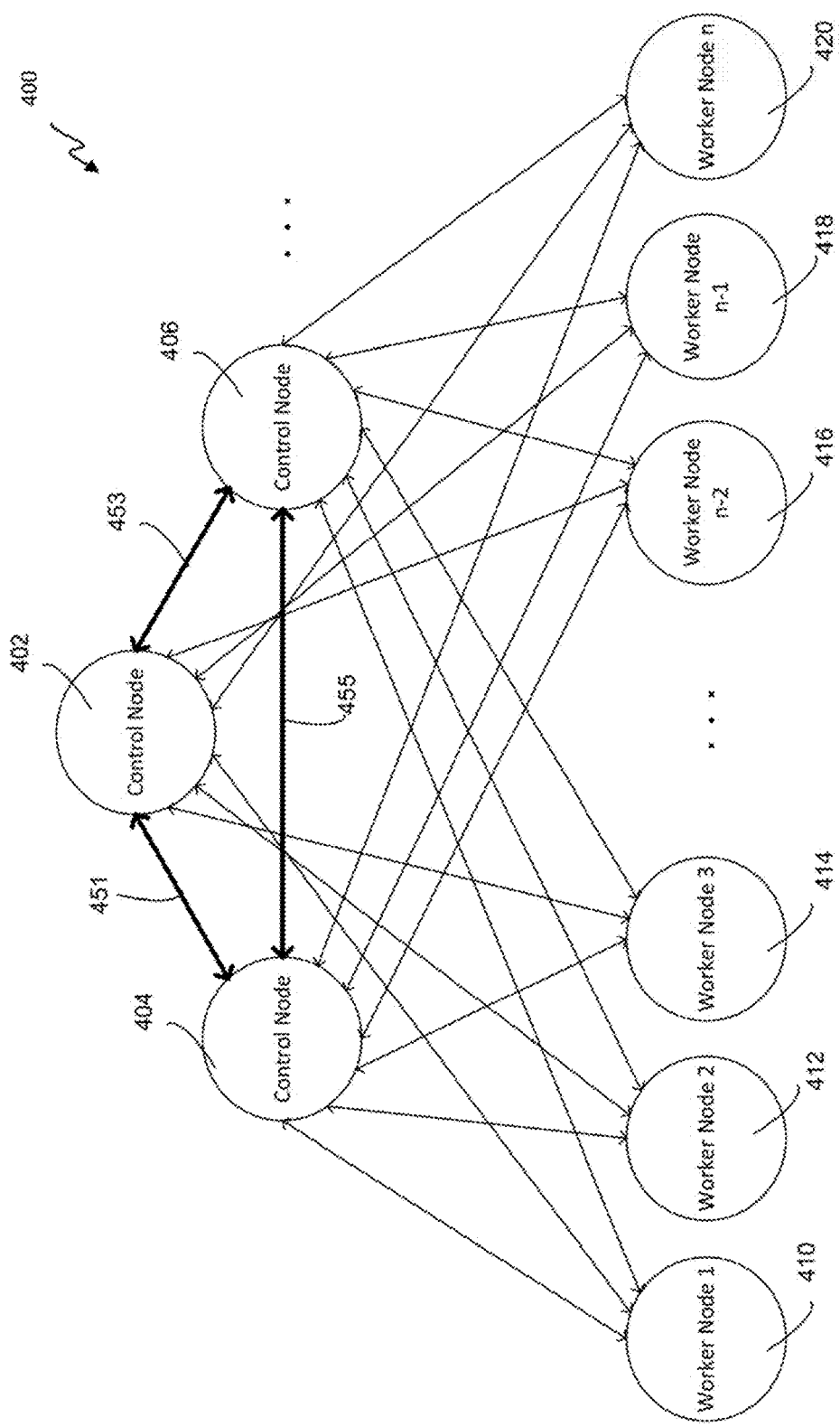
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
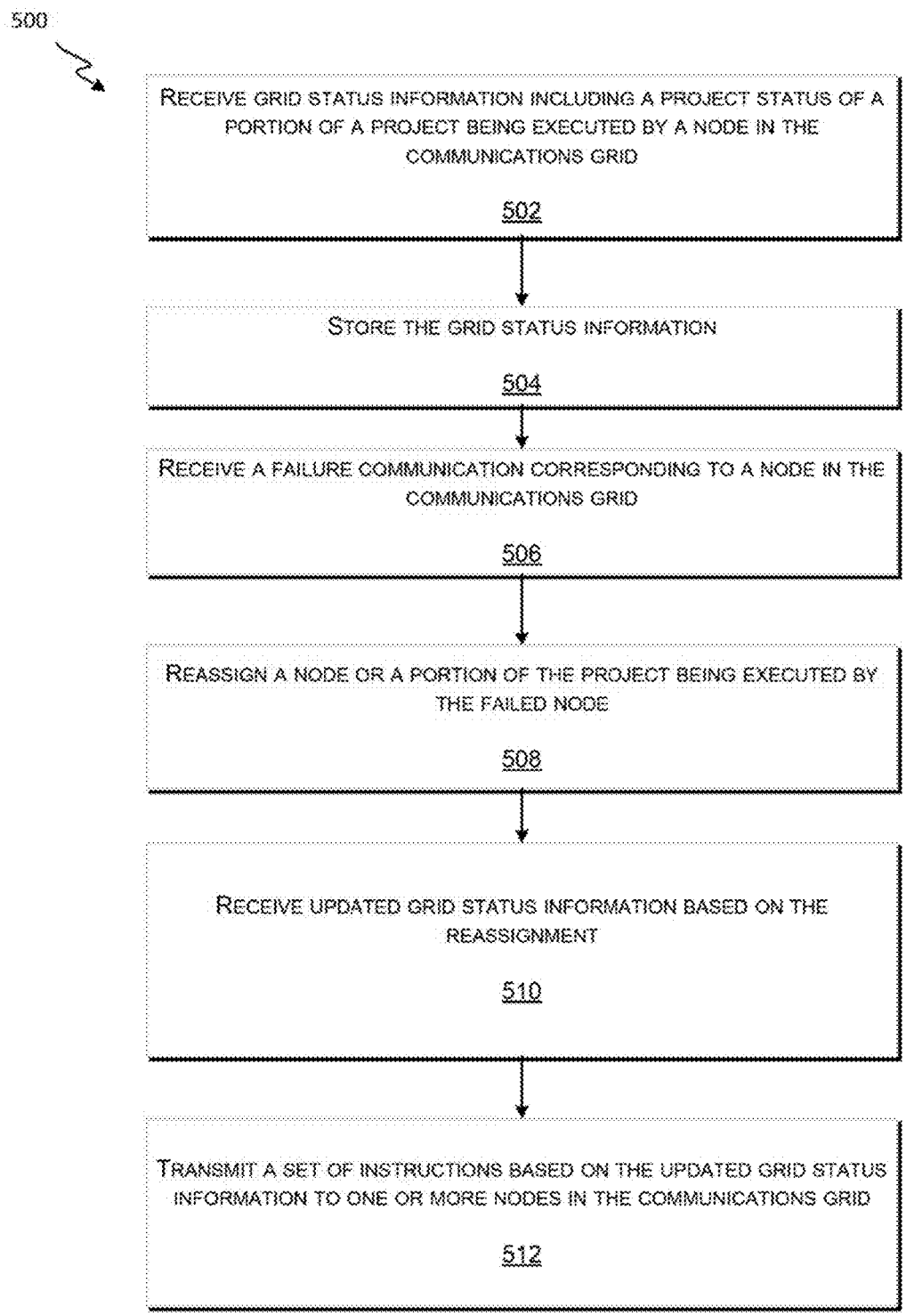
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
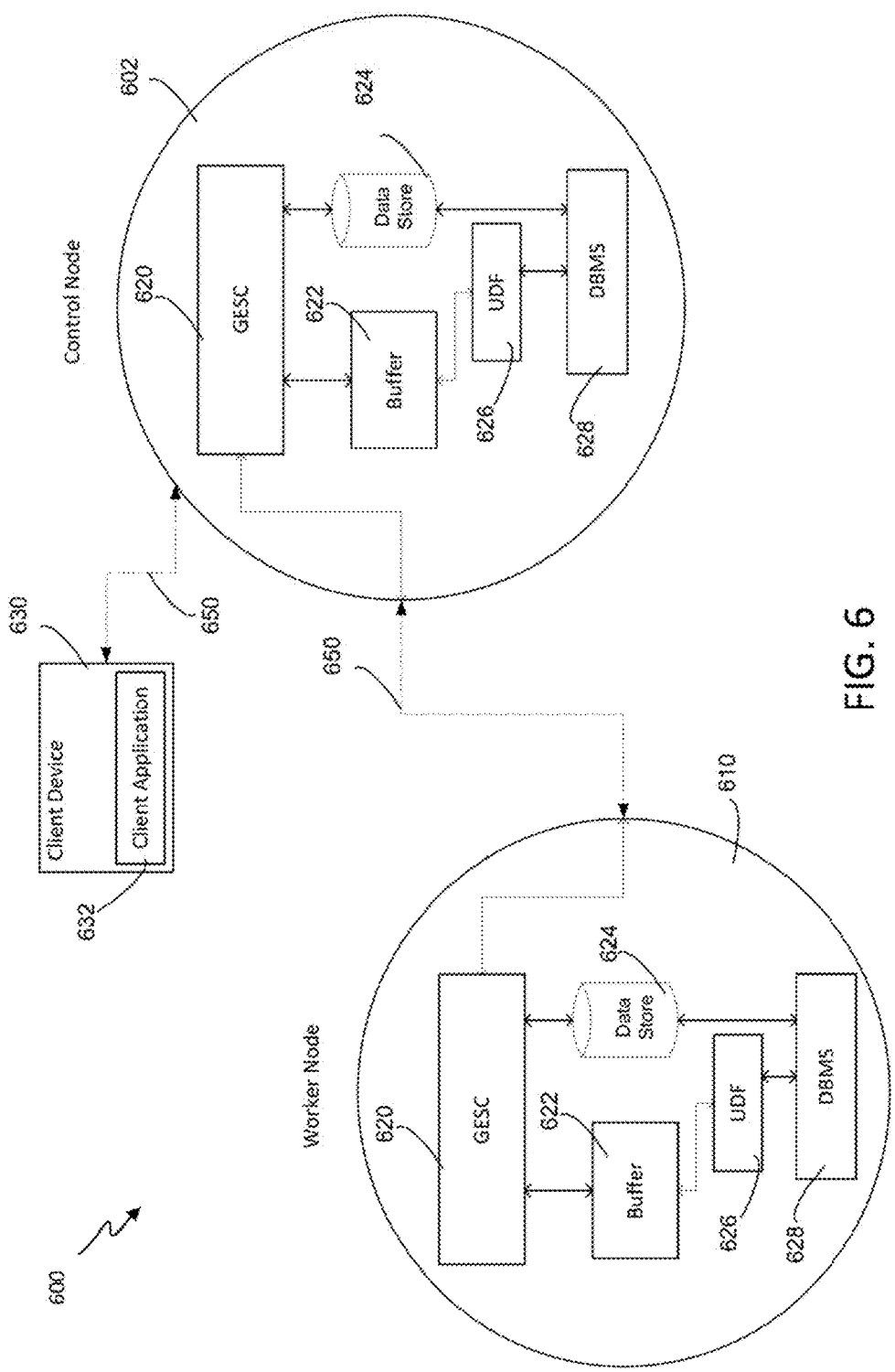
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
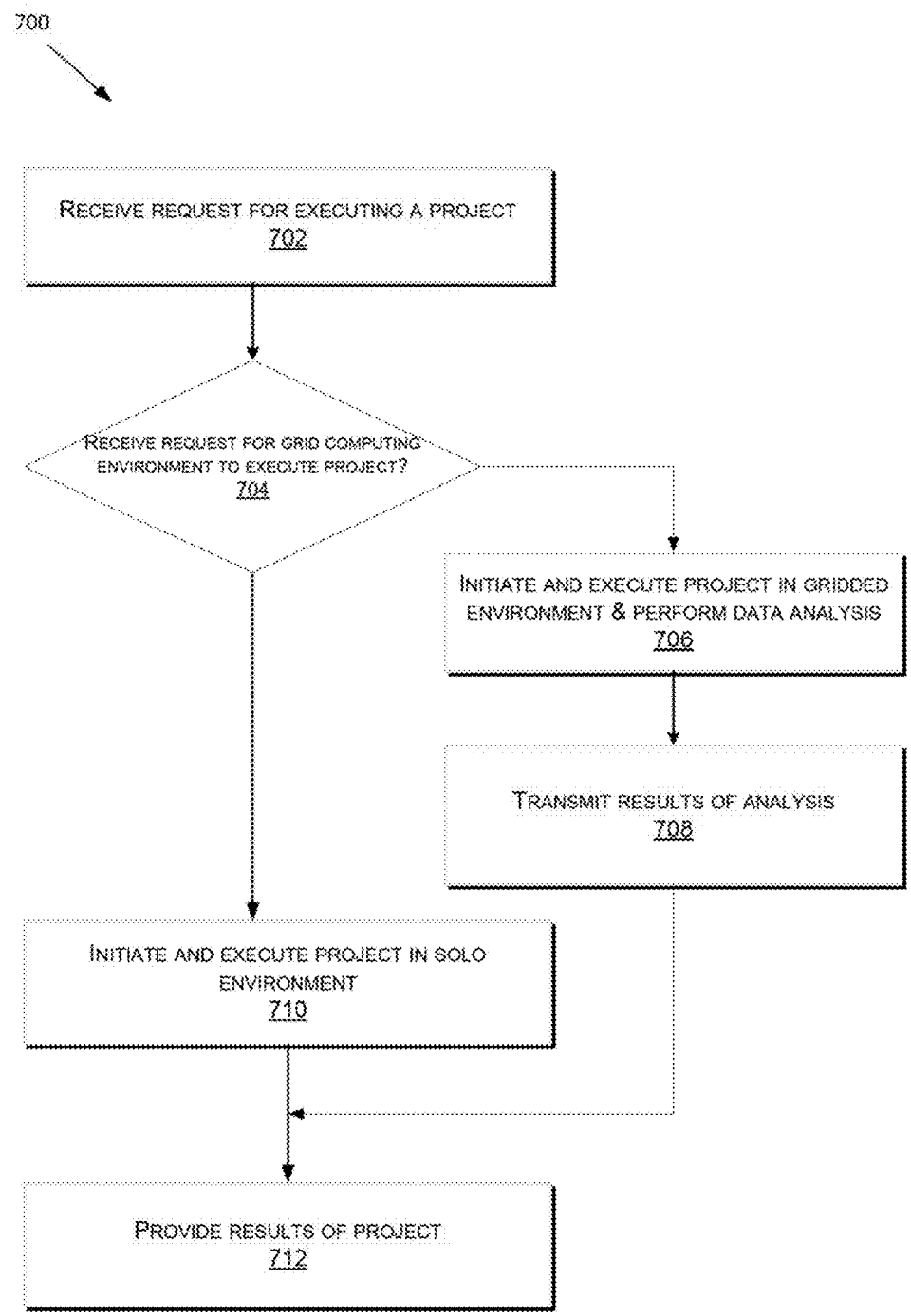
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects. The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
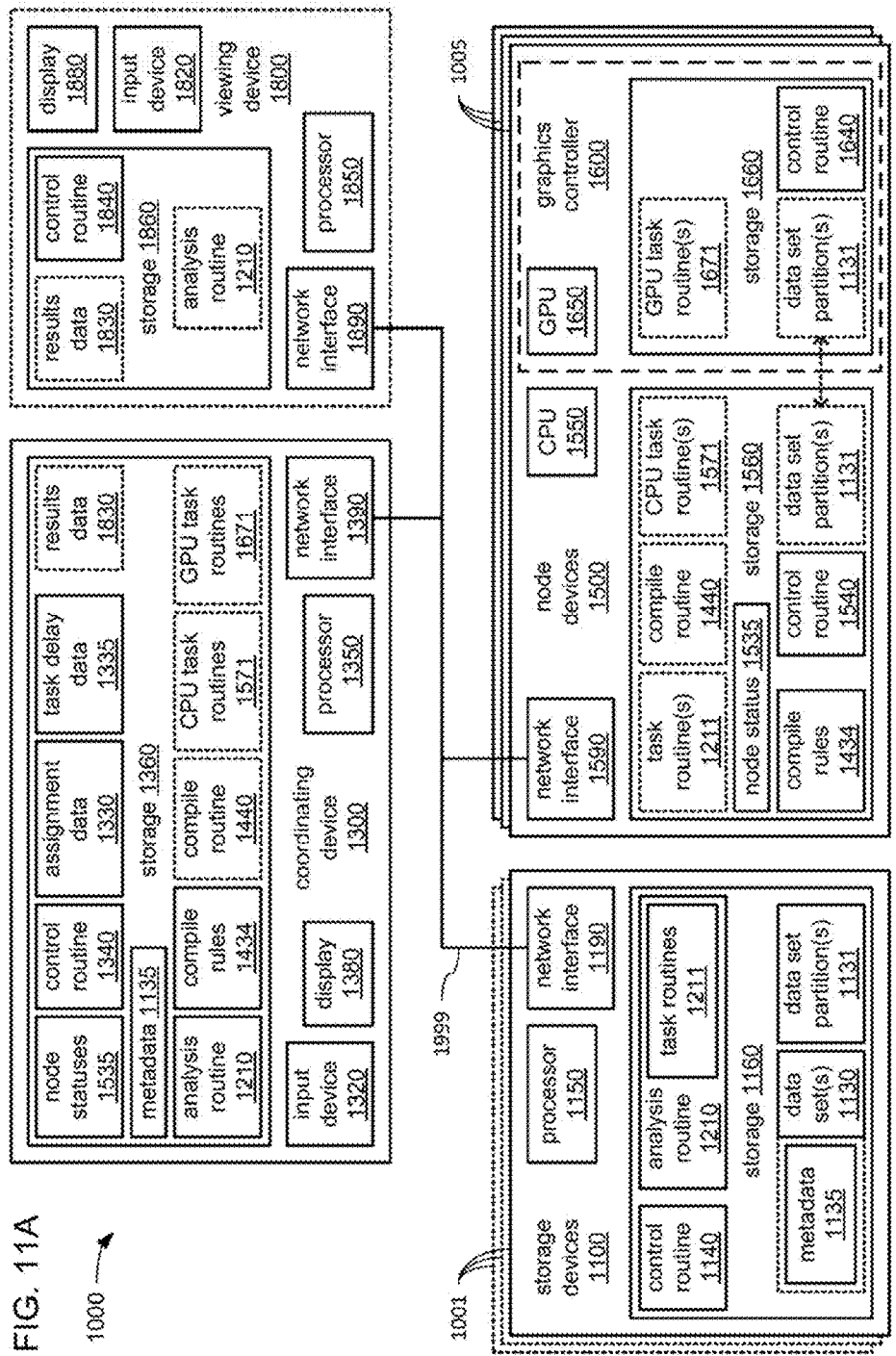
FIGS. 11A and 11B each illustrate an example embodiment of a distributed processing system.
Figure 11B:
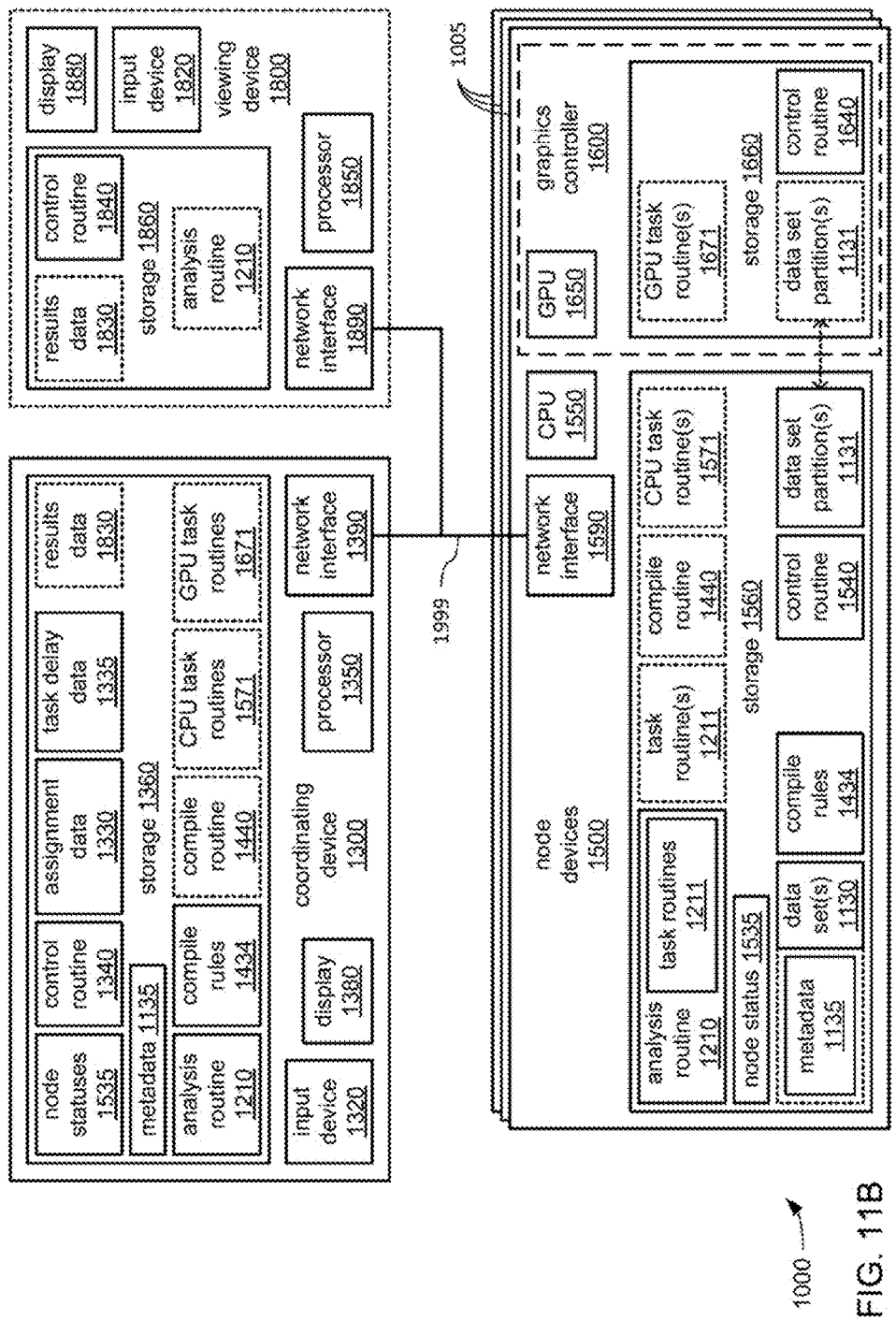

FIG. 11A illustrates a block diagram of an example embodiment of a distributed processing system 1000 incorporating one or more storage devices 1100 that may form a storage device grid 1001, a coordinating device 1300, multiple node devices 1500 that may form a node device grid 1005, and/or a viewing device 1800. FIG. 11B illustrates a block diagram of an alternate example embodiment of the distributed processing system 1000 in which an alternate embodiment of the node devices 1500 incorporates features of and/or perform functions of the one or more storage devices 1100. In both of these of embodiments of the distributed processing system 1000, and as will be explained in greater detail, the node devices 1500 may be operated together as the grid 1005 under the control of the coordinating device 1300, wherein each of multiple ones of the node devices 1500 performs the same task at least partially in parallel with a different one of multiple data set partitions 1131 of a data set 1130 that are distributed among the multiple node devices 1500.

As depicted, these devices 1100, 1300, 1500 and 1800 may exchange communications thereamong related to the assignment and performance of tasks of an analysis routine 1210 with one or more data sets 1130. Such communications may include the exchange of node statuses 1535, data set partitions 1131 and/or metadata 1135 of a data set 1130, the analysis routine 1210 and/or task routines 1211 thereof, CPU task routines 1571, GPU task routines 1671 and/or results data 1830. However, one or more of the devices 1100, 1300, 1500 and/or 1800 may also exchange, via the network 1999, other data entirely unrelated to any assignment or performance of tasks of any analysis routine. In various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

Turning to FIG. 11A, in various embodiments, each of the one or more storage devices 1100 may incorporate one or more of a processor 1150, a storage 1160 and a network interface 1190 to couple each of the one or more storage devices 1100 to the network 1999. The storage 1160 may store a control routine 1140, one or more analysis routines 1210 that may each incorporate one or more task routines 1211, one or more data sets 1330 that may each incorporate metadata 1135, and/or one or more data set partitions 1131 of the one or more data sets 1130. The control routine 1140 may incorporate a sequence of instructions operative on the processor 1150 of each of the one or more storage devices 1100 to implement logic to perform various functions. The processor 1150 of each of the storage devices 1100 may operate the network interface 1190 to exchange the analysis routine 1210 and/or one or more of the task routines 1211 thereof with the coordinating device 1300. Alternatively or additionally, the processor 1150 of each of the storage devices may operate the network interface 1190 to coordinate exchanges of one or more data set partitions 1131 with one or more of the node devices 1500 via the network 1999 with the coordinating device 1300, as well as to effect such exchanges. In embodiments in which multiple ones of the storage devices 1100 are operated together as the storage device grid 1001, the sequence of instructions of the control routine 1140 may be operative on the processor 1150 of each of those storage devices 1100 to perform various functions at least partially in parallel with the processors 1150 of others of the storage devices 1100.

In some embodiments, the processors 1150 of the storage devices 1100 may cooperate to perform a collection function in which each of the processors 1150 operates a corresponding one of the network interfaces 1190 to receive data items of one or more of the data sets 1130 via the network 1999, and may assemble the data items into the one or more data sets 1130 over a period of time. In such embodiments, data items of a data set 1130 may be received via the network 1999 and/or in other ways from one or more other devices (not shown). By way of example, a multitude of remotely located sensor devices (e.g., geological sensors dispersed about a particular geological region, or particle detection sensors disposed at various portions of a particle accelerator) may generate numerous data items that are then provided via the network 1999 to the storage devices 1100 where the numerous data items are then assembled to form a data set 1130. In other embodiments, the storage devices 1100 may receive one or more of the data sets 1130 from a multitude of other devices (not shown), such as a grid of other node devices. By way of example, such other devices may perform one or more processing operations that generates a data set 1130 (e.g., employ a Bayesian analysis to derive a prediction of the behavior of people in a simulation of evacuating a burning building, or to derive a prediction of behavior of structural components of a bridge in response to various wind flows), and may then transmit a data set 1130 as an output to the storage device grid 1001.

Each of the one or more data sets 1130 may include any of a wide variety of types of data associated with any of a wide variety of subjects. By way of example, each of the data sets 1130 may include scientific observation data concerning geological and/or meteorological events, or from sensors employed in laboratory experiments in areas such as chemistry or physics. By way of another example, the data set may include indications of activities performed by a random sample of individuals of a population of people in a selected country or municipality, or of a population of a threatened species under study in the wild. As depicted, each of the data sets 1130 may incorporate metadata 1135 that provides indications of structural features, including and not limited to, aspects of the manner in which data items are organized and/or are made accessible within each data set 1130.

The tasks that the task routines 1211 of the analysis routine 1210 may cause one or more processors to perform may include any of a variety of data analysis tasks, data transformation tasks and/or data normalization tasks. The data analysis tasks may include, and are not limited to, searches and/or statistical analyses that entail derivation of approximations, numerical characterizations, models, evaluations of hypotheses, or predictions (e.g., a prediction by Bayesian analysis of actions of a crowd trying to escape a burning building, or of the behavior of bridge components in response to a wind forces). The data transformation tasks may include, and are not limited to, sorting, row and/or column-based mathematical operations, row and/or column-based filtering using one or more data items of a row or column, and/or reordering data items within a data object. The data normalization tasks may include, and are not limited to, normalizing times of day, dates, monetary values (e.g., normalizing to a single unit of currency), character spacing, use of delimiter characters (e.g., normalizing use of periods and commas in numeric values), use of formatting codes, use of big or little Endian encoding, use or lack of use of sign bits, quantities of bits used to represent integers and/or floating point values (e.g., bytes, words, doublewords or quadwords), etc.

In various embodiments, the coordinating device 1300 may incorporate one or more of a processor 1350, a storage 1360, an input device 1320, a display 1380, and a network interface 1390 to couple the coordinating device 1300 to the network 1999. The storage 1360 may store a control routine 1340, the metadata 1135 of a data set 1130, the analysis routine 1210, node statuses 1535, assignment data 1330, task delay data 1335, a compile routine 1440, compile rules 1434, the CPU task routines 1571, the GPU task routines 1671, and/or the results data 1830. The control routine 1340 and the compile routine 1440 (if present within the storage 1360) may each incorporate a sequence of instructions operative on the processor 1350 to implement logic to perform various functions.

In various embodiments, each of the node devices 1500 may incorporate one or more of a CPU 1550, a storage 1560 and a network interface 1590 to couple each of the node devices 1500 to the network 1999. The storage 1560 may store a control routine 1540, one or more data set partitions 1131, an instance of the node status 1535, the compile routine 1440, the compile rules 1434, one or more of the task routines 1211, and/or one or more of the CPU task routines 1571. The control routine 1540 and the compile routine 1440 (if present within the storage 1560) may incorporate a sequence of instructions operative on the CPU 1550 of each of the node devices 1500 to implement logic to perform various functions. In embodiments in which multiple ones of the node devices 1500 are operated together as the node device grid 1005, the sequence of instructions of the control routine 1540 may be operative on the CPU 1550 of each of those node devices 1500 to perform various functions at least partially in parallel with the CPUs 1550 of others of the node devices 1500.

At least a subset of the node devices 1500 may additionally incorporate a graphics controller 1600 that may incorporate one or more of a GPU 1650 and a storage 1660. The storage 1660 may store a control routine 1640, one or more data set partitions 1131, and/or one or more of the GPU task routines 1671. The control routine 1640 may incorporate a sequence of instructions operative on the GPU 1650 of each of the node devices 1600 that incorporates the graphics controller 1600 to implement logic to perform various functions. In embodiments in which multiple ones of the node devices 1600 are operated together as the node device grid 1005, the sequence of instructions of the control routine 1640 may be operative on the GPU 1650 of the graphics controller 1600 of each of those node devices 1500 to perform various functions at least partially in parallel with the GPUs 1650 of graphics controller 1600 of others of the node devices 1500.

Figure 12:
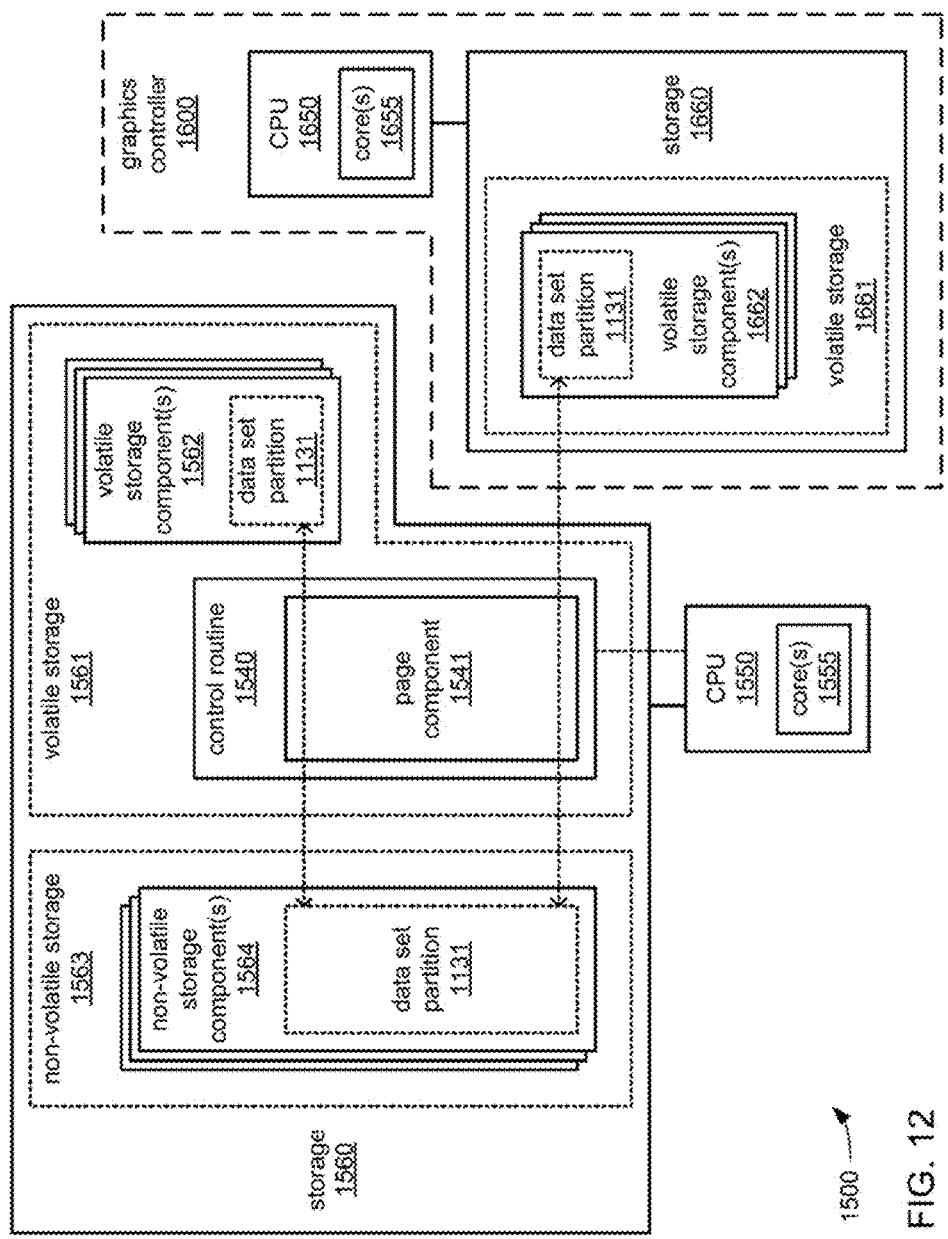
FIG. 12 illustrates an example embodiment of page swapping.

As depicted in FIG. 12, the storage 1560 may be divided into a volatile storage 1561 and a non-volatile storage 1563, and the storage 1660 may include a volatile storage 1661, but may not include non-volatile storage. The volatile storages 1561 and 1661 may each be implemented with one or more volatile storage components 1562 and 1662, respectively. The volatile storage components 1562 and 1662 may each employ any of a variety of storage technologies that enable relatively speedy access to data and/or routines stored therein (e.g., the depicted example data set partition 1131), but which is unable to retain data and/or routines stored therein without a continuous supply of electrical power. Such technologies include, and are not limited to, any of a variety of types of random access memory (RAM). The non-volatile storage 1563 may be implemented with one or more non-volatile storage components 1564. The one or more non-volatile storage components 1564 may each employ a storage technology that is able to retain data and/or routines stored therein regardless of whether electric power continues to be provided, but which is unable to provide access to data and/or routines that is as speedy as that provided by various volatile storage technologies on which the volatile storages 1561 and/or 1661 may be based. Such technologies include, and are not limited to, any of a variety of technologies that employ ferromagnetic and/or optical storage media.

Due to differences in their respective technologies, the non-volatile storage 1563 may have considerably greater storage capacity than either of the volatile storages 1561 or 1661. Thus, pages of data and/or routines stored within the non-volatile storage 1563 may be swapped into and out of each of the volatile storages 1561 and 1661 as a mechanism to enable the CPU 1550 and GPU 1650 to make use of the speedier access of the volatile storages 1561 and 1661, respectively, while overcoming the more limited storage capacities of each. More specifically, and as also depicted, and the CPU 1550 may be caused by execution of a page component 1541 of the control routine 1540 to effect such page swapping in support of both its own operation and the operation of the GPU 1650. The need to employ the CPU 1550 to perform page swapping on behalf of the GPU 1650 may arise from the use of one or more driver routines (not shown) executed by the CPU 1550 to enable the CPU 1550 to access the one or more non-volatile storage components 1564.

Returning to FIG. 11A, in various embodiments, the viewing device 1800 incorporates one or more of a processor 1850, a storage 1860, an input device 1820, a display 1880, and a network interface 1890 to couple the viewing device 1800 to the network 1999. The storage 1860 may store one or more of a control routine 1840, the analysis routine 1210, and the results data 1830. The control routine 1840 may incorporate a sequence of instructions operative on the processor 1850 to implement logic to perform various functions. The processor 1850 may be caused by its execution of the control routine 1840 to operate the network interface 1890 to receive the results data 1830 from one of the node devices 1500 or from the coordinating device 1300 via the network 1999 following completion of execution of the analysis routine 1210. In some embodiments, the processor 1850 may also be caused to generate a visualization based on the results data 1830 to present a depiction of the results of the performance, by multiple ones of the node devices 1500, of the tasks of the task routines 1211 of the analysis routine 1210 on the display 1880.

Alternatively or additionally, the processor 1850 may be caused by its execution of the control routine 1840 to operate the display 1880 and/or the input device 1820 to provide a user interface by which an operator of the viewing device 1800 may provide input thereto. Such input may include a command for the execution of the analysis routine 1210 across multiple ones of the node devices 1500 of the node device grid 1005 to perform an analysis with at least one of the data sets 1130 stored by the one or more storage devices 1100. In response to receipt of the input command, the processor 1850 may be caused to operate the network interface 1890 to convey the command and/or the analysis routine 1210 to the coordinating device 1300 via the network 1999.

Turning to FIG. 11B, the alternate example embodiment of the distributed processing system 1000 depicted therein differs from the example embodiment of FIG. 11A by not including the one or more storage devices 1100. Instead, the node devices 1500 of the alternate example embodiment of FIG. 11B may directly perform the function of storing the one or more data sets 1130, thereby obviating the need for the one or more storage devices 1100 of the example embodiment of the distributed processing system 1000 of FIG. 11A.

Referring to both of the embodiments of both FIGS. 11A and 11B, it should be noted that, in some embodiments, the functions performed by the coordinating device 1300 may be performed by one of the node devices 1500 in lieu of the coordinating device 1300 doing so (e.g., embodiments that do not include the coordinating device 1300). In such embodiments, such a one of the node devices 1500 may additionally receive the metadata 1135 of one of the data sets 1130 from one of the storage devices 1100 (or from one of the other node devices 1500 in embodiments in which the node devices 1500 perform the storage function of the one or more storage devices 1100). Also, such a one of the node devices 1500 may additionally receive the node statuses 1535 from others of the node devices 1500. Further, such a one of the node devices 1300 may additionally transmit the task routines 1211, the CPU task routines 1571 and/or the GPU task routines 1671 to others of the node devices 1500.

Figure 13A:
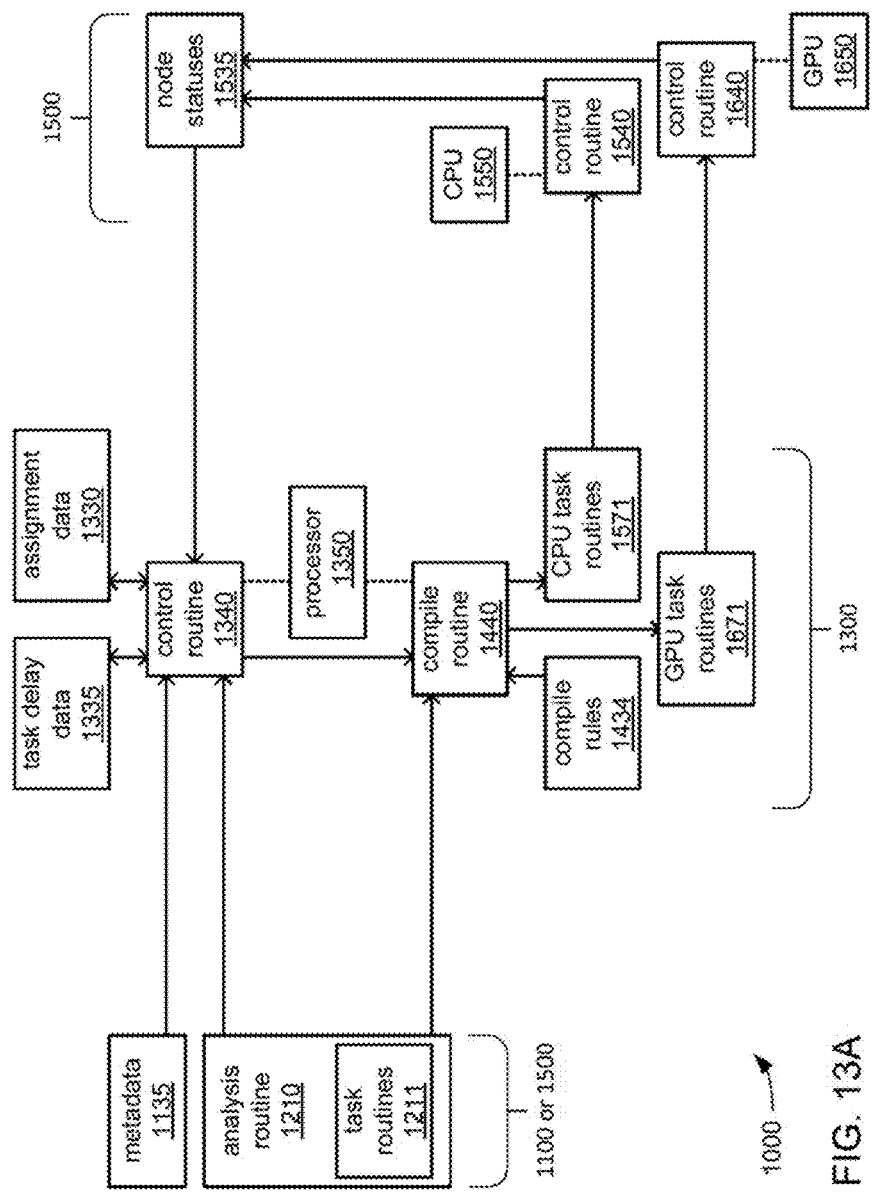
FIGS. 13A and 13B each illustrate an example embodiment of assigning the performance of tasks of an analysis routine to node devices of a distributed processing system.
Figure 13B:
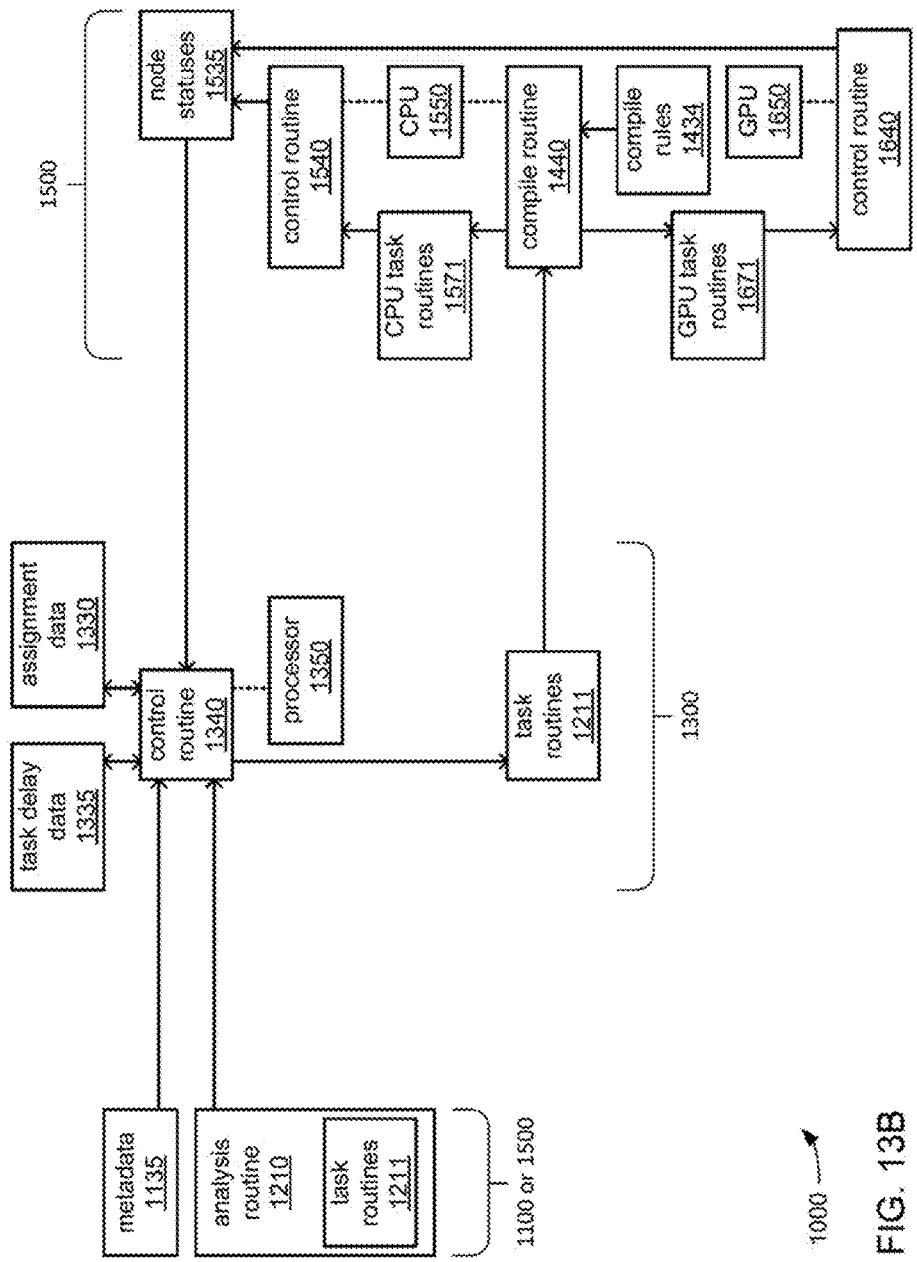

FIG. 13A illustrates an example embodiment of assignment of tasks and compilation of task routines that may be performed by the coordinating device 1300 in either of the example embodiments of the distributed processing system 1000 of either of FIG. 11A or 11B. FIG. 13B illustrates an alternate example embodiment of assignment of tasks that may be performed by the coordinating device, while compilation of task routines may be performed by the node devices 1500 that are selected to be assigned to perform the tasks in either of the example embodiments of the distributed processing system 1000 of either of FIG. 11A or 11B.

Turning to FIG. 13A, in executing the control routine 1340, the processor 1350 of the coordinating device 1300 may be caused to receive metadata 1135 indicative of structural features of one of the data sets 1130, and/or the analysis routine 1210 from the one or more storage devices 1100 and/or the viewing device 1700. The processor 1350 may also be caused to receive, from the node devices 1500, the node statuses 1535 indicative of processing, storage and/or network access resources incorporated into each of the node devices 1500, as well as the degree to which each of those resources is currently available. The processor 1350 may employ the metadata 1135, the analysis routine 1210 and/or the node statuses 1535 to derive initial assignments of at least one initial task of the analysis routine 1210 to selected ones of the node devices 1500, as well as an initial distribution of data set partitions 1131 to the selected ones of the node devices 1500.

In executing the compile routine 1440, the processor 1350 may be caused to analyze the executable instructions within each of the task routines 1211 of the analysis routine 1210 to identify ones of the task routines 1211 that are able to be compiled for embarrassingly parallel execution by the GPUs 1650 that may be incorporated into at least a subset of the node devices 1500. Ones of the task routines 1211 that are able to be so compiled for the GPUs 1650 may be compiled by the processor 1350 into corresponding GPU task routines 1671 that are able to be executed by the GPUs 1650. However, ones of the task routines 1211 that are not able to be so compiled for the GPUs 1650 may be compiled by the processor 1350 into corresponding CPU task routines 1571 that are able to be executed by the CPUs 1550 of the node devices 1500. The processor 1350 may then be caused to distribute the one or more CPU task routines 1571 and/or the one or more GPU task routines 1671 for the at least one initial task to the selected ones of the node devices 1500 as part of assigning the at least one initial task.

In executing the control routine 1540, the CPU 1550 of each of the selected ones of the node devices 1500 may receive and store the one or more CPU task routines 1571 and/or the one or more GPU task routines 1671 for the at least one initial task, as well as at least one of the initially distributed data set partitions 1131. Where a CPU task routine 1571 is received, the CPU 1550 may be caused to execute the CPU task routine 1571 to perform a task with the at least one received data set partition 1131. Where a GPU task routine 1671 is received, the CPU 1550 may be caused to relay the GPU task routine 1671 to the GPU 1650 within the graphics controller 1600 of the node device 1500, along with the at least one received data set partition 1131, where the GPU 1650 may be caused by the control routine 1640 to execute the GPU task routine 1671 to perform a task with the at least one received data set partition 1131.

Regardless of whether the CPU 1550 or a GPU 1650 of each node device 1500 performs a task with a corresponding data set partition 1131, the CPU 1550 and/or the GPU 1650 may be caused to recurringly update a corresponding one of the node status 1535 with indications of what task(s) are currently being performed and/or the degree to which various resources are currently available as a result. The CPU 1550 of each node device 1500 may be caused by further execution of the control routine 1540 to recurringly transmit the corresponding node status 1535 to the coordinating device 1300.

In further executing the control routine 1340, the processor 1350 of the coordinating device 1300 may employ the indications in the recurringly received node statuses 1535 of tasks currently being performed and/or current degrees of availability of various resources within each node device 1500 to determine the amount of time required to complete various tasks. The processor 1350 may store indications of such amounts of time required for each task as part of the task delay data 1535. As one or more of the node devices 1500 complete earlier assigned tasks, the processor 1350 may be caused to employ such stored indications of amounts of time in determining a predetermined period of time by which to delay the assignment of one or more next tasks to one or more of the node devices 1500.

Such delays in the assignment of next tasks may enable the assignment of those next tasks to ones of the node devices 1500 in a manner that takes advantage of particular data set partitions 1131 already being stored within the storages 1560 and/or 1660 of one or more of the node devices 1500. Further, this may take advantage of the time-limited storage of data set partitions 1131 within the volatile storages 1561 and/or 1661, and may minimize exchanges of data set partitions 1131 through the network 1999 that may consume greater amounts of time than the lengths of the delays in assignments of next tasks. Still further, in embodiments in which particular data set partitions 1131 were originally assigned to node devices that incorporate one or more GPUs 1650 where both the earlier assigned tasks and the next tasks are to be performed using the one or more GPUs 1650, such delays in the assignment of next tasks may minimize instances in which the next tasks are caused to be processed in other node devices that do not incorporate a GPU 1650 such that one or more CPUs 1550 are caused to perform the next tasks.

Turning to FIG. 13B, the assignment of tasks to selected ones of the node devices 1500 is substantially similar to the example embodiment of assignment of tasks of FIG. 13A, with the exception that compilation of the task routines 1211 of the analysis routine 1210 may occur within the selected node devices 1500, instead of within coordinating device 1300. More specifically, upon deriving initial assignments of at least one initial task of the analysis routine 1210 to the selected node devices 1500, the processor 1350 of the coordinating device 1300 may distribute the task routine(s) 1211 of the at least one initial task to the selected node devices 1500, instead of either CPU task routines 1571 or GPU task routines 1671. The CPU 1550 of each of the selected nodes 1500 may execute the compile routine 1440 to compile the distributed task routine(s) 1211 to generate corresponding CPU task routine(s) 1571 and/or GPU task routine(s) 1671 within the selected node devices 1500, instead of the processor 1350 of the coordinating device 1300 doing so.

Figure 14A:
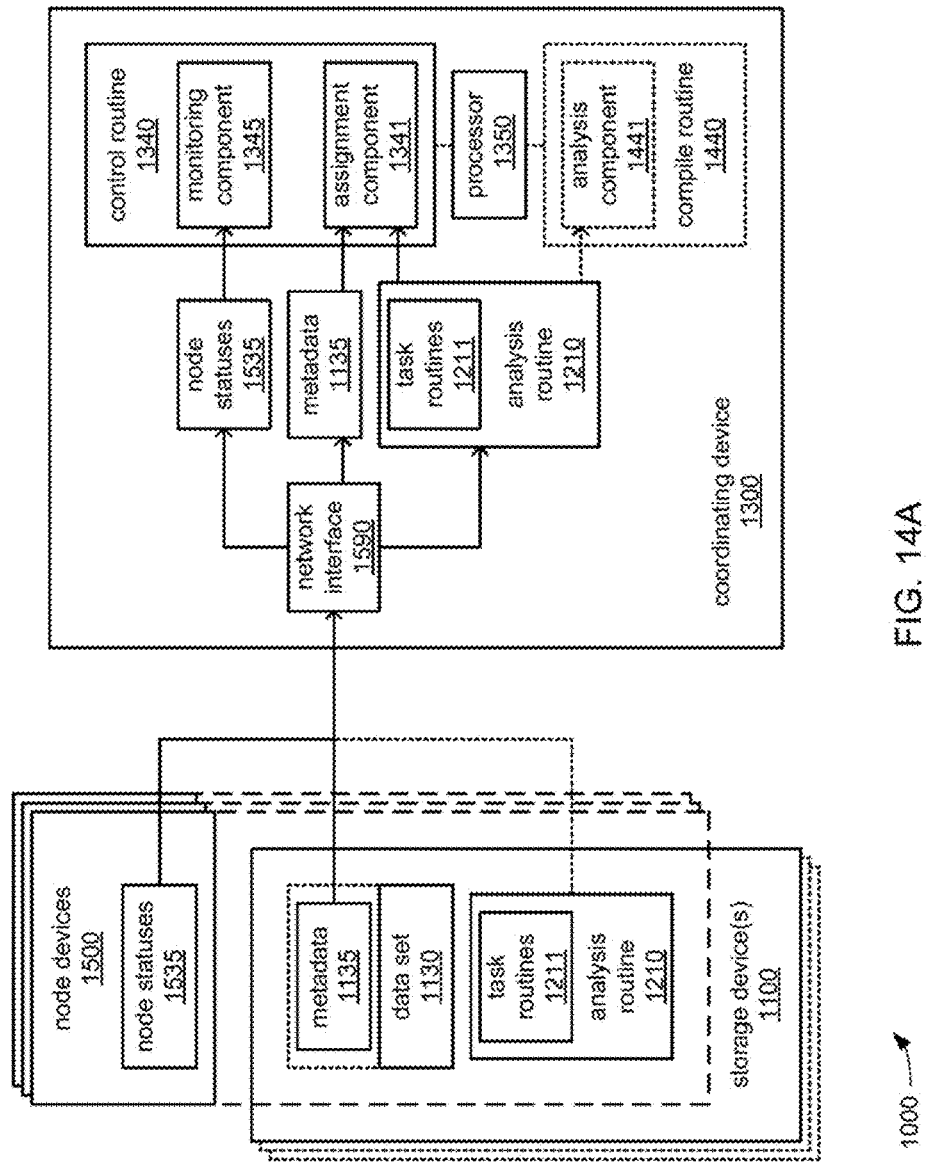
Figure 14C:
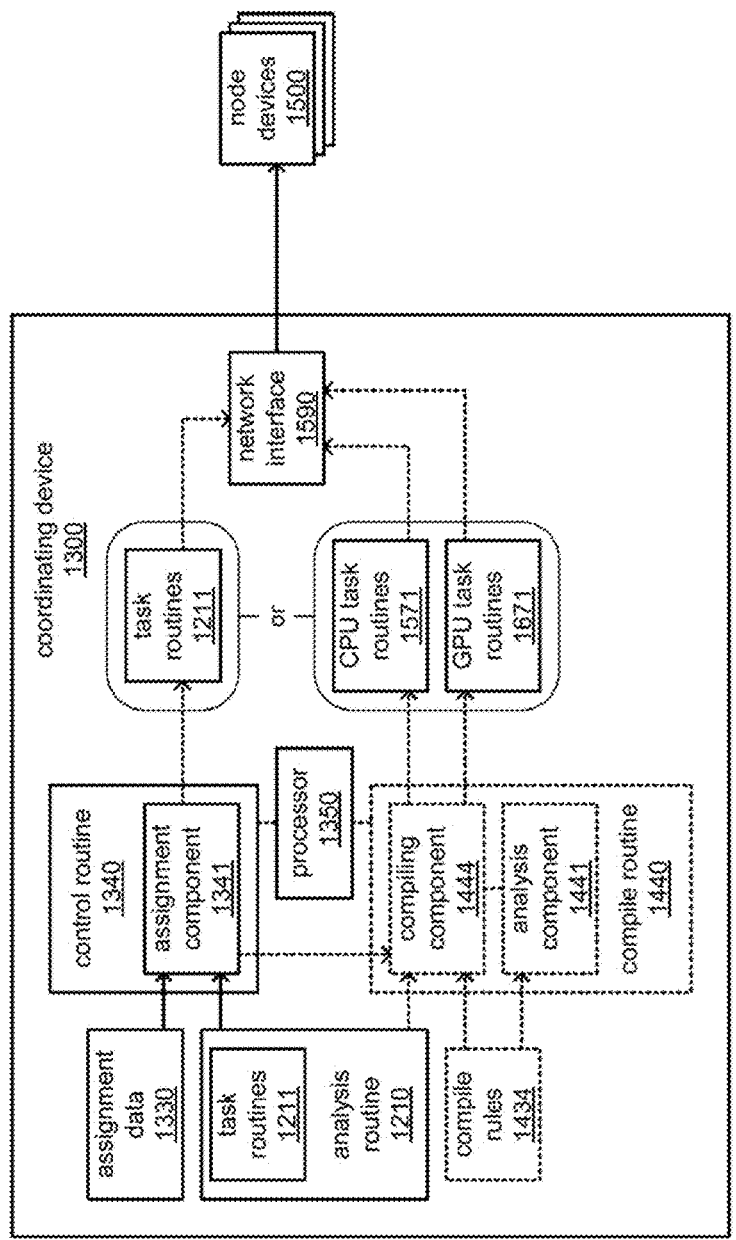

FIGS. 14A, 14B and 14C, together, illustrate an example embodiment of assignment of tasks that are to be performed as part of executing an analysis routine to selected ones of the node devices 1500 of the node device grid 1005. FIGS. 14A and 14B illustrate the collection and use of data associated with an analysis routine 1210, metadata 1135 of a data set 1130 and/or node statuses 1535 provided by the node devices 1500 to derive the assignments. FIG. 14C illustrates the distribution of task routines 1211, 1571 and/or 1671 to the selected node devices 1500.

Turning to FIG. 14A, as depicted, the control routine 1340 executed by the processor 1350 of the coordinating device 1300 may include a monitoring component 1345 to cause the processor 1350 to recurringly operate the network interface 1390 to receive the node statuses 1535 that may be recurringly transmitted by each of the node devices 1500 of the node device grid 1005 via the network 1999. In some embodiments, each of the node devices 1500 may recurringly transmit a node status 1535 at a regular interval of time, and regardless of other activities underway, as a form of "heartbeat signal" to the coordinating device 1300 that indicates continuing functionality, as well as conveying information about currently available resources and/or current activities. In such embodiments, a lack of reception of node status 1535 by the coordinating device 1300 from a node device 1500 when expected may be taken as an indication of a malfunction by the node device 1500 such that the resources of the node device may be deemed to be unavailable, and any task currently assigned to it may be reassigned to another node device 1500.

As also depicted, the control routine 1340 may also include an assignment component 1341 to cause the processor 1350 to assign data set partitions 1131 of a data set 1130, along with tasks of an analysis routine 1210 to perform with the assigned data set partitions 1131, to selected ones of the node devices 1500 of the node device grid 1005. In preparation for making such assignments, the processor 1350 may be caused to operate the network interface 1390 to retrieve the metadata 1135 of the data set 1130, as well as the analysis routine 1210 from one or more other devices via the network 1999, for use by the assignment component 1341. In embodiments in which the distributed processing system 1000 includes one or more distinct storage devices 1100 (such as the example distributed processing system 1000 of FIG. 11A), the metadata 1135 and/or the analysis routine 1210 may be provided to the coordinating device 1300 via the network 1999 from the one or more storage devices 1100. However, in embodiments in which the distributed processing system 1000 does not include such distinct storage devices and the node devices 1500 provide distributed storage of data sets 1130 (such as the example distributed processing system 1000 of FIG. 11B), the metadata 1135 and/or the analysis routine 1210 may be provided to the coordinating device 1300 via the network 1999 from one or more of the node devices 1500.

In still other embodiments, the viewing device 1800 may provide the coordinating device 1300 with the analysis routine 1210. In such embodiments, the viewing device 1800 may provide a user interface by which the viewing device 1800 may be controlled to transmit a command to the coordinating device 1300 via the network 1999 to cause execution of the analysis routine 1210 in a distributed manner to perform an analysis with the data set 1130. Part of transmitting the command to the coordinating device 1300 may be the transmission of the analysis routine 1210 from the viewing device 1700 to the coordinating device 1300.

As further depicted, in embodiments in which the coordinating device 1300 is to compile the task routines 1211 of the analysis routine 1210, the compile routine 1440 may be executed by the processor 1350, and may include an analysis component 1441 to identify ones of the task routines 1211 that are amenable to being converted and compiled for embarrassingly parallel execution by one or more GPUs 1650. To do so, the analysis component 1441 may also access the received analysis routine 1210, as may the assignment component 1341 of the control routine 1340.

Turning to FIG. 14B, as depicted, the node statuses 1535 may specify what processing, storage and/or network access resources are incorporated into each node device 1500. As has been discussed, the node statuses 1535 may be recurringly updated to also specify the current degree of current availability (e.g., current percentage level of use) of each such resource.

By way of example, the node statuses 1535 may provide indications of quantities, types, versions and/or other internal architecture details of the processors that may be incorporated into each of the node devices 1500. Thus, the node statuses 1535 may, for each node device 1500, specify the quantities of CPUs 1550 and/or GPUs 1650 that are present, as well as type information for each processor, including and not limited to, instruction set compatibility, revision level, cache size(s), quantity of processing cores, and/or quantity of threads able to be executed per processing core. As will be explained in greater detail, the provision of such information may aid in supporting a heterogeneous set of node devices 1500 within the node device grid 1005 that employ a variety of different processors among them. Along with information concerning processing resources incorporated into each of the node devices 1500, the node statuses 1535 may be recurringly updated to provide indications of current levels of use of different processors (e.g., different CPUs 1550 and/or GPUs 1650 within a single node device 1500), current levels of use of threads, and/or current levels of use of other particular processing features (e.g., levels use of any specialized processing cores, logic units, extensions to instruction sets, different levels of cache, etc.).

Also by way of example, the node statuses 1535 may provide indications of storage capacities of volatile storage 1561 and/or 1661, and/or non-volatile storage 1563 that may be incorporated into each of the node devices 1500. Thus, the node statuses 1535 may, for each node device 1500, specify quantities and/or various parameters of storage components employed to implement each of the storages 1561, 1661 and/or 1563, including and not limited to, types of interface used, page and/or row sizes, access speeds and/or latencies, and/or storage technologies used. Along with information concerning storage resources incorporated into each of the node devices 1500, the node statuses 1535 may be recurringly updated to provide indications of current levels of use of different volatile and/or non-volatile storages.

Further by way of example, the node statuses 1535 may provide indications of network access capabilities and/or bandwidths of the network interface(s) 1590 that may be incorporated into each of the node devices 1500. Thus, the node statuses 1535 may, for each node device 1500, specify supported wired and/or wireless network interfaces, supported protocols, input and/or output buffer sizes, etc. Along with information network access resources incorporated into each of the node devices 1500, the node statuses 1535 may be recurringly updated to provide indications of current levels of use of bandwidth and/or buffers for each interface.

As also depicted, the metadata 1135 may provide indications of various structural features by which data items may be organized and/or accessed within the data set 1130. For example, the metadata 1135 may include indications of the overall size, the type of data structure of the data set 1130 (e.g., binary tree, multi-dimensional array, linked list, etc.), data type(s) of the data items (e.g., floating point, integer, text characters, etc.), aspects of the indexing scheme used to access data items (e.g., number of dimensions, labels used, etc.), and/or still other structural aspects. Also for example, the metadata 1135 may include indications of various restrictions on the manner in which the data set 1130 may be divided into the data set partitions 1131, such as any partitioning scheme into which the data items of the data set 1130 are already organized, and/or a minimum size of the smallest atomic unit of data into which the data set 1130 may be partitioned that will still enable independent processing of the resulting data set partitions 1131 (e.g., the size of a row or draw in a two-dimensional array, etc.). As familiar to those skilled in the art, such restrictions on the manner in which the data set 1130 may be divided may impose an upper limit on the quantity of data set partitions 1131 into which the data set 1130 may be divided, which may effectively impose an upper limit on the quantity of node devices 1500 to which the resulting data set partitions 1131 may be distributed.

The analysis routine 1210 may be divided into any number of task routines 1211 that each include instructions that specify aspects of a corresponding task to be performed as a result of the execution of that task routine 1211 as part of executing of the analysis routine 1210. The instructions within each of the different task routines 1211 may provide indications of processing resources required (e.g., whether support is need for a particular extension to an instruction set) and/or storage capacities required to support data structures instantiated during execution. The analysis routine 1210 may also provide indications of an order in which the task routines 1211 are to be executed. Alternatively or additionally, the analysis routine 1210 may include definitions of inputs required for the performance of each task and/or definitions of outputs generated by each task. The provision of indications of an order in which the task routines 1211 are to be executed may include indications of dependencies among the task routines 1211, such as indications of where there is an output of one task routine 1211 that is required as an input to another task routine 1211. The provision of indications of required inputs and/or outputs to be generated may be part of an implementation of a many task computing (MTC) architecture in which the tasks of the analysis routine 1210 are each independently expressed, at least by their inputs and outputs, to make at least a subset of the tasks of the analysis routine 1210 amenable to embarrassingly parallel execution.

The manner in which definitions of inputs and/or outputs, indications of order of task execution and/or indications of dependencies are provided may vary depending on attributes of the programming language(s) in which the analysis routine 1210 is generated. By way of example, in some embodiments, declaration headers for ones of the task routines 1211 that are written as callable functions in a manner that follows the conventions of a selected programming language may be sufficient to provide such definitions. However, in other embodiments, a distinct file or other data structure may be generated, either within the analysis routine 1210 or to accompany the analysis routine 1210, to provide such definitions and/or indications. More specifically as an example, an array may be generated in which each entry specifies required inputs, outputs to be generated and/or position within an order of execution. Regardless of the exact manner in which definitions of inputs and/or outputs, and/or indications of dependencies and/or order are represented in a file or other data structure, in some embodiments, such definitions and/or indications may form a representation of a directed acyclic graph (DAG) of the tasks of the analysis routine 1210.

In executing the assignment component 1341, the processor 1350 may be caused to employ the node statuses 1535, the metadata 1135 and/or portions of the analysis routine 1210 to derive initial assignments of at least one initial task of the analysis routine 1210 to selected ones of the node devices 1500, and an initial distribution of at least one data set partition 1131 to each of the selected ones of the node devices 1500. In deriving such initial assignments, the processor 1350 may be caused to initially derive the manner in which to divide the data set 1130 into data set partitions 1131 based, at least in part, on any indicated restrictions in doing so that may be present within the metadata 1135 and/or on the quantity of node devices 1500 currently indicated as having sufficient storage resources in the node statuses 1535. The processor 1350 may alternatively or additionally be caused to analyze the executable instructions within one or more of the task routines 1211 of the analysis routine 1210 to identify one or more particular processing resources required (e.g., floating point math, single-instruction-multiple-data (SIMD) instruction support, etc.), and may select ones of the nodes 1500 to assign initial task(s) to based on indications in the node statuses 1535 of which ones of the node devices 1500 currently have such processing resources available. Regardless of the exact logic employed in deriving the initial assignments of tasks and/or data set partitions 1131 to the selected ones of the node devices 1500, the processor 1350 may store indications of such initial assignments as part of the assignment data 1330.

In embodiments in which the coordinating device 1300 is to compile the task routines 1211 of the analysis routine 1210, the coordinating device 1300 may store the compile rules 1434 for use during execution of the compile routine 1440 by the processor 1350. The compile rules 1434 may specify various aspects of compiling tasks routines 1211 of analysis routines 1210 to generate the CPU task routines 1571 for execution by one or more of the CPUs 1550 and/or the GPU task routines 1671 for execution by one or more of the GPUs 1650. Among what is specified by the compile rules 1434 may also be aspects of converting instructions of task routines 1211 not originally generated to utilize the embarrassingly parallel execution capabilities offered by the GPUs 1650 (through the provision of a relatively large quantity of threads of execution) into instructions that are generated to do so. Thus, the compile rules 1434 may specify aspects of converting and compiling instructions of task routines 1211 originally generated for execution by the CPUs 1550 into instructions generated for execution by the GPUs 1650.

Each of the one or more CPUs 1550 of each of the node devices 1500 may employ an internal processing architecture deemed to be well suited to the sequential processing of task routines 1211 that include various input/output operations and/or branching operations that condition the execution of different sets of instructions within task routines 1211 on the outcomes of various determinations. Each of the CPUs 1550 may each include one or more processing cores 1555 (referring to FIG. 12) that may each support a relatively limited degree of parallel execution of instructions on a relatively limited quantity of threads of execution. In contrast, the one or more GPUs 1650 that may be present within at least a subset of the node devices 1500 may employ an internal processing architecture deemed to be well suited to embarrassingly parallel processing of task routines 1211 that include a relatively limited set of instructions for mathematical and/or bitwise operations that able to be performed independently of each other such that there are no dependencies among numerous instances of a task routine 1211 executed in parallel. Indeed, in some embodiments, each of the GPUs 1650 may be capable of supporting parallel processing across hundreds, thousands, or still greater quantities of threads of execution.

Where the instructions of a task routine 1211 are amenable to being converted for such parallel execution across such a large quantity of threads, the task performed by such a task routine 1211 may be performable in much less time. By way of example, a task of one of the task routines 1211 that may take multiple days to perform using the CPUs 1550 of node devices 1500, may take just hours of a single day to perform using the GPUs 1650, instead. For tasks that can be implemented using the more limited instruction set of the GPUs 1650, a single one of the GPUs 1650 within a single one of the node devices 1500 may be able to perform the equivalent work of numerous ones of the CPUs 1550 across numerous ones of the nodes 1500, and in less time with far less expense. Such an improvement in speed of performance becomes even greater when multiple ones of the GPUs 1650 within multiple ones of the node devices 1500 are operated in parallel to perform a task as an embarrassingly parallel task across the numerous threads supported by each, thereby providing even more highly parallel form of performance of that task.

However, there may be ones of the task routines 1211 of the analysis routine 1210 that include particular instructions and/or to perform particular operations that render the instructions of those task routines 1211 incapable of being converted and compiled for such embarrassingly parallel execution by the GPUs 1650. Again, the GPUs 1650 may support a relatively limited instruction set. By way of example, many types of input/output operations must necessarily be performed in a single-threaded manner as various protocol handshakes and/or other features impose a sequential performance of steps. As a result, it is envisioned that the analysis routine 1210 may include both task routines 1211 in which the instructions are amenable to conversion and compiling for the embarrassingly parallel execution offered by the GPUs 1650 and task routines 1211 in which the instructions are not such that they must be compiled for execution by the CPUs 1550.

The compile rules 1434 may include a list of instructions that, if present within a task routine 1211, at least do not prevent conversion and compilation of the instructions of the task routine 1211 to create a corresponding GPU task routine 1671 in which the instructions cause the performance of the task of the task routine 1211 as an embarrassingly parallel task using many threads of at least one GPU 1650 when executed. Alternatively or additionally, the compile rules 1434 may include a list of instructions that, if present within a task routine 1211, do prevent such a conversion of the task routine 1211 to support such embarrassingly parallel execution by the GPUs 1650. Additionally, the compile rules 1434 may specify particular circumstances in which particular instructions that otherwise would not prevent such a conversion may be used in a task routine 1211 in a manner (e.g., as part of an input/output operation or other operation) that does prevent such a conversion.

For ones of the task routines 1211 of the analysis routine 1210 that have instructions that are able to support conversion into other instructions that are able to be compiled to perform task(s) as embarrassingly parallel task(s) on the GPUs 1650, the compile rules 1434 may specify various rules for performing such a conversion. By way of example, the compile rules 1434 may include one or more rules for the conversion of index values used in loops to be instantiated in a manner more amenable to embarrassingly parallel execution in which collisions of index values and dependencies are avoided between instances of a task that are executed in parallel. Alternatively or additionally, there may be one or more rules for converting instructions that were implemented within a loop to cause sequential performance of an operation numerous times into instructions that cause multiple performances of that operation to occur in parallel across numerous threads of at least one of the GPUs 1650. In some of such conversions involving a loop where the quantity of performances of the operation may be large enough that not all are able to occur in parallel, the loop may not be eliminated, and may instead be converted to employ fewer iterations where a subset of the performances of the operation occur in parallel during each iteration. By way of another example, the compile rules 1434 may include one or more rules for the conversion of a data structure instantiated within a task routine 1211, where its data items are sequentially accessed, into a different data structure where its data items are accessed in a parallel manner across numerous threads of at least one of the GPUs 1650.

In some embodiments, the conversion may entail converting instructions of the task routine 1211 that were originally generated in a particular programming into other instructions generated in the same programming language. However, in some of such embodiments, the instructions defined for use in that particular language may be augmented to include one or more additional instructions associated with aspects of internal architecture that are unique to the GPU 1650 (e.g., particular types of operands, particular types for values that are returned, organization of bits and/or bytes of variables to fit a register implementation, etc.). In other embodiments, the conversion may entail converting instructions of the task routine 1211 that were originally generated in one programming language into other instructions generated in another programming language. In some of such embodiments, the other programming language may have been created by a purveyor of the GPUs 1650 in an effort to provide a programming language designed to make best use of the features of the GPUs 1650.

Below is presented an example of a conversion of portions of a task routine 1211 that may be performed by the processor 1350 of the coordinating device 1300 and/or by one or more CPUs 1550 of the node devices 1500. First depicted are portions of an example task routine 1211 generated in FCMP, a programming language offered in various products by SAS Institute Inc. of Cary, N.C., USA. Specifically, for example, the declarations of the subroutine "income_statement_kernel" and of the data structure "d_matrix_is" have been converted between the FCMP and C programming languages.

```
/* Register income statement functions */
options cmplib=(datalib.funcs);
/* Initialize input data sets */
data work.policy_ds;
   _VALUE_=.;
run;
data work.scen_mort_ds;
   _VALUE_=.;
run;
data work.scen_lapse_ds;
   _VALUE_=.;
run;
%macro define_is_kernel_func(language=);
   %if &language = fcmp %then %do;
      %put running as FCMP...;
      proc fcmp outlib=datalib.funcs.is;
      /* function to calculate the power of a number */
         function pow(x,y);
            return(x**y);
         endsub;
         subroutine income_statement_kernel(offset,index_scen,
            n_rows_per_slice,
               n_scen_mort_cols,d_matrix_mort[38,4],
               n_scen_lapse_cols,d_matrix_lapse[38,4],
               n_pol_rows,n_pol_cols,d_matrix_pol[32948,28],
               n_incsta_cols,d_matrix_is[38,15]);
         outargs d_matrix_is;
         /* Create a temporary array to hole aggregated income statement
            items and initialize it to all 0 */
         array is_temp[38,6];
         do ndx_year=1 to 30;
            is_temp[ndx_year,1] = 0;
            is_temp[ndx_year,2] = 0;
            is_temp[ndx_year,3] = 0;
            is_temp[ndx_year,4] = 0;
         end;
```

Next depicted are corresponding portions of a corresponding GPU task routine generated in the conversion process performed by the processor 1350 or by one or more of the CPUs 1550. Specifically, the above portions of the example task routine 1211 generated in FCMP have been converted to use a programming language extension that is part of the Compute Unified Device Architecture (CUDA) programming model for invoking functions of GPUs (e.g., the GPUs 1650) that is promulgated by Nvidia Corporation of Santa Clara, Calif., USA, which is a purveyor of GPUs that may be employed as the GPUs 1650.

```
#include <float.h>
#include <math.h>
```

-continued

```
#include <stdio.h>
#include <stdlib.h>
#include <assert.h>
#include <memory.h>
.....device..... void income_statement_kernel( double offset,
double index_scen,double n_rows_per_slice,double
.....device..... void income_statement_kernel( double offset,
double index_scen,double n_rows_per_slice,double
double (* d_matrix_mort)[(int)4] = (double (*)
[(int)4])_irm_d_matrix_mort;
double (* d_matrix_lapse)[(int)4] = (double (*)
[(int)4])_irm_d_matrix_lapse;
double (* d_matrix_pol)[(int)26] = (double (*)
[(int)26])_irm_d_matrix_pol;
double (* d_matrix_is)[(int)15] = (double (*)
[(int)15])_irm_d_matrix_is;
// subroutine income_statement_kernel{offset,index_scen,
n_rows_per_slice, n_scen_mort_cols,d_matrix_mort
// outargs d_matrix_is;
// array is_temp[30,4];
double is_temp[30] [4];
// do ndx_year=1 to 30;
int ndx_year;
for(ndx_year=1; ndx_year <= 30; ndx_year++) {
// is_temp[ndx_year,1] = 0;
is_temp[(int)(ndx_year - 1)][(int)(1 - 1)] = 0;
// is_temp[ndx_year,2] = 0;
is_temp[(int)(ndx_year - 1)][(int)(2 - 1)] = 0;
// is_temp[ndx_year,3] = 0;
is_temp[(int)(ndx_year - 1)][(int)(3 - 1)] = 0;
// is_temp[ndx_year,4] = 0;
is_temp[(int)(ndx_year - 1)][(int)(4 - 1)] = 0;
// end;
}
// attained_age = 1;
double attained_age;
attained_age = 1;
```

As those skilled in the art will readily recognize, it is often the case that programming code originally generated for execution using a first processing architecture is likely to be more efficiently executed by a processor of the first architecture than programming code that was originally generated for execution using a second processing architecture, and then converted for execution using the first processing architecture. Despite this, testing has confirmed that significant gains in speed of performance of some tasks of an analysis routine 1210 can be realized by the conversion of the task routines 1211 by the compile routine 1440 from being generated for execution by the CPUs 1550 to being generated for embarrassingly parallel execution by the GPUs 1650.

Below is presented a table of comparisons of execution times from the testing of an example stochastic calculation. Such a calculation may be a task implemented as one of the task routines 1211 within an example analysis routine 1210. As depicted, when the stochastic calculation is written in SAS Macro Code (another programming language offered in various products by SAS Institute Inc.) for execution by a CPU (e.g., one of the CPUs 1550 of one of the nodes 1500), the resulting amount of time required for execution was measured to be about 93,600 seconds. When the same stochastic calculation is, instead, written in FCMP for execution by multiple CPUs (e.g., multiple ones of the CPUs 1550 within one or more of the nodes 1500), the resulting measured execution time was 763 seconds. However, when the same FCMP code of the stochastic calculation is then converted to CUDA for embarrassingly parallel execution by one of the GPUs offered by Nvidia Corporation (e.g., one of the GPUs 1650 of one of the nodes 1500), the resulting measured execution time was 73 seconds. Although 73 seconds is slower than the measured 11 second execution time achieved when the same stochastic calculation is written directly in CUDA for embarrassingly parallel execution by one of the GPUs offered by Nvidia Corporation, the measured execution time of 73 seconds achieved through use of the conversion from FCMP to CUDA is still a very significant improvement over the 763 second measured execution time achieved through execution of the FCMP code by multiple CPUs.

| | Technology Employed | Stochastic Calculation Time in Seconds |
|---|---|---|
| CPU | SAS Macro Code | 93,600 |
| | code written in FCMP | 763 |
| GPU | code written in FCMP, and converted to CUDA | 73 |
| | code written directly in CUDA | 11 |

Thus, as can be appreciated from these measured execution times, such use of conversion of code to enable compiling for such embarrassingly parallel execution enables personnel who do not possess the skills or training to write the task routines 1211 of the analysis routine 1210 natively in CUDA to, nevertheless, still reap the benefits of embarrassingly parallel execution of the code that they are able to write.

In embodiments in which the coordinating device 1300 is to compile the task routines 1211 of the analysis routine 1210, the processor 1350 may execute the analysis component 1441 as part of deriving the initial assignments of data set partitions 1131 and initial task(s). More specifically, the processor 1350 may be caused by the analysis component 1441 to analyze each task routine 1211 of the analysis routine 1210 to identify ones of the task routines 1211 in which the instructions are amenable to conversion and compilation into corresponding GPU task routines 1671 to enable embarrassingly parallel performance of their corresponding tasks by the GPUs 1650. In so doing, the processor 1350 may be caused to employ the indications within the compile rules 1434 of which instructions do and/or which instructions don't prevent such conversions. The processor 1350 may then be caused to use the results of such an analysis of the task routines 1211 in selecting ones of the node devices 1500 as part of deriving the initial assignments. More specifically, if the analysis of the task routines 1211 results in a determination by the processor 1350 that none of the task routines 1211 are able to be compiled into corresponding GPU task routines 1671, then the processor 1350 may limit the selection of node devices 1500 to ones that incorporate one or more of the CPUs 1550, since no GPU task routines 1671 will be generated from the task routines 1211. However, if the analysis of the task routines 1211 results in a determination that some of the task routines 1211 are able to be compiled into corresponding GPU task routines 1671, while others are not, then the processor 1350 may limit selection of the node devices 1500 to ones that incorporate both one or more of the CPUs 1550 and one or more of the GPUs 1650, and are therefore able to support the execution of both CPU task routines 1571 and GPU task routines 1671 generated from different ones of the task routines 1211. Further, if the analysis of the task routines 1211 results in a determination that all of the task routines 1211 are able to be compiled into corresponding GPU task routines 1671, then the processor 1350 may limit selection of the node devices 1500 to ones that incorporate one or more of the GPUs 1650.

Turning to FIG. 14C, in embodiments in which the coordinating device 1300 does not compile the task routines 1211 of the analysis routine 1210, the processor 1350 may be caused by the assignment component 1341 of the control routine 1340 to operate the network interface 1390 to distribute the task routine(s) 1211 of the assigned initial tasks to the selected node devices 1500. In such embodiments, each of the selected node devices 1500 may independently compile the task routine(s) 1211 distributed to each of the selected nodes 1500 into corresponding CPU task routine(s) 1571 and/or GPU task routine(s) 1671 in preparation for performing the initial task(s) assigned to each of the selected nodes 1500.

Alternatively, in embodiments in which the coordinating device 1300 is to compile the task routines 1211 of the analysis routine 1210 such that the coordinating device 1300 stores the compile routine 1440 for execution by the processor 1350, the compile routine 1440 may include a compiling component 1444 to perform the compilation of the task routines 1211. More specifically, the processor 1350 may be caused by the compiling component 1444 to compile at least the one or more task routines 1211 associated with the one or more initial tasks that have been assigned to the selected ones of the node devices 1500. For a task routine 1211 that has been determined by the processor 1350 (during execution of the analysis component 1441) to not be amenable to conversion and compiling to generate a corresponding GPU task routine 1671, the processor 1350 may be caused to compile the task routine 1211 without such a conversion to generate a corresponding CPU task routine 1571. For a task routine 1211 that has been determined by the processor 1350 to be amenable to being converted and compiled to generate a corresponding GPU task routine 1671, the processor 1350 may be caused to effect such a conversion and compilation to generate the corresponding GPU task 1671.

In some embodiments, where a task routine 1211 has been determined by the processor 1350 to be amenable to being converted and compiled to generate a corresponding GPU task routine 1671, the processor 1350 may be caused by the compiling component 1444 to perform more than one compilation of the same task routine 1211. For example, in some of such embodiments, the processor 1350 may additionally compile the same task routine 1211 to also generate a corresponding CPU task routine 1571 in addition to the corresponding GPU task routine 1671. This may be deemed desirable to address a situation where there may be an insufficient quantity of available node devices 1500 that incorporate one or more of the GPUs 1650 such that the task(s) of the task routine 1211 must be performed by one or more of the node devices 1500 based on execution of the corresponding CPU task routine 1571 by one or more CPUs 1550. Alternatively or additionally, this may be deemed desirable to address a situation where a node device 1500 that incorporates one or more GPUs 1650 suffers a failure while executing the corresponding GPU task routine 1650, and the performance of the task(s) of the task routine 1211 with the particular data set partition(s) 1131 assigned to that node device 1500 must be reassigned to another node device 1500 that does not incorporate a GPU 1650.

By way of another example of more than one compiling of the same task routine 1211, in some of such embodiments, the node device grid 1005 may include a heterogeneous set of node devices 1500 that incorporate different GPUs 1650 that do not share an instruction set such that generating a single corresponding GPU task routine 1671 for all of the different GPUs 1650 may not be possible. Thus, the processor 1350 may be caused to perform multiple conversions and compilations of the same task routine 1211 into each of the different versions of the GPU task routine 1671 needed for each of the different GPUs 1650 present among the node devices 1500 of the node device grid 1005.

However, in some of the embodiments in which the coordinating device 1300 is to compile the task routines 1211 of the analysis routine 1210, whether the analysis of the task routines 1211 to identify those that are amenable to being compiled for one or more different GPUs 1650 takes place and/or whether such compiling to generate corresponding GPU task routines 1671 takes place, may be conditioned on whether there are indications of there being any node devices 1500 available that incorporate any GPU 1650. More specifically, in a situation in which the current node statuses 1535 indicate that none of the node devices that incorporate one or more of the GPUs 1650 are currently available to be assigned any task, at all, the processor 1350 may be caused by the assignment component 1341 to refrain from performing any analysis of the task routines 1211 to determine whether any are amenable to being compiled for execution by any GPU 1650. Alternatively or additionally, in embodiments in which different node devices 1500 incorporate differing types of GPUs 1650 such that multiple compilations are required to generate GPU task routines 1671 for all of the differing types of GPUs 1650, a situation may arise in which the node statuses 1535 indicate that all of the GPUs 1650 of one of the types are currently unavailable for use in performing any task. In such a situation, the processor 1350 may be caused by the assignment routine to refrain from compiling any task routine 1211 to generate any GPU task routine 1671 for execution by GPUs 1650 of that particular type.

The generation of GPU task routines 1671 in a manner that includes the conversion of the instructions of task routines 1211 into other instructions that make use of the embarrassingly parallel processing features of the GPUs 1650, followed by compiling, may be deemed desirable to improve the ease with which the embarrassingly parallel features of the GPUs 1650 may be used. Through such use of conversions of instructions, personnel may be provided with the opportunity to take advantage of the GPUs 1650 that may be present within at least some of the node devices 1500 without the need to architect and write the instructions of the task routines 1211 in a manner that is designed for such embarrassingly parallel execution. Stated differently, such personnel are able to be spared the need to acquire the added skills and experience to architect and write the instructions that implement the tasks of the analysis routine 1210 in a manner that is designed for embarrassingly parallel execution by the GPUs 1650. Additionally, where the node device grid 1005 includes node devices 1500 that incorporate differing ones of the GPUs 1650 that do not share an instruction set, such personnel are further able to be spared the need to architect and write different versions of instructions that implement the tasks of the analysis routine 1210 in a manner that is designed for the differing idiosyncrasies of the manner in which high parallel execution is provided by each of the differing ones of the GPUs 1650.

Figure 15A:
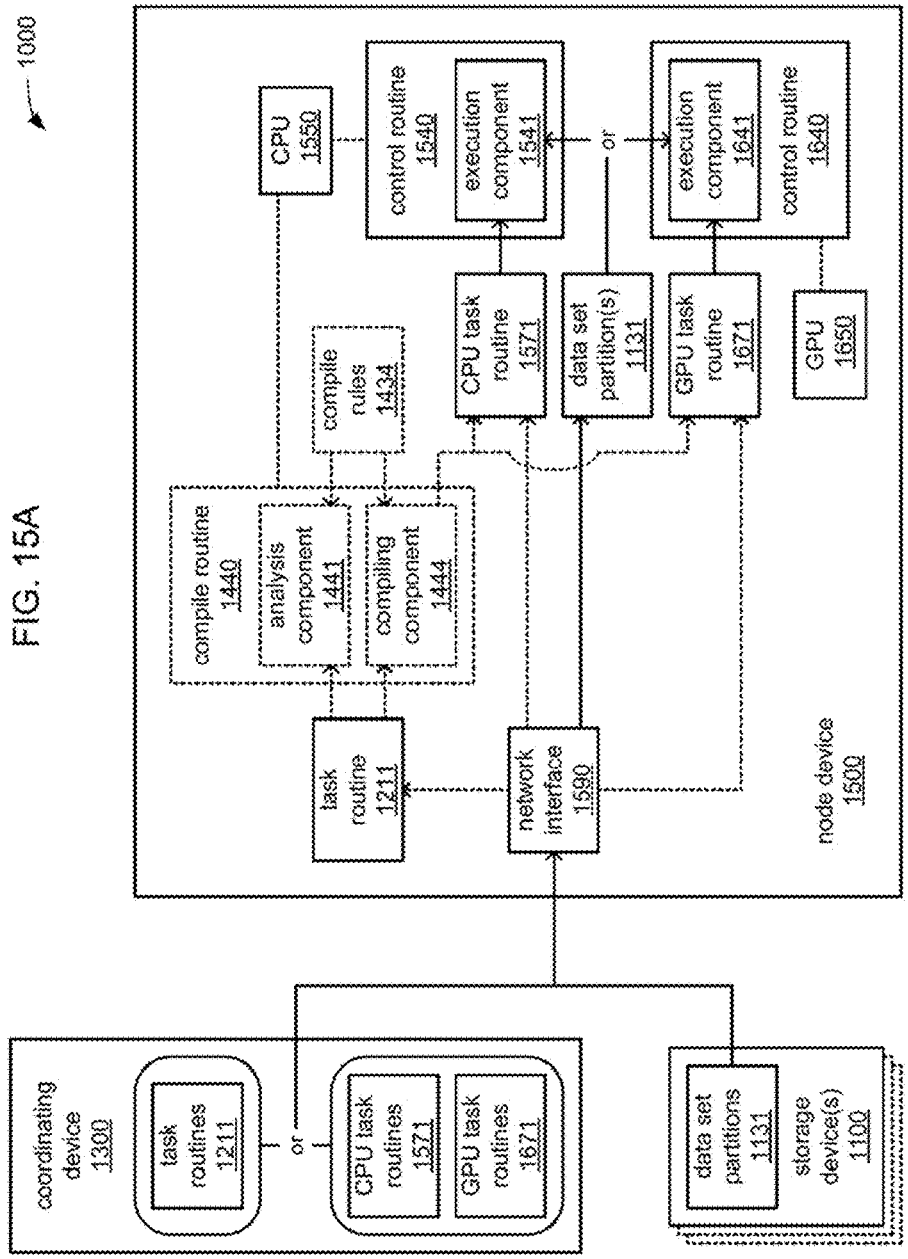

FIGS. 15A and 15B, together, illustrate an example embodiment of performance of tasks that are assigned to selected ones of the node devices 1500 of the node device grid 1005. FIG. 15A illustrates aspects of preparation for performance that may include compiling a task routine 1211 within an example node device 1500, and FIG. 15B illustrates aspects of performance of a task within the example node device 1500 through execution of the corresponding CPU task routine 1571 or corresponding GPU task routine 1671.

Turning to FIG. 15A, as previously discussed, in embodiments in which the distributed processing system 1000 includes one or more distinct storage devices 1100 (such as the example distributed processing system 1000 of FIG. 11A), one or more data set partitions 1131 may be provided to the node devices 1500 via the network 1999, including to the depicted example node device 1500. However, in embodiments in which the distributed processing system 1000 does not include such distinct storage devices and the node devices 1500 provide distributed storage of the data sets 1130 (such as the example distributed processing system 1000 of FIG. 11B), one or more data set partitions 1131 with which a task is to be performed within the example node device 1500 may already be stored within the example node device 1500. Otherwise such one or more data set partitions 1131 may be provided to the example node device 1500 via the network 1999 from another of the node devices 1500.

As previously discussed, in embodiments in which the coordinating device 1300 does not compile the task routines 1211 of the analysis routine 1210, the coordinating device 1300 may distribute the one or more task routines 1211 of the one or more assigned initial tasks to the selected node devices 1500. In such embodiments, and as depicted, each of the node devices 1500 may store the compile routine 1440 for execution by a CPU 1550 of each of the node devices 1500. Thus, following receipt of a task routine 1211 from the coordinating device 1300, a CPU 1550 of the example node device 1500 may execute the compile routine 1440 to first analyze the task routine 1211 to determine whether it is amenable to being converted and compiled to generate a corresponding GPU task routine 1671. If so, then the CPU 1550 may be caused to perform such a conversion and compilation of the task routine 1211 to so generate the corresponding GPU task routine 1671 for execution by a GPU 1650 of the example node device 1500. However, if the task routine 1211 is not so amenable, then the CPU 1550 may be caused to compile the task routine 1211 without such a conversion to generate the corresponding CPU task routine 1571.

Alternatively, in embodiments in which the coordinating device 1300 does compile the task routines 1211 of the analysis routine 1210, the coordinating device 1300 may distribute the one or more corresponding CPU task routines 1571 and/or GPU task routines 1671 that were generated within the coordinating device 1300 from the one or more task routines 1211. As a result, the example node 1500 may receive a CPU task routine 1571 to be executed by the CPU 1550, or a GPU task routine 1671 to be executed by the GPU 1650, instead of the corresponding task routine 1211 from which either is generated.

As depicted, the control routine 1640 executed by the GPU 1650 may include an execution component 1641 to cause the GPU 1650 to execute the corresponding GPU task routine 1671, if the corresponding GPU task routine 1671 is able to be generated (whether within the coordinating device 1300 or the example node device 1500) from the task routine 1211 of the initial task assigned to the example node device 1500. However, as also depicted, the control routine 1540 executed by the CPU 1550 may include an execution component 1541 to cause the CPU 1550 to execute the corresponding CPU task routine 1571, if the corresponding GPU task routine 1671 is not able to be generated from the task routine 1211 of the initial task assigned to the example node device 1500 such that generation of the corresponding CPU task routine 1571 is necessary.

Turning to FIG. 15B, and briefly referring to FIG. 12, where the GPU 1650 is caused by the execution component 1641 to execute the GPU task routine 1671 to perform the assigned initial task with a data set partition 1131, pages of both the GPU task routine 1671 and the data set partition 1131 may be swapped between the non-volatile storage 1563 and the volatile storage 1661 to which the GPU 1650 is coupled. Alternatively, where the CPU 1550 is caused by the execution component 1541 to execute the CPU task routine 1571 to perform the assigned initial task with a data set partition 1131, pages of both the CPU task routine 1571 and the data set partition 1131 may be swapped between the non-volatile storage 1563 and the volatile storage 1561 to which the CPU 1550 is coupled. As was earlier discussed in connection with FIG. 12, each of the volatile storages 1561 and 1661 may permit considerably faster access than the non-volatile storage 1563 to data and/or routines stored therein such that the CPU 1550 and the GPU 1650 are able to more efficiently execute routines and perform operations with data stored within the volatile storages 1561 and 1661, respectively. However, each of the volatile storages 1561 and 1661 may have considerably less storage capacity than the non-volatile storage 1563. As a result, the situation may repeatedly arise where significantly more of (if not all of) a relatively large data set partition 1131 may storable within the non-volatile storage 1563, while just a relatively small portion of that data set partition 1131 may storable within either of the volatile storages 1561 and 1661, thereby necessitating the use of page swapping.

As depicted, the control routine 1540 may also include a status component 1543 to cause the CPU 1550 to operate the network interface 1590 of the example node 1500 recurringly transmit updated indications of the current status of the processing, storage and/or network access resources of the example node 1500 as updated instances of node status 1535 to the coordinating device 1300. As previously discussed in connection with FIG. 12, the GPU 1650 within the graphics controller 1600 may not have access to the network interface 1590 and/or may not execute the requisite driver routines to directly operate the network interface 1590. Thus, the CPU 1550 may be caused by the status component 1543 to recurringly retrieve indications of status of the GPU 1650 and/or the volatile storage 1661 from the GPU 1650 to add to the indications of status included in the transmitted node status 1535.

FIG. 16 illustrates an example embodiment of an assignment of next tasks that are to be performed as part of executing an analysis routine to selected ones of the node devices 1500 of the node device grid 1005. As previously discussed in connection with FIGS. 14A-B and 15B, the processor 1350 of the coordinating device 1300 may be caused by the monitoring component 1545 to recurringly operate the network interface 1390 to receive the node statuses 1535 recurringly transmitted from the node devices 1500 of the node device grid 1005 via the network 1999.

In some embodiments, the processor 1350 may also be caused by the monitoring component 1545 to maintain and recurringly update indications of amounts of time required to complete tasks assigned to the node devices 1500. In some of such embodiments, the task delay data 1335 may include a separate per-task time for completion that is recurringly calculated as an average of the amounts of time required by each of multiple node devices 1500 to complete the same task. In embodiments in which the task may have been assigned to different ones of the node devices 1500 where it may be performed using different types of processors (e.g., a CPU 1550 vs. a GPU 1650, or different types of GPUs 1650), different average times may be maintained within the task delay data 1335 for each different type of processor employed in executing a task. Alternatively or additionally, as a mechanism to account for differences in resources (including processing resources) between node devices 1500, averages of relative differences in amounts of time for each node device 1500 to complete tasks assigned to it in comparison to other node devices 1500 may be included in the task delay data 1335.

In such embodiments, the processor 1350 may be caused by the assignment component 1541 to employ the stored indications of amounts of time to complete assigned tasks within the task delay data 1335 to derive one or more periods of time by which the processor 1350 may delay assigning a next task with a particular data set partition 1131 to a node device 1500 that does not already have the particular data set partition 1131 stored within. Where there are multiple periods of time of delay, each may be based on a different average of completion times stored within the task delay data 1335 for a different task. Where there is an accounting for differences in resources between node devices 1500 through averages of relative differences in amounts of time, such averages may be employed by the processor 1350 to modify each of the periods of time for delay for a particular node device 1500.

Figure 17A:
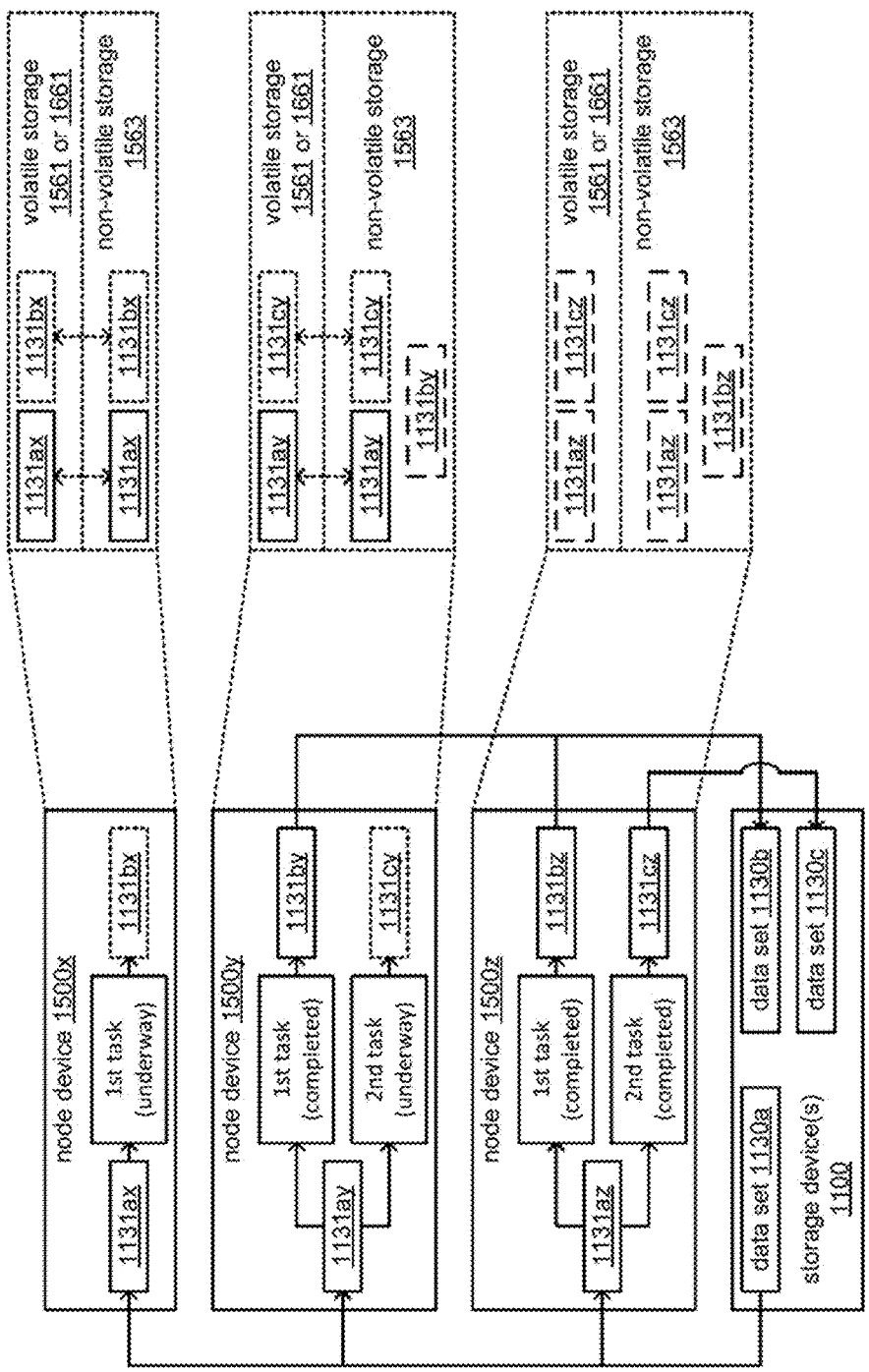
FIGS. 17A, 17B and 17C, together, illustrate an example embodiment of delay in assignment of a data set partition and a task.
Figure 17B:
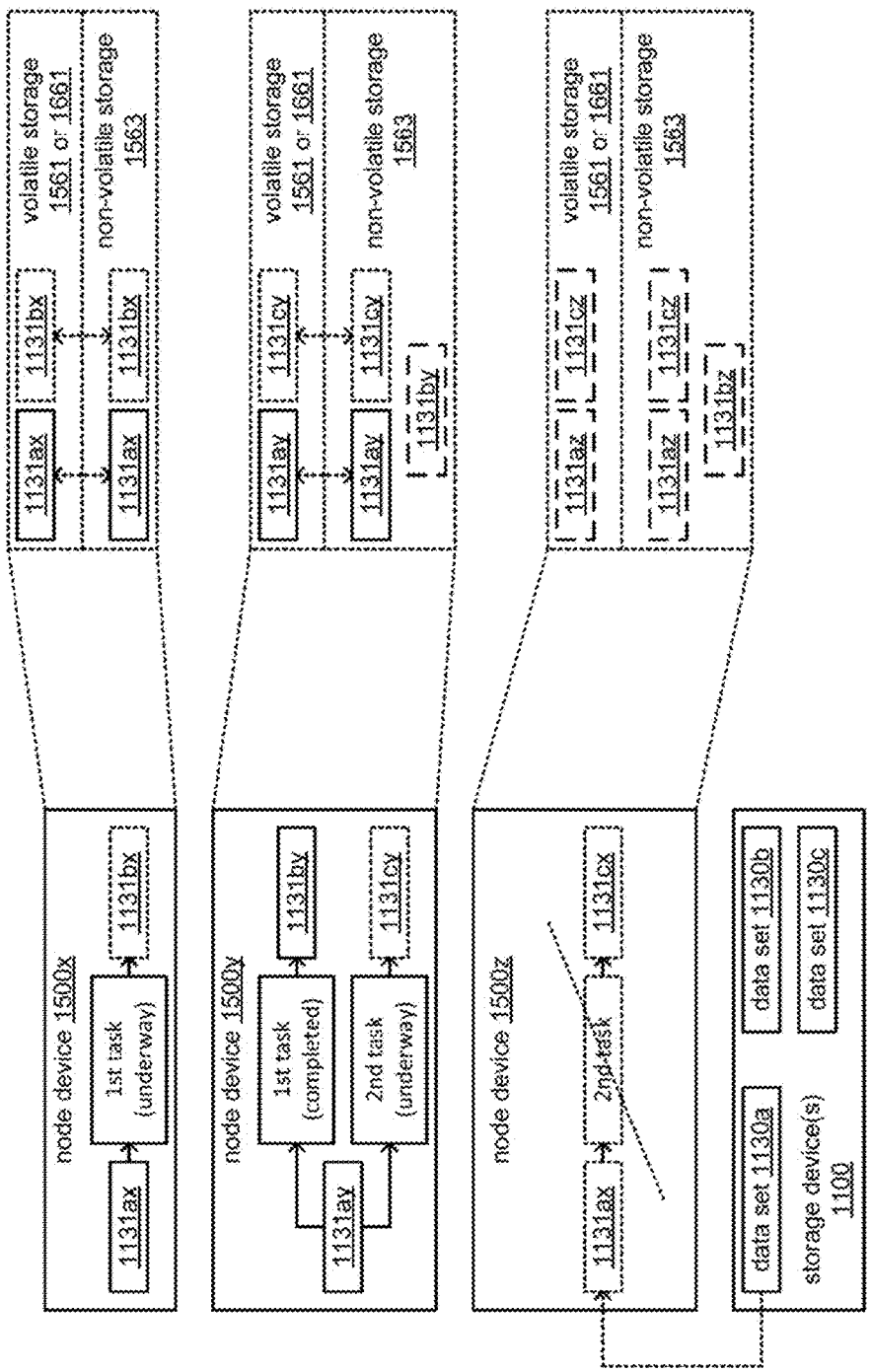
Figure 17C:
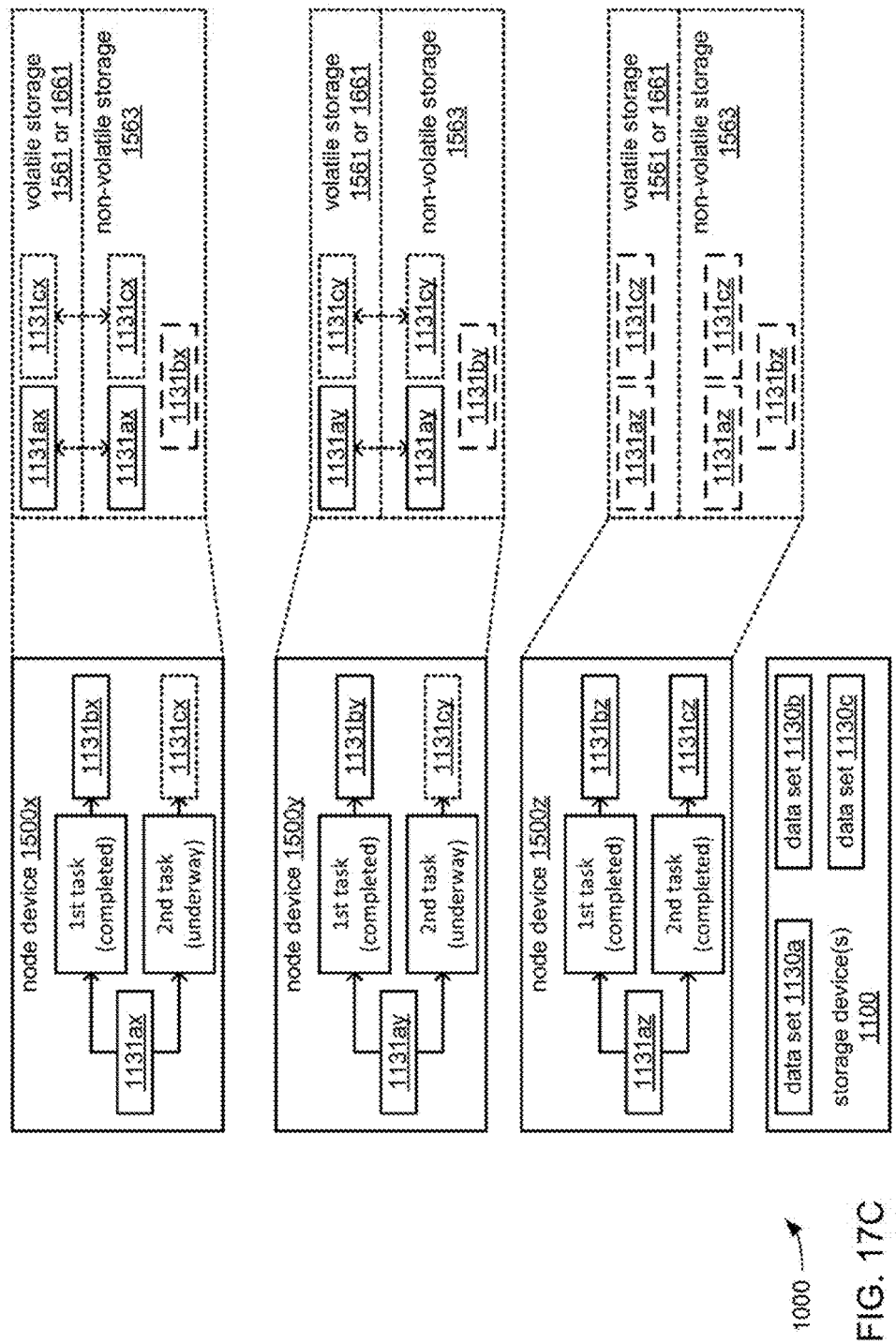

FIGS. 17A, 17B and 17C, taken together in order from FIG. 17A to FIG. 17C, illustrate an example embodiment of performance of tasks among multiple selected ones of the node devices 1500 of the node device grid 1005. More specifically, FIGS. 17A-C depict an example triplet of node devices 1500$x$, 1500$y$ and 1500$z$ performing a first task with an example data set 1130$a$, and then performing a second task related to the first task with the same example data set 1130$a$. In so doing, each of the example node devices 1500$x$-$z$ is to generate another example data set 1130$b$, and then still another example data set 1130$c$. It should be noted that this example based on just the three node devices 1500$x$-$z$, and involving three data sets 1130$a$-$c$ that may be small enough in size to be distributed among just three node devices 1500, is a deliberately simplified example presented and discussed herein for purposes of explanation and understanding, and should not be taken as limiting. More specifically, it is envisioned that embodiments are likely to entail performing tasks with considerably larger data sets 1130, and therefore, are likely to entail the use of considerably more of the node devices 1500.

Starting with FIG. 17A, each of the three node devices 1500$x$-$z$ has been assigned to perform the first task with a corresponding one of three data set partitions 1131$ax$-$az$ of the data set 1130$a$ to each generate a corresponding one of three data set partitions 1131$bx$-$bz$ of the data set 1130$b$. Also, each of the three node devices 1500$x$-$z$ has been provided with its corresponding one of the three data set partitions 1131$ax$-$az$ of the data set 1130$a$ from the one or more storage devices 1100 via the network 1999.

As depicted, one or more processors of the node device 1500$x$ (e.g., one or more CPUs 1550 and/or one or more GPUs 1650) are still underway in performing the first task with the data set partition 1131$ax$ such that the data set partition 1131$bx$ is still being generated within the node device 1500$x$. Additionally, it may be that the performance of the first task with the data set partition 1131$ax$ consumes sufficient processing and/or storage resources of the node device 1500$x$ that the node device 1500$x$ may be deemed to have insufficient processing and/or storage resources to be assigned to perform another task until the first task with the data set partition 1131$ax$ has been completed. In performing the first task with the data set partition 1131$ax$ to generate the data set partition 1131$bx$, at least a subset of each of these partitions may be stored within the non-volatile storage 1563 of the node device 1500$x$. Also, pages of these two partitions may be swapped between the non-volatile storage 1563 and one or the other of the volatile storages 1561 or 1661, depending on whether the first task is performed by one or more CPUs 1550 or one or more GPUs 1650 of the node device 1500$x$.

As also depicted, one or more processors of the node device 1500$y$ have already completed performing the first task with the data set partition 1131$ay$ such that the data set partition 1131$by$ has already been generated within the node device 1500$y$, and then transmitted to the one or more storage devices 1100 for storage. Additionally, with that performance of the first task completed, the node device 1500$y$ has been assigned to perform the second task with the data set partition 1131$ay$ to generate a data set partition 1131$cy$ of the data set 1130$c$. As depicted, the one or more processors of the node device 1500$y$ are still underway in performing the second task with the data set partition 1131$ay$ such that the data set partition 1131$cy$ is still being generated within the node device 1500$y$. Additionally, it may be that the performance of the second task with the data set partition 1131$ay$ consumes sufficient processing and/or storage resources of the node device 1500$y$ that the node device 1500$y$ may be deemed to have insufficient processing and/or storage resources to be assigned to perform another task until the second task with the data set partition 1131$ay$ has been completed. As a result of having performed the first task with the data set partition 1131$ay$ to generate the data set partition 1131$by$, at least a subset of the partition 1131$by$ may remain stored within the non-volatile storage 1563 of the node device 1500$y$ for a limited period of time. In performing the second task with the data set partition 1131$ay$ to generate the data set partition 1131$cy$, at least a subset of each of these partitions may be stored within the non-volatile storage 1563 of the node device 1500$x$. Also, pages of these two data set partitions may be swapped between the non-volatile storage 1563 and one or the other of the volatile storages 1561 or 1661, depending on whether the second task is performed by one or more CPUs 1550 or one or more GPUs 1650 of the node device 1500$y$. Further, as a result of such swapping, it may be unlikely that any page of the data set partition 1131$by$ is still stored within the volatile storage 1561 or 1661.

As further depicted, one or more processors of the node device 1500$z$ have already completed performing the first task with the data set partition 1131$az$ such that the data set partition 1131$bz$ has already been generated within the node device 1500$z$, and then transmitted to the one or more storage devices 1100 for storage. Similarly, the one or more processors of the node device 1500$z$ have already completed performing the second task with the data set partition 1131$az$ such that the data set partition 1131$cz$ has also already been generated within the node device 1500$z$, and then transmitted to the one or more storage devices 1100 for storage. Thus, unlike the node devices 1500$x$ and 1500$y$, the node device 1500$z$ may be deemed to have sufficient available processing and storage resources for the node device 1500$z$ to be assigned to perform another task. As a result of having performed the first task with the data set partition 1131$az$ to generate the data set partition 1131$bz$, and as a result of having performed the second task with the data set partition 1131$az$ to generate the data set partition 1131$cz$, at least a subset of one or more of the data set partitions 1131*az*, 1131*bz* and 1131*cz* may remain stored within the non-volatile storage 1563 of the node device 1500*z* for a limited period of time. Also as a result of having performed the second task more recently than the first task, pages of one or both of the data set partitions 1131*az* and 1131*cz* may still be stored within the one or the other of the volatile storages 1561 or 1661, depending on whether the second task was performed by one or more CPUs 1550 or one or more GPUs 1650 of the node device 1500*z*. However, it may be unlikely that any page of the partition 1131*bz* is still stored within the volatile storage 1561 or 1661.

Thus, under the circumstances just described, and as depicted with dotted lines in FIG. 17B, the node device 1500*z* is available such that it could be assigned to perform the second task with the data set partition 1131*ax* of the data set 1130*a* to generate the data set partition 1131*cx* of the data set 1130*c*. However, as just discussed above, it is the node device 1500*x* that was originally provided with the data set partition 1131*ax* from the one or more storage devices 1100. Therefore, the data set partition 1131*ax* is already stored within the non-volatile storage 1563 of the node device 1500*x* such that the data set partition 1131*ax* would not need to again be transmitted via the network 1999 from the one or more storage devices 1100 if the node device 1500*x* could be assigned to perform the second task with the data set partition 1131*ax*. Also, again, as a result of the underway performance of the first task with the data set partition 1131*ax* within the node device 1500*x*, there is currently swapping of pages of the data set partition 1131*ax* between the non-volatile storage 1563 either of the volatile storages 1561 or 1661. Thus, one or more pages of the data set partition 1131*ax* are currently stored within the volatile storage 1561 or 1661 of the node device 1500*x*, and assigning the performance of the second task with the data set partition 1131*ax* to the node device 1500*x* relatively quickly after the node device 1500*x* completes its performance of the first task may take advantage of the limited time storage of those one or more pages within the volatile storage 1561 or 1661, which may enable the node device 1500*x* to commence performance of the second task that much more quickly.

Therefore, as depicted with dotted lines in FIG. 17B, despite the availability of the node device 1500*z* to be assigned to perform the second task with the data set partition 1131*ax*, the node device 1500*z* is not assigned to do so. Instead, the processor 1350 of the coordinating device 1300 is caused by the assignment component 1341 (referring to FIG. 16) to delay assigning the performance of the second task with the data set partition 1131*ax* to any of the node devices 1500*x-z* for a period of time to provide an opportunity for the node device 1500*x* to complete its performance of the first task with the data set partition 1131*ax*.

As has been discussed, in some embodiments, the duration of the period of time of such delay may be based on indications in the recurringly received node statuses 1535 of how long one or more nodes have taken to complete the same task for which assignment is being delayed (e.g., based on an average generated from the amounts of time required by one or more nodes to complete the same task). However, as has also been discussed, the period of time of the delay may also be based on determinations of differences in the amounts of time required by the node being given the opportunity to complete a task versus the amounts of time required by other nodes to complete the same task. Again, taking into account such differences in amounts of time may be deemed desirable to take into account differences that may exist in the various resources incorporated into different node devices 1500. Thus, in the example of FIGS. 17A-C, the period of time of the delay to provide node device 1500*x* with an opportunity complete the first task with the data set partition 1131*ax* may be based on the amount of time that was required for one or both of the node devices 1500*y* and 1500*z* to complete the first task with their respective data set partitions 1131*ay* and 1131*az* (e.g., an average thereof), and/or on differences in the amount of time required by the node device 1500*x* to complete tasks versus the amounts of time required by the node devices 1500*y* and/or 1500*z* to complete the same tasks.

Regardless of the exact manner in which the period of time of the delay in assigning the performance of the second task with the data set partition 1131*ax* to one of the node devices 1550*x-z* is derived, the processor 1350 of the coordinating device 1300 may employ a clock 1351 that may be incorporated into the processor 1350 (referring to FIG. 16) to monitor the passage of time to determine when the period of time of the delay has fully elapsed. If the period of time of the delay fully elapses before the node device 1500*x* is able to complete its performance of the first task with the data set partition 1131*ax*, then the processor 1350 may be caused by the assignment component 1341 to assign the performance of the second task with the data set partition 1131*ax* to the node device 1500*z*. However, as depicted in FIG. 17C, if the node device 1500*x* does complete its performance of the first task with the data set partition 1131*ax* before the period of time of the delay elapses, then the processor 1350 may be caused to assign the performance of the second task with the data set partition 1131*ax* to the node device 1500*x*. Again, such an assignment of the second task with the data set partition 1131*ax* to the node device 1500*x* may at least take advantage of the storage of at least a portion of the data set partition 1131*ax* within the non-volatile storage 1563, if not also the storage of one or more pages of the data set partition 1131*ax* within the volatile storage 1561 or 1661.

Figure 18A:
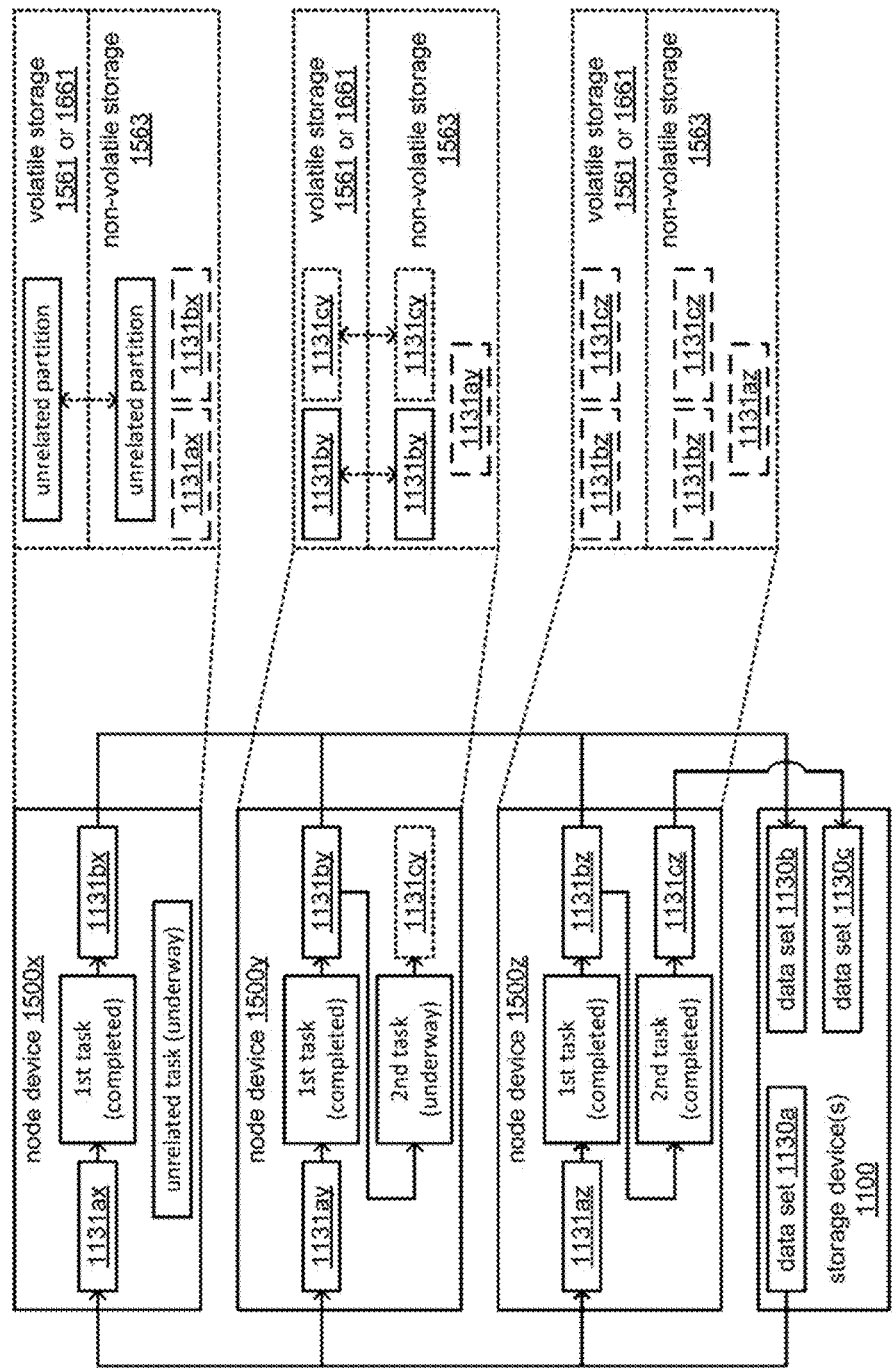
FIGS. 18A, 18B and 18C, together, illustrate another example embodiment of delay in assignment of a data set partition and a task.
Figure 18B:
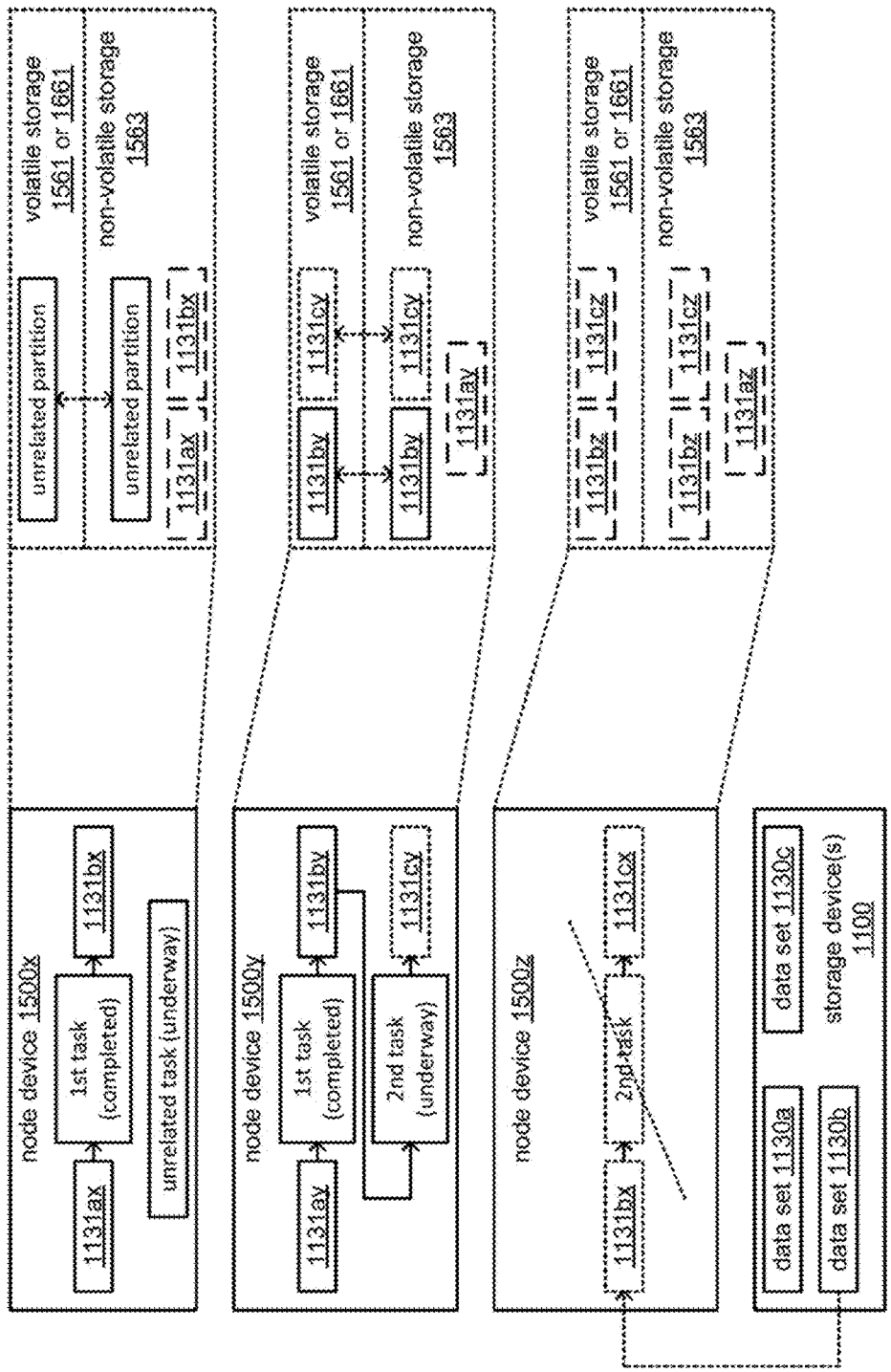
Figure 18C:
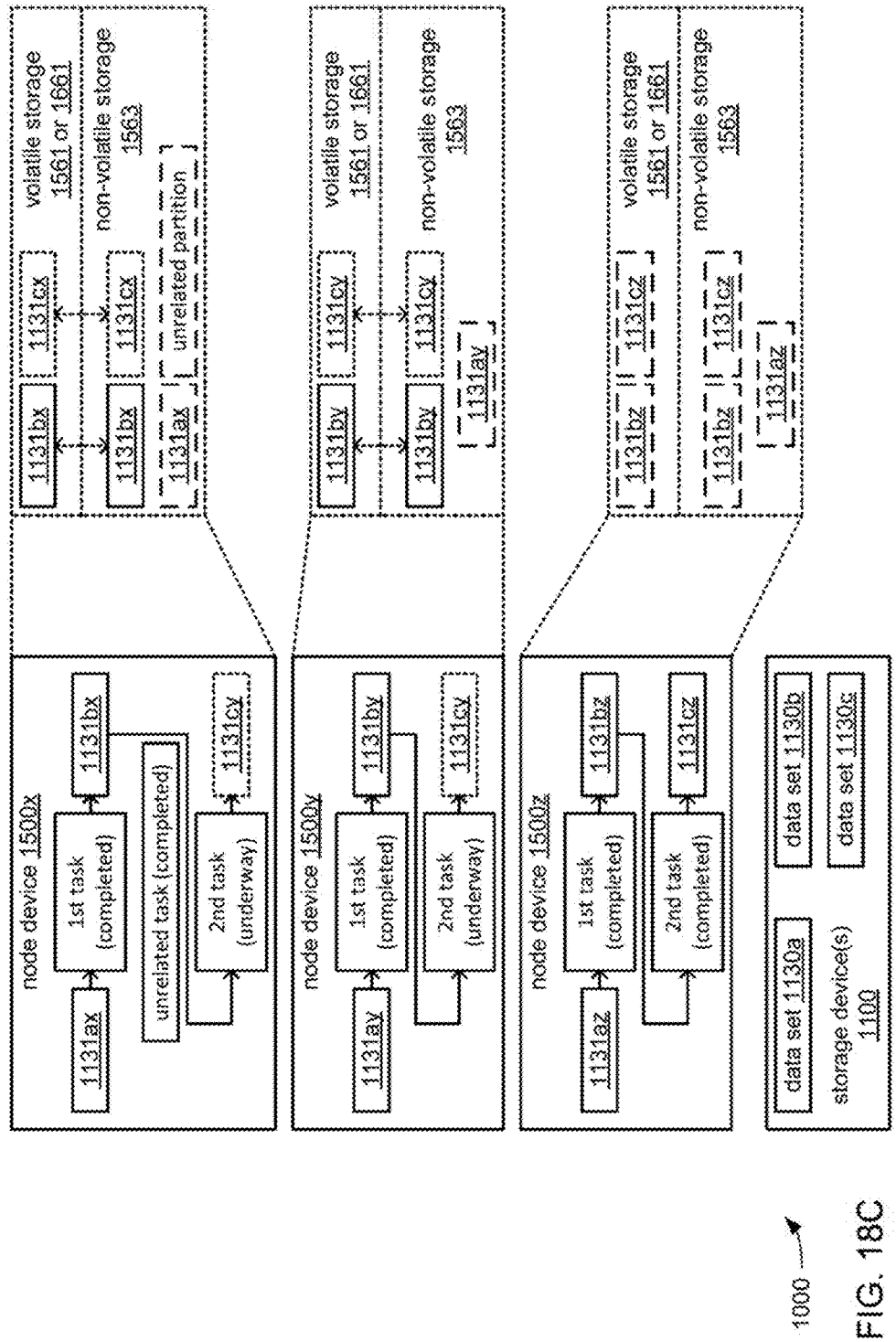

FIGS. 18A, 18B and 18C, taken together in order from FIG. 18A to FIG. 18C, illustrate another example embodiment of performance of tasks among multiple selected ones of the node devices 1500 of the node device grid 1005. More specifically, FIGS. 18A-C depict the same example triplet of node devices 1500*x*, 1500*y* and 1500*z* performing a first task with an example data set 1130*a* to generate an example data set 1130*b*, and then performing a second task with the example data set 1130*b* generated by the performance of the first task. In performing the second task with the example data set 1130*b*, each of the example node devices 1500*x-z* is to generate still another example data set 1130*c*. As with FIGS. 17A-C, it should be noted that this example based on just three node devices 1500, and involving three data sets 1130*a-c* that may be small enough in size to be distributed among just the three node devices 1500*x-z*, is another deliberately simplified example presented and discussed herein for purposes of explanation and understanding, and should not be taken as limiting. Again, it is envisioned that embodiments are likely to entail performing tasks with considerably larger data sets 1130, and therefore, are likely to entail the use of considerably more of the node devices 1500.

Starting with FIG. 18A, each of the three node devices 1500*x-z* was assigned to perform the first task with a corresponding one of three data set partitions 1131*ax-az* of the data set 1130*a* to each generate a corresponding one of three data set partitions 1131*bx-bz* of the data set 1130*b*. As depicted, all three of the node devices 1500*x-z* have completed their performances of the first task, and each has transmitted its corresponding one of the data set partitions 1131bx-bz to the one or more storage devices 1100 for storage as the data set 1130b. To enable these performances of the first task, each of the three node devices 1500x-z was provided with its corresponding one of the three data set partitions 1131ax-az of the data set 1130a from the one or more storage devices 1100 via the network 1999.

Following their completions of the first task, each of the node devices 1500y and 1500z were assigned to perform the second task with the data set partitions 1131by and 1131bz that the node devices 1500y and 1500z, respectively, generated as a result of their performances of the first task. However, following its completion of the first task the node device 1500x was assigned to perform a task of another and unrelated analysis routine. As previously discussed, the assignment of tasks of different and unrelated analysis routines may occur in embodiments in which the node device grid 1005 is shared to the extent that multiple unrelated analysis routines are performed at the same time using the node devices 1500.

As depicted, one or more processors of the node device 1500x (e.g., one or more CPUs 1550 and/or one or more GPUs 1650) are still underway in performing the task of the unrelated analysis routine. Additionally, it may be that the performance of the task of the unrelated analysis routine consumes sufficient processing and/or storage resources of the node device 1500x that the node device 1500x may be deemed to have insufficient processing and/or storage resources to be assigned to perform another task until the task of the unrelated analysis routine has been completed. As a result of having performed the first task with the data set partition 1131ax to generate the data set partition 1131bx, at least a subset of one or both of the partitions 1131ax and 1131bx may remain stored within the non-volatile storage 1563 of the node device 1500x for a limited period of time. In performing the task of the unrelated analysis routine, there may be swapping of pages of an unrelated data set partition between the non-volatile storage 1563 and one or the other of the volatile storages 1561 or 1661, depending on whether the task of the unrelated analysis routine is performed by one or more CPUs 1550 or one or more GPUs 1650 of the node device 1500x. Further, as a result of such swapping, it may be unlikely that any page of the data set partitions 1131ax or 1131bx is still stored within the volatile storage 1561 or 1661.

As depicted, one or more processors of the node device 1500y are still underway in performing the second task with the data set partition 1131by such that the data set partition 1131cy is still being generated within the node device 1500y. Additionally, it may be that the performance of the second task with the data set partition 1131by consumes sufficient processing and/or storage resources of the node device 1500y that the node device 1500y may be deemed to have insufficient processing and/or storage resources to be assigned to perform another task until the second task with the data set partition 1131ay has been completed. As a result of having performed the first task with the data set partition 1131ay to generate the data set partition 1131by, at least a subset of the partition 1131ay may remain stored within the non-volatile storage 1563 of the node device 1500y for a limited period of time. In performing the second task with the data set partition 1131by to generate the data set partition 1131cy, at least a subset of each of these partitions may be stored within the non-volatile storage 1563 of the node device 1500x. Also, pages of these two data set partitions may be swapped between the non-volatile storage 1563 and one or the other of the volatile storages 1561 or 1661, depending on whether the second task is performed by one or more CPUs 1550 or one or more GPUs 1650 of the node device 1500y. Further, as a result of such swapping, it may be unlikely that any page of the data set partition 1131ay is still stored within the volatile storage 1561 or 1661.

As further depicted, one or more processors of the node device 1500z have already completed performing the second task with the data set partition 1131bz such that the data set partition 1131cz has also already been generated within the node device 1500z, and then transmitted to the one or more storage devices 1100 for storage. Thus, unlike the node devices 1500x and 1500y, the node device 1500z may be deemed to have sufficient available processing and storage resources for the node device 1500z to be assigned to perform another task. As a result of having performed the first task with the data set partition 1131az to generate the data set partition 1131bz, and as a result of having performed the second task with the data set partition 1131bz to generate the data set partition 1131cz, at least a subset of one or more of the data set partitions 1131az, 1131bz and 1131cz may remain stored within the non-volatile storage 1563 of the node device 1500z for a limited period of time. Also as a result of having performed the second task more recently than the first task, pages of one or both of the data set partitions 1131bz and 1131cz may still be stored within the one or the other of the volatile storages 1561 or 1661, depending on whether the second task was performed by one or more CPUs 1550 or one or more GPUs 1650 of the node device 1500z. However, it may be unlikely that any page of the partition 1131az is still stored within the volatile storage 1561 or 1661.

Thus, under the circumstances just described, and as depicted with dotted lines in FIG. 18B, the node device 1500z is available such that it could be assigned to perform the second task with the data set partition 1131bx of the data set 1130b to generate the data set partition 1131cx of the data set 1130c. However, as just discussed above, it is the node device 1500x that originally generated the data set partition 1131bx. Therefore, the data set partition 1131bx is already stored within the non-volatile storage 1563 of the node device 1500x such that the data set partition 1131bx would not need to be transmitted via the network 1999 from the one or more storage devices 1100 (or from the node device 1500x) if the node device 1500x could be assigned to perform the second task with the data set partition 1131bx. Thus, assigning the performance of the second task with the data set partition 1131bx to the node device 1500x relatively quickly after the node device 1500x completes its performance of the task of the unrelated analysis routine may take advantage of the limited time storage of the data set portion 1131bx within the non-volatile storage 1563 of the node device 1500x, which may enable the node device 1500x to commence performance of the second task that much more quickly.

Therefore, as depicted with dotted lines in FIG. 18B, despite the availability of the node device 1500z to be assigned to perform the second task with the data set partition 1131bx, the node device 1500z is not assigned to do so. Instead, the processor 1350 of the coordinating device 1300 is caused by the assignment component 1341 (referring to FIG. 16) to delay assigning the performance of the second task with the data set partition 1131bx to any of the node devices 1500x-z for a period of time to provide an opportunity for the node device 1500x to complete its performance of the task of the unrelated analysis routine. Similar to the example embodiment of FIGS. 17A-C, if the period of time of the delay fully elapses before the node device 1500*x* is able to complete its performance of the task of the unrelated analysis routine, then the processor 1350 may be caused by the assignment component 1341 (referring to FIG. 16) to assign the performance of the second task with the data set partition 1131*bx* to the node device 1500*z*. However, as depicted in FIG. 18C, if the node device 1500*x* does complete its performance of the task of the unrelated analysis routine before the period of time of the delay elapses, then the processor 1350 may be caused to assign the performance of the second task with the data set partition 1131*bx* to the node device 1500*x*.

Figure 19:
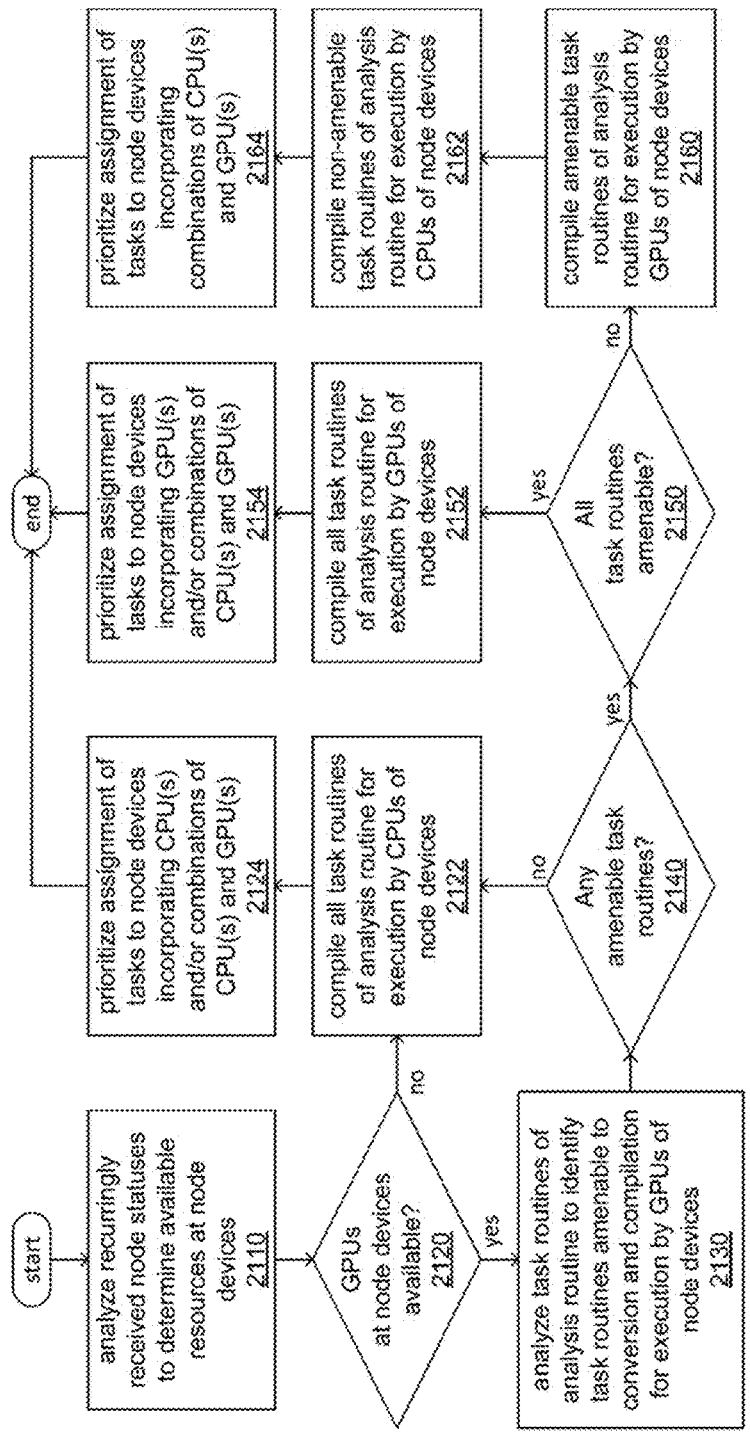
FIG. 19 illustrates still an example embodiment of analysis of task routines and assignment of tasks by a coordinating device.

FIG. 19 illustrates an example embodiment of a logic flow 2100. The logic flow 2100 may be representative of some or all of the operations executed by one or more embodiments described herein. More specifically, the logic flow 2100 may illustrate operations performed by the processor 1350 in executing the control routine 1340 and/or the compile routine 1440, and/or performed by other component(s) of the coordinating device 1300.

At 2110, a processor of a coordinating device of a distributed processing system (e.g., the processor 1350 of the coordinating device 1300 of the distributed processing system 1000) may analyze node statuses that the coordinating device recurringly receives from node devices of a grid of node devices (e.g., the node statuses 1535 of the node devices 1500 of the node device grid 1005) to determine what processing resources are available within each of the node devices. As has been discussed, the node statuses 1535 recurringly transmitted to the coordinating device 1300 by the node devices 1500 may indicate what processing resources are incorporated into each of the node devices 1500 (e.g., what CPU(s) 1500 and/or GPU(s) 1600 are included, what processing features are provided by each, etc.), and/or to what degree those processing resources are currently available within each of the node devices 1500.

At 2120, the processor of the coordinating device may check whether there are any GPUs indicated in the node statuses as being sufficiently available within any of the node devices such that a task could be assigned to those node devices to be performed by such available GPUs. If no GPUs are so available, then at 2122, the processor may compile all of the task routines of an analysis routine to be executed by the CPUs of the node devices (e.g., the task routines 1211 of an analysis routine 1210). At 2124, the processor may then prioritize the assignment of all of the tasks of the analysis routine to node devices selected due to incorporating only one or more CPUs and/or incorporating a combination of one or more CPUs and one or more GPUs.

However, if there are GPUs deemed to be sufficiently available at 2120, then at 2130, the processor may analyze each of the task routines of the analysis routine to determine whether any of the task routines are amenable to a conversion of their instructions and a compilation to be executed by the GPUs of the node devices of the node device grid. If, at 2140, there are no such amenable task routines, then at 2122, the processor may compile all of the task routines of the analysis routine to be executed by the CPUs of the node devices. Then, once again, at 2124, the processor may then prioritize the assignment of all of the tasks of the analysis routine to node devices selected due to incorporating only one or more CPUs and/or incorporating a combination of one or more CPUs and one or more GPUs. As previous discussed, where none of the task routines 1211 of an analysis routine 1210 are amenable to being compiled for execution by a GPU 1650, the prioritization of assignment of the tasks of such an analysis routine 1210 to node devices 1500 that incorporate only CPU(s) 1550, if possible, and/or to node devices 1500 that incorporate a combination of CPU(s) 1550 and GPU(s) 1650, if need be, may be deemed desirable to minimize assignments of tasks to node devices 1500 that incorporate GPUs 1650 when none of the tasks are to be performed by a GPU 1650. This may aid in leaving GPUs 1650 of the node devices 1500 of the node device grid 1005 more readily available for use in performing tasks of another analysis routine that are able to be performed by GPUs.

However, if at 2140, there is at least one task routine of the analysis routine that is amenable to such conversion and compilation, then a check may be made at 2150 as to whether all of the task routines of the analysis routine are so amenable. If so, then at 2152, the processor may compile all of the task routines of the analysis routine to be executed by the GPUs of the node devices. At 2154, the processor may then prioritize the assignment of all of the tasks of the analysis routine to node devices selected due to incorporating only one or more GPUs and/or incorporating a combination of one or more CPUs and one or more GPUs.

However, if at 2150, there is a mixture of task routines that are and are not amenable to such conversion and compilation, then at 2160, the processor may compile all of the task routines of the analysis routine that are so amenable to be executed by the GPUs of the node devices. At 2162, the processor may compile all of the task routines of the analysis routine that are not so amenable to be executed by the CPUs of the node devices. At 2164, the processor may then prioritize the assignment of all of the tasks of the analysis routine to node devices selected due to incorporating a combination of one or more CPUs and one or more GPUs.

Figure 20:
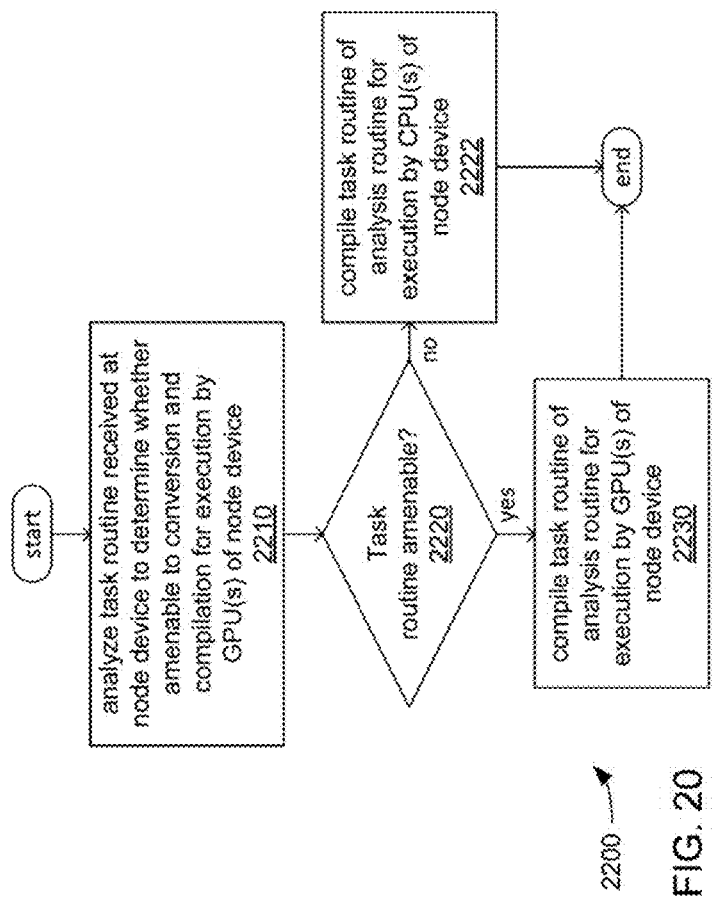
FIG. 20 illustrates still an example embodiment of analysis and compiling of a task routine by a node device.

FIG. 20 illustrates an example embodiment of a logic flow 2200. The logic flow 2200 may be representative of some or all of the operations executed by one or more embodiments described herein. More specifically, the logic flow 2200 may illustrate operations performed by the one or more CPUs 1550 in executing the control routine 1540 and/or the compile routine 1440, and/or performed by other component(s) of one or more of the node devices 1500.

At 2210, a CPU of a node device of a distributed processing system (e.g., a CPU 1550 of one of the node devices 1500 of the distributed processing system 1000) may analyze a task routine (e.g., a task routine 1211 of an analysis routine 1210) to determine whether it is amenable to a conversion of their instructions and a compilation to be executed by the one or more GPUs of the node device (e.g., one or more of the GPUs 1650). As previously discussed, in embodiments in which the coordinating device 1300 does not compile the task routines 1211, one or more CPUs 1550 of each of the node devices 1500 may do so. Also, such compiling may include an analysis of each task routine 1211 received by each of the node devices 1500 that incorporates one or more of the GPUs 1650 to determine whether to compile for execution by one or more CPUs 1550 or one or more GPUs 1650.

If, at 2220, the task routine is not so amenable, then at 2222, the CPU may compile the task routine of the analysis routine to be executed by the one or more CPUs of the node device. However, if at 2220, the task routine is so amenable, then at 2230, the CPU may compile the task routine of the analysis routine to be executed by the one or more GPUs of the node device.

Figure 21:
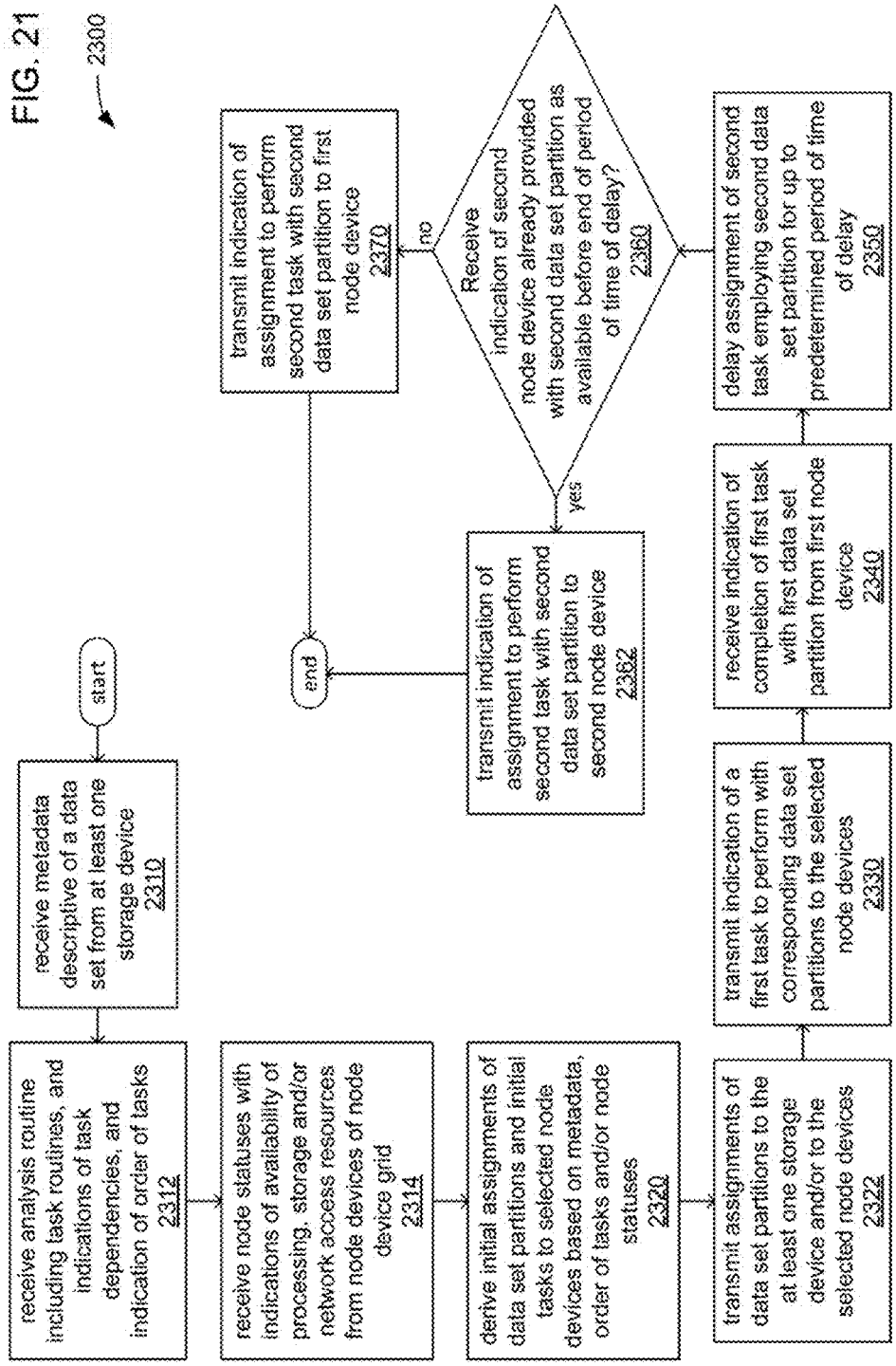
FIG. 21 illustrates still an example embodiment of initial and subsequent assignments of tasks by a coordinating device.

FIG. 21 illustrates an example embodiment of a logic flow 2300. The logic flow 2300 may be representative of some or all of the operations executed by one or more embodiments described herein. More specifically, the logic flow 2300 may illustrate operations performed by the processor 1350 in executing the control routine 1340, and/or performed by other component(s) of the coordinating device 1300.

At 2310, a processor of a coordinating device of a distributed processing system (e.g., the processor 1350 of the coordinating device 1300 of the distributed processing system 1000) may receive metadata descriptive of a data set from one or more storage devices (e.g., the metadata 1135 from the one or more storage devices 1100). At 2312, the processor may receive an analysis routine that includes multiple task routines from the one or more storage devices and/or a viewing device (e.g., the analysis routine 1210 including multiple task routines 1211 from the one or more storage devices 1100 or from the viewing device 1800). At 2314, the processor may receive most recent transmissions of node status data from node devices of a grid of node devices of the distributed processing system (e.g., the node statuses 1535 of the node devices 1500 of the node device grid 1005). As previously discussed, in embodiments in which the node devices 1500 also serve as storage devices of at least the one or more data sets 1130, the coordinating device 1300 may receive the metadata 1135 and/or the analysis routine from one of the node devices 1500.

At 2320, the processor may derive initial assignments of data set partitions (e.g., the data set partitions 1131) and initial tasks, including a selection of multiple ones of the node devices to which data set partitions are to be distributed, and initial assignments of the one or more initial tasks are to be made. At 2322, the processor may transmit indications of the assigned distribution of the data set partitions to the one or more storage devices and/or to the selected node devices. As has been discussed, the distribution of data set partitions to the selected node devices from the one or more storage devices may be coordinated among the one or more storage devices, the selected node devices and/or the coordinating device in any of a variety of ways using any of a variety of protocols to cause the transmission of the data set partitions to the selected node devices.

At 2330, the processor may transmit indications to the selected node devices of the assignment of a first task to be performed at the selected node devices with corresponding ones of the data set partitions. As has been discussed, the transmission of task routines of the analysis routine, or the transmission of CPU task routines and/or GPU task routines (e.g., the task routines 1211, the CPU task routines 1571 and/or the GPU task routines 1671) to the selected node devices may occur as part of the signaling of assignments of tasks to the selected node devices.

At 2340, the processor may receive, from a first node device of the selected node devices, an indication of completion of the first task with the first data set partition by the first node device. As has been discussed, such indications may be conveyed to the coordinating device as part of the recurring transmissions of node statuses 1535.

At 2350, the processor may delay the assignment of a performance of a second task employing a second data set partition to any of the selected node devices, including the first node device, for a predetermined period of time of delay to provide an opportunity for a second node device of the selected node devices in which the second data set partition is already stored to become available. As has been explained, such imposition of a delay in assigning a next task with a particular data set partition may be to allow a node device that already stores that particular data set partition to become available so as to take advantage of the storage of that particular data set partition within that node device by assigning the next task with the particular data set partition to that node device. Again, in this way, the network bandwidth resources and time required to transmit the particular data set partition to another node device may both be spared by waiting in this manner for that node device to become available.

At 2360, the processor may check whether the second node device, in which the second data set partition is already stored, has become available by the end of the period of time of delay. If the second node device has become available within the period of time of delay, then the processor may transmit an indication of assignment to perform the second task with the second data set partition to the second node device at 2362. However, if the second node device did not become available within the period of time of delay, then the processor may transmit an indication of assignment to perform the second task with the second data set partition to the first node device at 2370.

Figure 22:
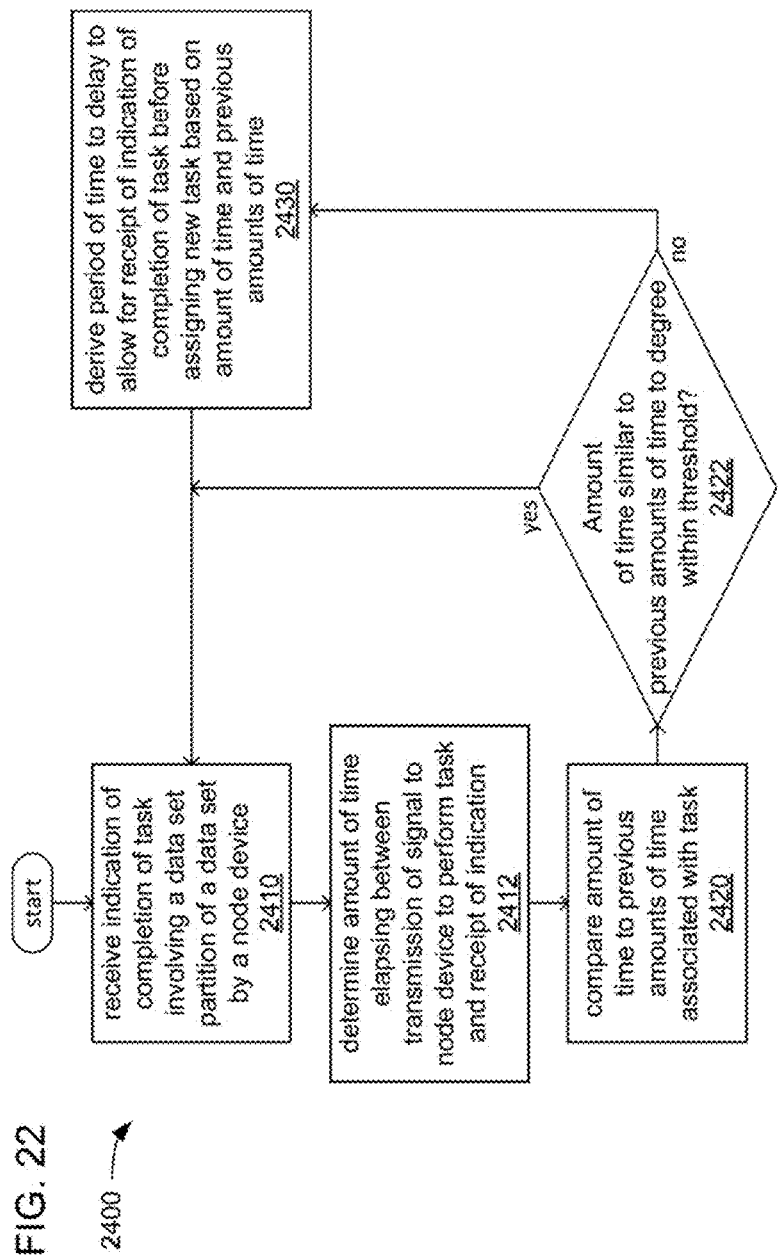
FIG. 22 illustrates still an example embodiment of derivation of a period of time of delay for use in a subsequent assignment of a task.

FIG. 22 illustrates an example embodiment of a logic flow 2400. The logic flow 2300 may be representative of some or all of the operations executed by one or more embodiments described herein. More specifically, the logic flow 2400 may illustrate operations performed by the processor 1350 in executing the control routine 1340, and/or performed by other component(s) of the coordinating device 1400.

At 2410, a processor of a coordinating device of a distributed processing system (e.g., the processor 1350 of the coordinating device 1300 of the distributed processing system 1000) may receive an indication from a node device of a node device grid of the distributed processing system (e.g., one of the node devices 1500 of the node device grid 1005) of that node device having completed its performance of a task routine involving a data set partition of a data set (e.g., one of the data set partitions 1131 of the data set 1130). At 2412, the processor may determine the amount of time that elapsed between its transmission of a signal to the node device to perform the task with the data set partition, and the receipt of the indication from the node device of completion of that performance of that task.

At 2420, the processor may compare the new elapsed time to previous elapsed times required by other node devices to perform the same task with their corresponding data set partitions of the same data set. At 2422, the processor may check whether the new elapsed time is similar to the previous elapsed times for those performances of the same task within a predetermined threshold of similarity. If not, then the processor may employ the new elapsed time along with the previous elapsed times to again derive a period of time to delay by which to delay a new task assignment to allow for the completion of the task by another node. As has been discussed, such determinations of a period of time of delay may entail averaging of amounts of time required by different ones of the node devices 1500 to perform the same task.

Figure 23:
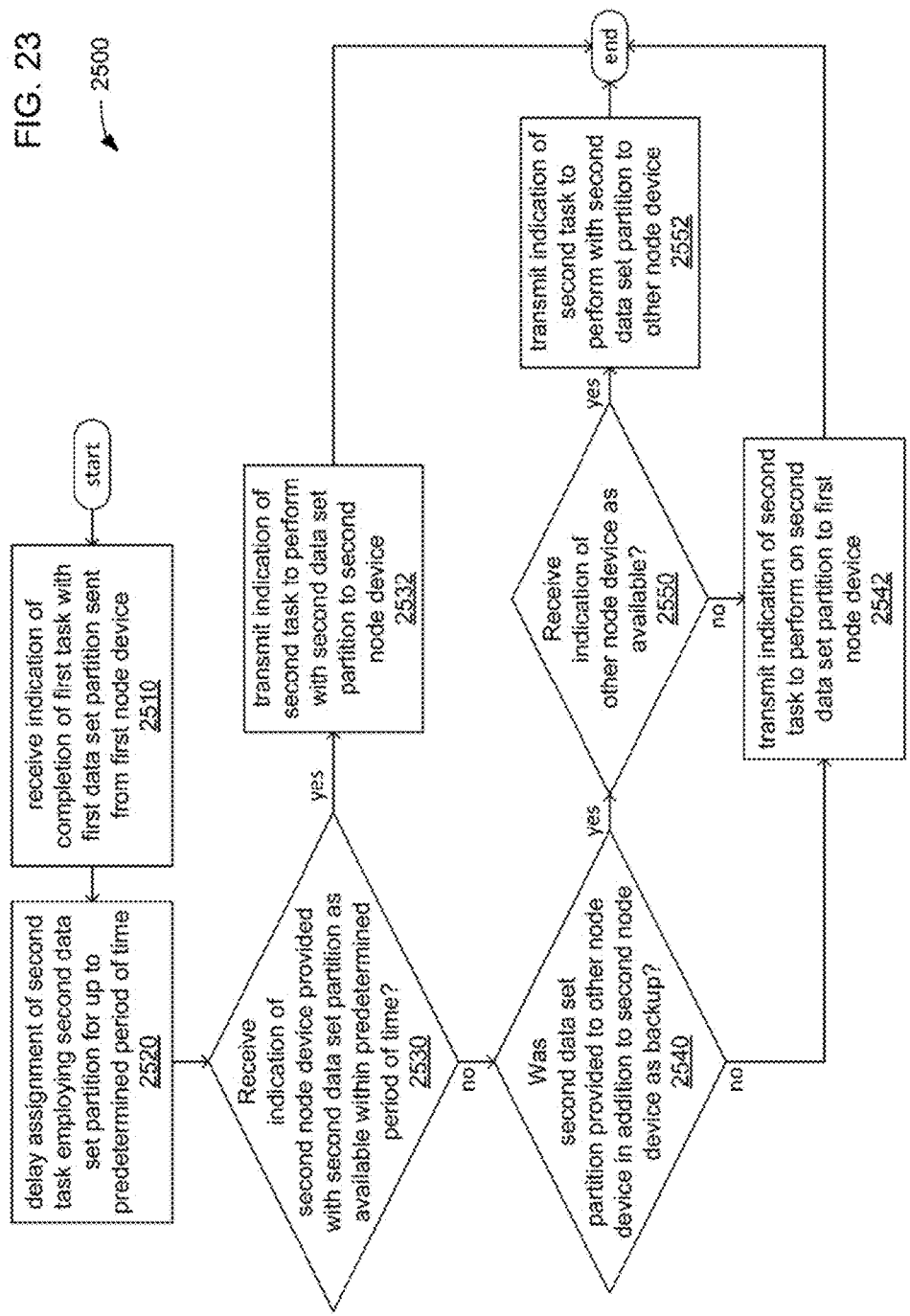
FIG. 23 illustrates still an example embodiment of delayed assignment of a task by a coordinating device.

FIG. 23 illustrates an example embodiment of a logic flow 2500. The logic flow 2500 may be representative of some or all of the operations executed by one or more embodiments described herein. More specifically, the logic flow 2500 may illustrate operations performed by the processor 1350 in executing the control routine 1340, and/or performed by other component(s) of the coordinating device 1300.

At 2510, a processor of a coordinating device of a distributed processing system (e.g., the processor 1350 of the coordinating device 1300 of the distributed processing system 1000) may receive, from a first node device of a node device grid of the distributed processing system (e.g., one of the node devices 1500 of the node device grid 1005), an indication of completion of a first task with a first data set partition of a data set (e.g., one of the data set partitions 1131 of a data set 1130) by the first node device. As has been discussed, such indications may be conveyed to the coordinating device as part of the recurring transmissions of node statuses 1535.

At 2520, the processor may delay the assignment of a performance of a second task employing a second data set partition of the same data set to any node devices of the node device grid, including the first node device, for a predetermined period of time of delay to provide an opportunity for a second node device of the node device grid in which the second data set partition is already stored to become available. At 2530, the processor may check whether the second node device, in which the second data set partition is already stored, has become available by the end of the period of time of delay. If the second node device has become available within the period of time of delay, then the processor may transmit an indication of assignment to perform the second task with the second data set partition to the second node device at 2532.

However, if at 2530, the second node device did not become available within the period of time of delay, then the processor may check at 2540 if there was another node device of the node device grid that was provided with the second data set partition to prepare the other node device to serve as a backup node device for a task involving the second data set partition. If there is no such other device, then the processor may transmit an indication of assignment to perform the second task with the second data set partition to the first node device at 2542.

However, if at 2540, there is such another node device, then the processor may check at 2550 whether an indication has been received that the other node device is currently available to be assigned a task. If not, then again, the processor may transmit an indication of assignment to perform the second task with the second data set partition to the first node device at 2542. However, if such an indication of the other node device currently being available has been received, then the processor may transmit an indication of assignment to perform the second task with the second data set partition to the other node device at 2552.

In various embodiments, each of the processors 1150, 1350, 1550, 1650 and 1850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the CPU 1550 of each of the one or more node devices 1500 may be selected to efficiently perform the analysis of multiple instances of job flows at least partially in parallel. By way of example, the CPU 1550 may incorporate a single-instruction multiple-data (SIMD) architecture, may incorporate multiple processing pipelines, and/or may incorporate the ability to support multiple simultaneous threads of execution per processing pipeline.

Alternatively or additionally, in a specific embodiment, each GPU 1650 of the one or more node devices that may include at least one of the GPUs 1650 may incorporate multi-threaded capabilities and/or multiple processor cores to enable parallel performances of tasks. By way of example, the GPU 1650 may incorporate an internal architecture designed to enable parallel performances of tasks employing a relatively limited instruction set across hundreds, thousands, tens of thousands, or still more threads of execution to accommodate graphics applications involving relatively high resolution imagery.

In various embodiments, each of the control routines 1140, 1340, 1540, 1840 and 1640, including the components of which each is composed, may be selected to be operative on whatever type of processor or processors that are selected to implement applicable ones of the processors 1150, 1350, 1550, 1850 and/or 1650 within corresponding ones of the devices 1100, 1300, 1500 and/or the graphics controller 1600. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1150, 1550 and/or 1850. Where one or more device drivers are included, those device drivers may provide support for any of a variety of other components, whether hardware or software components, of the devices 1100, 1300, 1500, 1800 and/or 1600.

In various embodiments, each of the storages 1160, 1360, 1560, 1660 and 1860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1160 in embodiments in which the one or more of the storage devices 1100 provide storage of one or more data sets 1130, or in which the non-volatile storage 1563 in embodiments in which the node devices 1500 provide storage of one or more data sets 1130, may be implemented with a redundant array of independent discs (RAID) of a RAID level selected to provide fault tolerance to the storage of one or more data sets 1130.

In various embodiments, each of the input devices 1320 and 1820 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the displays 1380 and 1880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 1180 and/or 1880 may each be a touch-screen display such that the input devices 1110 and/or 1810, respectively, may be incorporated therein as touch-sensitive components thereof.

In various embodiments, each of the network interfaces 1190, 1390, 1590 and 1890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 1190, 1390 and/or 1590 may be implemented with multiple copper-based or fiber-optic based network interface ports to provide redundant and/or parallel pathways in exchanging one or more of the data set partitions 1131, the task routines 1211, the CPU task routines 1571 and/or the GPU task routines 1671.

In various embodiments, the division of processing and/or storage resources among the node devices 1300, and/or the API architectures employed to support communications between the node devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the data sets 1130 are not dependent on, nor constrained by, existing API architectures and/or supporting communications protocols. More broadly, there is nothing in the manner in which the data sets 1130 may be organized in storage, transmission and/or distribution via the network 1999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
  analyze a current status of resources of at least one node device of a plurality of node devices to determine an availability of at least one graphics processing unit (GPU) of the at least one node device to be assigned to perform a first task of an analysis routine, wherein:
    operation of the plurality of node devices is coordinated to perform tasks of analysis routines at least partially in parallel;
    the analysis routine is generated for execution by at least one central processing unit (CPU) of the at least one node; and
    the resources of the at least one node device are selected from a group consisting of the at least one CPU, the at least one GPU, and storage space within at least one storage of the at least one node device;
  in response to a determination that the at least one GPU is available to be assigned to perform the first task of the analysis routine:
    analyze a first task routine of the analysis routine to determine whether the first task routine is able to be compiled to generate a GPU task routine for execution by the at least one GPU to cause the at least one GPU to perform multiple instances of the first task of the analysis routine at least partially in parallel without a dependency among inputs and outputs of the multiple instances of the first task, wherein:
      the first task routine is generated for execution by the at least one CPU to perform the first task of the analysis routine; and
      the determination of whether the first task routine is able to be compiled to generate the GPU task routine comprises a determination of whether the first task routine includes an instruction that prevents the compilation to generate the GPU task routine and a determination of whether inputs and outputs of the first task routine are defined to not require the dependency; and in response to a determination that the first task routine is able to be compiled to generate the GPU task routine:
assign a data set partition of a plurality of data set partitions of a data set to the at least one node device to enable access to the data set partition by the at least one GPU;
employ a conversion rule to convert at least one instruction of the first task routine into at least one corresponding instruction of the GPU task routine;
compile the at least one corresponding instruction of the GPU task routine for execution by the at least one GPU; and
assign a performance of the first task of the analysis routine with the data set partition to the at least one node device to enable performance of the multiple instances of the first task with the data set partition by the at least one GPU.

2. The apparatus of claim 1, wherein to determine whether the first task routine includes an instruction that prevents the compilation to generate the GPU task routine, the processor is caused to:
determine whether the instruction of the first task routine is included in a set of instructions that cannot be converted into at least one instruction able to be executed by the at least one GPU; and
in response to a determination that the instruction of the first task routine is not included in the set of instructions, determine whether the instruction of the first task routine is used in the first task routine in a manner that prevents conversion into at least one instruction able to be executed by the at least one GPU.

3. The apparatus of claim 1, wherein to convert the at least one instruction of the first task routine into the at least one corresponding instruction of the GPU task routine, the processor is caused to convert the at least one instruction of the first task routine from a first programming language into the at least one corresponding instruction in a second programming language in accordance with the conversion rule.

4. The apparatus of claim 1, wherein:
the at least one storage of the at least one node device comprises a first volatile storage communicatively coupled to the at least one CPU, and a second volatile storage communicatively coupled to the at least one GPU;
assigning the data set partition to the at least one node device to enable access by to the data set partition by the at least one GPU comprises causing the data set partition to be stored within the second volatile storage; and
in response to a determination that the at least one GPU is not available to be assigned to perform the first task of the analysis routine, the processor is caused to perform operations comprising:
refrain from analyzing the first task routine to determine whether the first task routine is able to be compiled to generate the GPU task routine;
assign the data set partition to the at least one node device to cause storage of the data set partition within the first volatile storage to enable access to the data set partition by the at least one CPU;
compile the first task routine for execution by the at least one CPU; and
assign the performance of the first task of the analysis routine with the data set partition to the at least one node device to enable performance of the first task with the data set partition by the at least one CPU.

5. The apparatus of claim 1, wherein:
the apparatus comprises a coordinating device that coordinates the operation of the plurality of node devices;
the processor is caused to recurringly receive updates to the current status from each node device of the plurality of node devices; and
to analyze the current status to determine availability of the at least one GPU of the at least one node device, the processor is caused to identify a node device of the plurality of node devices that incorporates a GPU indicated by the current status as available.

6. The apparatus of claim 5, wherein to assign the data set partition of the data set to the at least one node device, the processor is caused to perform operations comprising:
analyze a metadata indicative of structural features of the data set to identify a restriction in a manner in which the data set is able to be divided into the plurality of data set partitions, wherein the restriction is selected from a group consisting of an indication of a smallest atomic unit of data within the data set, and a specification of a partitioning scheme; and
derive a division the data set into the plurality of data set partitions based at least partially on the restriction.

7. The apparatus of claim 6, wherein the processor is caused to perform operations comprising:
retrieve the metadata from at least one storage device at which the data set is stored; and
transmit an indication of the assignment of the data set partition to the at least one node device or the at least one storage device to cause a transmission of the data set partition from the at least one storage device to the at least one node device.

8. The apparatus of claim 1, wherein:
the apparatus comprises a node device of the at least one node device;
the node device comprises a GPU of the at least one GPU;
the processor comprises a CPU of the at least one CPU; and
to analyze the current status to determine availability of the at least one GPU of the at least one node device, the CPU is caused to determine whether the GPU of the node device is indicated by the current status as available.

9. The apparatus of claim 1, wherein the processor is caused to perform operations comprising:
analyze a second task routine of the analysis routine to determine whether the second task routine is able to be compiled to generate another GPU task routine for execution by the at least one GPU to cause the at least one GPU to perform multiple instances of the second task of the analysis routine at least partially in parallel without a dependency among inputs and outputs of the multiple instances of the second task, wherein the second task routine is generated for execution by the at least one CPU to perform a second task of the analysis routine; and
in response to a determination that the second task routine is not able to be compiled to generate the other GPU task routine:
compile the second task routine for execution by the at least one CPU; and
assign a performance of the second task of the analysis routine with the data set partition to the at least one node device to enable performance of the second task with the data set partition by the at least one CPU.

10. The apparatus of claim 1, wherein the conversion rule is selected from a group consisting of:
a specification of a set of instructions that each prevent compilation of the first task routine to generate the GPU task routine if present within the first task routine;
a specification of a set of instructions that each would not prevent compilation of the first task routine to generate the GPU task routine if present within the first task routine;
a specification of a manner of use of an instruction that prevents compilation of the first task routine to generate the GPU task routine if the manner of use of the instruction occurs within the first task routine, wherein presence of the instruction within the first task routine otherwise does not prevent compilation of the first task routine to generate the GPU task routine;
a specification of a procedure to convert instructions in the first task routine that are to be executed in a loop by the at least one CPU into corresponding instructions of the GPU task routine that are to be executed in parallel by the at least one GPU in a corresponding loop of fewer iterations than the loop;
a specification of a procedure to convert instructions in the first task routine that are to be executed in a loop by the at least one CPU into corresponding instructions of the GPU task routine that are to be executed in parallel by the at least one GPU and not in a loop; and
a specification of a procedure to convert instructions in the first task routine that define a data structure comprising entries to be accessed sequentially during execution of the first task routine by the at least one CPU into corresponding instructions of the GPU task routine that define a corresponding data structure comprising entries to be accessed in parallel during execution of the GPU task routine by the at least one GPU.

11. A computer-program product tangibly embodied in a non-transitory machine-readable storage medium, the computer-program product including instructions operable to cause a processor to perform operations comprising:
analyze a current status of resources of at least one node device of a plurality of node devices to determine an availability of at least one graphics processing unit (GPU) of the at least one node device to be assigned to perform a first task of an analysis routine, wherein:
operation of the plurality of node devices is coordinated to perform tasks of the analysis routine at least partially in parallel;
the analysis routine is generated for execution by at least one central processing unit (CPU) of the at least one node; and
the resources of the at least one node device are selected from a group consisting of the at least one CPU, the at least one GPU, and storage space within at least one storage of the at least one node device;
in response to a determination that the at least one GPU is available to be assigned to perform the first task of the analysis routine:
analyze a first task routine of the analysis routine to determine whether the first task routine is able to be compiled to generate a GPU task routine for execution by the at least one GPU to cause the at least one GPU to perform multiple instances of the first task of the analysis routine at least partially in parallel without a dependency among inputs and outputs of the multiple instances of the first task, wherein:
the first task routine is generated for execution by the at least one CPU to perform the first task of the analysis routine; and
the determination of whether the first task routine is able to be compiled to generate the GPU task routine comprises a determination of whether the first task routine includes an instruction that prevents the compilation to generate the GPU task routine and a determination of whether inputs and outputs of the first task routine are defined to not require the dependency; and
in response to a determination that the first task routine is able to be compiled to generate the GPU task routine:
assign a data set partition of a plurality of data set partitions of a data set to the at least one node device to enable access to the data set partition by the at least one GPU;
employ a conversion rule to convert at least one instruction of the first task routine into at least one corresponding instruction of the GPU task routine;
compile the at least one corresponding instruction of the GPU task routine for execution by the at least one GPU; and
assign a performance of the first task of the analysis routine with the data set partition to the at least one node device to enable performance of the multiple instances of the first task with the data set partition by the at least one GPU.

12. The computer-program product of claim 11, wherein to determine whether the first task routine includes an instruction that prevents the compilation to generate the GPU task routine, the processor is caused to:
determine whether the instruction of the first task routine is included in a set of instructions that cannot be converted into at least one instruction able to be executed by the at least one GPU; and
in response to a determination that the instruction of the first task routine is not included in the set of instructions, determine whether the instruction of the first task routine is used in the first task routine in a manner that prevents conversion into at least one instruction able to be executed by the at least one GPU.

13. The computer-program product of claim 11, wherein to convert the at least one instruction of the first task routine into the at least one corresponding instruction of the GPU task routine, the processor is caused to convert the at least one instruction of the first task routine from a first programming language into the at least one corresponding instruction in a second programming language in accordance with the conversion rule.

14. The computer-program product of claim 11, wherein:
the at least one storage of the at least one node device comprises a first volatile storage communicatively coupled to the at least one CPU, and a second volatile storage communicatively coupled to the at least one GPU;
assigning the data set partition to the at least one node device to enable access by to the data set partition by the at least one GPU comprises causing the data set partition to be stored within the second volatile storage; and
in response to a determination that the at least one GPU is not available to be assigned to perform the first task of the analysis routine, the processor is caused to perform operations comprising:
  refrain from analyzing the first task routine to determine whether the first task routine is able to be compiled to generate the GPU task routine;
  assign the data set partition to the at least one node device to cause storage of the data set partition within the first volatile storage to enable access to the data set partition by the at least one CPU;
  compile the first task routine for execution by the at least one CPU; and
  assign the performance of the first task of the analysis routine with the data set partition to the at least one node device to enable performance of the first task with the data set partition by the at least one CPU.

15. The computer-program product of claim 11, wherein:
  the processor is a component of a coordinating device that coordinates the operation of the plurality of node devices;
  the processor is caused to recurringly receive updates to the current status from each node device of the plurality of node devices; and
  to analyze the current status to determine availability of the at least one GPU of the at least one node device, the processor is caused to identify a node device of the plurality of node devices that incorporates a GPU indicated in the current status as available.

16. The computer-program product of claim 15, wherein to assign the data set partition of the data set to the at least one node device, the processor is caused to perform operations comprising:
  analyze a metadata indicative of structural features of the data set to identify a restriction in a manner in which the data set is able to be divided into the plurality of data set partitions, wherein the restriction is selected from a group consisting of an indication of a smallest atomic unit of data within the data set, and a specification of a partitioning scheme; and
  derive a division the data set into the plurality of data set partitions based at least partially on the restriction.

17. The computer-program product of claim 16, wherein the processor is caused to perform operations comprising:
  retrieve the metadata from at least one storage device at which the data set is stored; and
  transmit an indication of the assignment of the data set partition to the at least one node device or the at least one storage device to cause a transmission of the data set partition from the at least one storage device to the at least one node device.

18. The computer-program product of claim 11, wherein:
  the processor comprises a CPU of the at least one CPU;
  the CPU is a component of a node device of the at least one node device;
  the node device comprises a GPU of the at least one GPU; and
  to analyze the current status to determine availability of the at least one GPU of the at least one node device, the CPU is caused to determine whether the GPU of the node device is indicated by the current status as available.

19. The computer-program product of claim 11, wherein the processor is caused to perform operations comprising:
  analyze a second task routine of the analysis routine to determine whether the second task routine is able to be compiled to generate another GPU task routine for execution by the at least one GPU to cause the at least one GPU to perform multiple instances of the second task of the analysis routine at least partially in parallel without a dependency among inputs and outputs of the multiple instances of the second task, wherein the second task routine is generated for execution by the at least one CPU to perform a second task of the analysis routine; and
  in response to a determination that the second task routine is not able to be compiled to generate the other GPU task routine:
    compile the second task routine for execution by the at least one CPU; and
    assign a performance of the second task of the analysis routine with the data set partition to the at least one node device to enable performance of the second task with the data set partition by the at least one CPU.

20. The computer-program product of claim 11, wherein the at least one GPU supports execution of the at least one corresponding instruction of the GPU task routine in parallel across at least one thousand threads of execution.

21. A computer-implemented method comprising:
  analyzing a current status of resources of at least one node device of a plurality of node devices to determine an availability of at least one graphics processing unit (GPU) of the at least one node device to be assigned to perform a first task of an analysis routine, wherein:
    operation of the plurality of node devices is coordinated to perform tasks of analysis routines at least partially in parallel;
    the analysis routine is generated for execution by at least one central processing unit (CPU) of the at least one node; and
    the resources of the at least one node device are selected from a group consisting of the at least one CPU, the at least one GPU, and storage space within at least one storage of the at least one node device;
  in response to a determination that the at least one GPU is available to be assigned to perform the first task of the analysis routine:
    analyzing a first task routine of the analysis routine to determine whether the first task routine is able to be compiled to generate a GPU task routine for execution by the at least one GPU to cause the at least one GPU to perform multiple instances of the first task of the analysis routine at least partially in parallel without a dependency among inputs and outputs of the multiple instances of the first task, wherein:
      the first task routine is generated for execution by the at least one CPU to perform the first task of the analysis routine; and
      the determination of whether the first task routine is able to be compiled to generate the GPU task routine comprises a determination of whether the first task routine includes an instruction that prevents the compilation to generate the GPU task routine and a determination of whether inputs and outputs of the first task routine are defined to not require the dependency; and
    in response to a determination that the first task routine is able to be compiled to generate the GPU task routine:
      assigning a data set partition of a plurality of data set partitions of a data set to the at least one node device to enable access to the data set partition by the at least one GPU;

employing a conversion rule to convert at least one instruction of the first task routine into at least one corresponding instruction of the GPU task routine;

compiling the at least one corresponding instruction of the GPU task routine for execution by the at least one GPU; and assigning a performance of the first task of the analysis routine with the data set partition to the at least one node device to enable performance of the multiple instances of the first task with the data set partition by the at least one GPU.

22. The computer-implemented method of claim 21, wherein determining whether the first task routine includes an instruction that prevents the compilation to generate the GPU task routine comprises:

determining whether the instruction of the first task routine is included in a set of instructions that cannot be converted into at least one instruction able to be executed by the at least one GPU; and in response to a determination that the instruction of the first task routine is not included in the set of instructions, determining whether the instruction of the first task routine is used in the first task routine in a manner that prevents conversion into at least one instruction able to be executed by the at least one GPU.

23. The computer-implemented method of claim 21, wherein converting the at least one instruction of the first task routine into the at least one corresponding instruction of the GPU task routine comprises converting the at least one instruction of the first task routine from a first programming language into the at least one corresponding instruction in a second programming language in accordance with the conversion rule.

24. The computer-implemented method of claim 21, wherein:

the at least one storage of the at least one node device comprises a first volatile storage communicatively coupled to the at least one CPU, and a second volatile storage communicatively coupled to the at least one GPU;

assigning the data set partition to the at least one node device to enable access by to the data set partition by the at least one GPU comprises causing the data set partition to be stored within the second volatile storage; and in response to a determination that the at least one GPU is not available to be assigned to perform the first task of the analysis routine, the method comprising:

refraining from analyzing the first task routine to determine whether the first task routine is able to be compiled to generate the GPU task routine;

assigning the data set partition to the at least one node device to cause storage of the data set partition within the first volatile storage to enable access to the data set partition by the at least one CPU;

compiling the first task routine for execution by the at least one CPU; and assigning the performance of the first task of the analysis routine with the data set partition to the at least one node device to enable performance of the first task with the data set partition by the at least one CPU.

25. The computer-implemented method of claim 21, wherein:

a coordinating device coordinates the operation of the plurality of node devices;

the coordinating device recurringly receives updates to the current status from each node device of the plurality of node devices; and analyzing the current status to determine availability of the at least one GPU of the at least one node device comprises identifying, at the coordinating device, a node device of the plurality of node devices that incorporates a GPU indicated in the current status as available.

26. The computer-implemented method of claim 25, wherein assigning the data set partition of the data set to the at least one node device comprises:

analyzing, at the coordinating device, a metadata indicative of structural features of the data set to identify a restriction in a manner in which the data set is able to be divided into the plurality of data set partitions, wherein the restriction is selected from a group consisting of an indication of a smallest atomic unit of data within the data set, and a specification of a partitioning scheme; and deriving a division the data set into the plurality of data set partitions based at least partially on the restriction.

27. The computer-implemented method of claim 26, comprising:

retrieving the metadata from at least one storage device at which the data set is stored; and transmitting an indication of the assignment of the data set partition to the at least one node device or the at least one storage device to cause a transmission of the data set partition from the at least one storage device to the at least one node device.

28. The computer-implemented method of claim 21, wherein:

analyzing the current status to determine availability of the at least one GPU of the least one node device comprises analyzing, by a CPU of a node device, a current status of the node device to whether a GPU of the node device is currently available, wherein:

the at least one CPU comprises the CPU;

the at least one node device comprises the node device; and the at least one GPU comprises the GPU.

29. The computer-implemented method of claim 21, comprising:

analyzing a second task routine of the analysis routine to determine whether the second task routine is able to be compiled to generate another GPU task routine for execution by the at least one GPU to cause the at least one GPU to perform multiple instances of the second task of the analysis routine at least partially in parallel without a dependency among inputs and outputs of the multiple instances of the second task, wherein the second task routine is generated for execution by the at least one CPU to perform a second task of the analysis routine; and in response to a determination that the second task routine is not able to be compiled to generate the other GPU task routine:

compiling the second task routine for execution by the at least one CPU; and assigning a performance of the second task of the analysis routine with the data set partition to the at least one node device to enable performance of the second task with the data set partitions by the at least one CPU.

30. The computer-implemented method of claim 29, comprising analyzing the analysis routine to determine an order of tasks of the analysis routine, wherein the order of tasks comprises a relative order of the first and second tasks.

\* \* \* \* \*